(12) United States Patent (10) Patent No.: US 8,135,700 B2
Takehara et al. (45) Date of Patent: Mar. 13, 2012

(54) CONTENT PROVIDING SYSTEM, CONTENT PROVIDING APPARATUS AND METHOD, CONTENT DISTRIBUTION SERVER, AND CONTENT RECEIVING TERMINAL

(75) Inventors: Mitsuru Takehara, Tokyo (JP); Yoichiro Sako, Tokyo (JP); Toshiro Terauchi, Tokyo (JP); Motoyuki Takai, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/166,201

(22) Filed: Jun. 22, 2011

(65) Prior Publication Data

US 2011/0252053 A1 Oct. 13, 2011

Related U.S. Application Data

(62) Division of application No. 11/486,322, filed on Jul. 13, 2006.

(30) Foreign Application Priority Data

Jul. 21, 2005 (JP) ................................. 2005-210803

(51) Int. Cl.
*G06G 7/00* (2006.01)
(52) U.S. Cl. ........ 707/712; 707/769; 707/770; 707/899; 715/833; 715/974; 725/38; 725/53; 725/60; 725/61; 725/64
(58) Field of Classification Search .......................... None
See application file for complete search history.

(56) References Cited

U.S. PATENT DOCUMENTS

| | | |
|---|---|---|
| 4,776,323 A | 10/1988 | Spector |
| 5,002,491 A | 3/1991 | Abrahamson et al. |
| 5,119,474 A | 6/1992 | Beitel et al. |
| 5,137,501 A | 8/1992 | Mertesdorf |
| 5,648,627 A | 7/1997 | Usa |

(Continued)

FOREIGN PATENT DOCUMENTS

EP 1 039 400 A2 9/2000

(Continued)

OTHER PUBLICATIONS

Chang et al., Overview of the MPEG-7 standard. IEEE Transactions on Circuits and Systems for Video Technology. Jun. 2001;11(6):688-695.

(Continued)

*Primary Examiner* — Tim T Vo
*Assistant Examiner* — Anh Tai Tran
(74) *Attorney, Agent, or Firm* — Wolf, Greenfield & Sacks, P.C.

(57) ABSTRACT

A content providing system includes a content distribution server and a content receiving terminal connected to each other through a communication channel. The content receiving terminal includes an operation input unit specifying one point on a line, a time information output unit outputting the specified point as time information, a request sender sending a content providing request including the output time information to the content distribution server, and a provider providing at least one content item to a user. The content distribution server includes a content storage unit in which a plurality of content items are stored in association with at least the corresponding time information, a search unit searching the content storage unit for at least one content item according to a search condition based on the time information, and a content distributor distributing at least one content item to the content receiving terminal.

15 Claims, 35 Drawing Sheets

U.S. PATENT DOCUMENTS

| | | | |
|---|---|---|---|
| 6,157,744 | A | 12/2000 | Nagasaka et al. |
| 6,230,192 | B1 | 5/2001 | Roberts et al. |
| 6,336,891 | B1 | 1/2002 | Fedrigon et al. |
| 6,349,275 | B1 | 2/2002 | Schumacher et al. |
| 6,389,222 | B1 | 5/2002 | Ando et al. |
| 6,390,923 | B1 | 5/2002 | Yoshitomi et al. |
| 6,408,128 | B1 | 6/2002 | Abecassis |
| 6,570,078 | B2 | 5/2003 | Ludwig |
| 6,578,047 | B1 | 6/2003 | Deguchi |
| 6,662,231 | B1 | 12/2003 | Drosset et al. |
| 6,697,824 | B1 | 2/2004 | Bowman-Amuah |
| 6,704,729 | B1 | 3/2004 | Klein et al. |
| 6,757,482 | B1 | 6/2004 | Ochiai et al. |
| 6,807,558 | B1 | 10/2004 | Hassett et al. |
| 6,813,438 | B1 | 11/2004 | Bates et al. |
| 6,839,680 | B1 | 1/2005 | Liu et al. |
| 6,868,440 | B1 | 3/2005 | Gupta et al. |
| 6,944,542 | B1 | 9/2005 | Eschenbach |
| 6,944,621 | B1 | 9/2005 | Collart |
| 7,161,887 | B2 | 1/2007 | Snow et al. |
| 7,260,402 | B1 | 8/2007 | Ahmed |
| 7,293,066 | B1 | 11/2007 | Day |
| 7,320,137 | B1 | 1/2008 | Novak et al. |
| 7,346,920 | B2 | 3/2008 | Lamkin et al. |
| 7,395,549 | B1 | 7/2008 | Perlman et al. |
| 7,451,177 | B1 | 11/2008 | Johnson et al. |
| 7,464,137 | B2 | 12/2008 | Zhu et al. |
| 7,521,623 | B2 | 4/2009 | Bowen |
| 7,521,624 | B2 | 4/2009 | Asukai et al. |
| 7,542,816 | B2 | 6/2009 | Rosenberg |
| 7,546,626 | B2 | 6/2009 | Ohnuma |
| 7,790,976 | B2 | 9/2010 | Takai et al. |
| 7,930,385 | B2 | 4/2011 | Takai et al. |
| 2001/0010754 | A1 | 8/2001 | Ando et al. |
| 2001/0014620 | A1 | 8/2001 | Nobe et al. |
| 2001/0015123 | A1 | 8/2001 | Nishitani et al. |
| 2001/0043198 | A1* | 11/2001 | Ludtke .......................... 345/173 |
| 2001/0055038 | A1 | 12/2001 | Kim |
| 2002/0056142 | A1 | 5/2002 | Redmond |
| 2002/0073417 | A1 | 6/2002 | Kondo et al. |
| 2002/0085833 | A1 | 7/2002 | Miyauchi |
| 2002/0104101 | A1 | 8/2002 | Yamato et al. |
| 2002/0152122 | A1 | 10/2002 | Chino et al. |
| 2003/0007777 | A1 | 1/2003 | Okajima et al. |
| 2003/0018622 | A1 | 1/2003 | Chau |
| 2003/0026433 | A1 | 2/2003 | Matt |
| 2003/0034996 | A1 | 2/2003 | Li et al. |
| 2003/0060728 | A1 | 3/2003 | Mandigo |
| 2003/0065665 | A1 | 4/2003 | Kinjo |
| 2003/0069893 | A1* | 4/2003 | Kanai et al. ................. 707/104.1 |
| 2003/0088647 | A1 | 5/2003 | ShamRao |
| 2003/0093790 | A1 | 5/2003 | Logan et al. |
| 2003/0113096 | A1 | 6/2003 | Taira et al. |
| 2003/0126604 | A1 | 7/2003 | Suh |
| 2003/0163693 | A1 | 8/2003 | Medvinsky |
| 2003/0212810 | A1 | 11/2003 | Tsusaka et al. |
| 2004/0000225 | A1 | 1/2004 | Nishitani et al. |
| 2004/0044724 | A1 | 3/2004 | Bell et al. |
| 2004/0049405 | A1 | 3/2004 | Buerger et al. |
| 2004/0064209 | A1 | 4/2004 | Zhang |
| 2004/0126038 | A1 | 7/2004 | Aublant et al. |
| 2004/0220830 | A1 | 11/2004 | Moreton et al. |
| 2004/0252397 | A1 | 12/2004 | Hodge et al. |
| 2004/0255335 | A1 | 12/2004 | Fickle et al. |
| 2004/0259529 | A1 | 12/2004 | Suzuki |
| 2005/0041951 | A1 | 2/2005 | Inoue et al. |
| 2005/0102365 | A1 | 5/2005 | Moore et al. |
| 2005/0126370 | A1 | 6/2005 | Takai et al. |
| 2005/0241465 | A1 | 11/2005 | Goto |
| 2005/0249080 | A1 | 11/2005 | Foote et al. |
| 2005/0278758 | A1 | 12/2005 | Bodlaender |
| 2005/0288991 | A1 | 12/2005 | Hubbard et al. |
| 2006/0078297 | A1 | 4/2006 | Nishikawa et al. |
| 2006/0087925 | A1 | 4/2006 | Takai et al. |
| 2006/0107822 | A1 | 5/2006 | Bowen |
| 2006/0112411 | A1 | 5/2006 | Takai et al. |
| 2006/0174291 | A1 | 8/2006 | Takai et al. |
| 2006/0189902 | A1 | 8/2006 | Takai et al. |
| 2006/0190413 | A1 | 8/2006 | Harper |
| 2006/0220882 | A1 | 10/2006 | Makino |
| 2006/0243120 | A1 | 11/2006 | Takai et al. |
| 2006/0245599 | A1 | 11/2006 | Regnier |
| 2006/0250994 | A1 | 11/2006 | Sasaki et al. |
| 2007/0005655 | A1 | 1/2007 | Takehara et al. |
| 2007/0025194 | A1 | 2/2007 | Morse et al. |
| 2007/0044010 | A1 | 2/2007 | Sull et al. |
| 2007/0067311 | A1 | 3/2007 | Takai et al. |
| 2007/0074253 | A1 | 3/2007 | Takai et al. |
| 2007/0074619 | A1 | 4/2007 | Vergo |
| 2007/0085759 | A1 | 4/2007 | Lee et al. |
| 2007/0098354 | A1 | 5/2007 | Ando et al. |
| 2007/0186752 | A1 | 8/2007 | Georges et al. |
| 2007/0204744 | A1 | 9/2007 | Sako et al. |
| 2007/0221045 | A1 | 9/2007 | Terauchi et al. |
| 2007/0265720 | A1 | 11/2007 | Sako et al. |
| 2008/0153671 | A1 | 6/2008 | Ogg et al. |
| 2008/0263020 | A1 | 10/2008 | Takehara et al. |
| 2009/0028009 | A1 | 1/2009 | Johnson et al. |

FOREIGN PATENT DOCUMENTS

| | | |
|---|---|---|
| EP | 1 128 358 A1 | 8/2001 |
| EP | 1 160 651 A1 | 12/2001 |
| EP | 1 320 101 A2 | 6/2003 |
| EP | 1 503 376 A2 | 2/2005 |
| EP | 1 705 588 A1 | 9/2006 |
| EP | 1 729 290 A1 | 12/2006 |
| EP | 1 746 520 A2 | 1/2007 |
| JP | 04-044096 A | 2/1992 |
| JP | 05-273971 A | 10/1993 |
| JP | 06-290574 A | 10/1994 |
| JP | 07-064547 A | 3/1995 |
| JP | 07-110681 A | 4/1995 |
| JP | 08-152880 A | 6/1996 |
| JP | 08-286663 A | 11/1996 |
| JP | 08-322014 A | 12/1996 |
| JP | 08-328555 A | 12/1996 |
| JP | 09-107517 A | 4/1997 |
| JP | 10-055174 A | 2/1998 |
| JP | 10-124047 A | 5/1998 |
| JP | 10-254445 A | 9/1998 |
| JP | 11-126067 A | 5/1999 |
| JP | 2000-003174 A | 1/2000 |
| JP | 2000-020054 A | 1/2000 |
| JP | 2000-207263 A | 7/2000 |
| JP | 2000-214851 A | 8/2000 |
| JP | 3088409 B2 | 9/2000 |
| JP | 2000-285059 A | 10/2000 |
| JP | 2001-022350 A | 1/2001 |
| JP | 2001-075995 A | 3/2001 |
| JP | 3147888 B2 | 3/2001 |
| JP | 2001-166772 A | 6/2001 |
| JP | 2001-282813 A | 10/2001 |
| JP | 2001-297090 A | 10/2001 |
| JP | 2001-299980 A | 10/2001 |
| JP | 2001-321564 A | 11/2001 |
| JP | 2001-324984 A | 11/2001 |
| JP | 2001-325787 A | 11/2001 |
| JP | 2001-357008 A | 12/2001 |
| JP | 2001-359096 A | 12/2001 |
| JP | 2002-023746 A | 1/2002 |
| JP | 2002-049631 A | 2/2002 |
| JP | 2002-092013 A | 3/2002 |
| JP | 2002-108918 A | 4/2002 |
| JP | 2002-189663 A | 7/2002 |
| JP | 2002-238022 A | 8/2002 |
| JP | 2002-251185 A | 9/2002 |
| JP | 2002-282227 A | 10/2002 |
| JP | 2002-330411 A | 11/2002 |
| JP | 2003-023589 A | 1/2003 |
| JP | 2003-037856 A | 2/2003 |
| JP | 2003-050816 A | 2/2003 |
| JP | 2003-058770 A | 2/2003 |
| JP | 2003-150173 A | 5/2003 |
| JP | 2003-157375 A | 5/2003 |
| JP | 2003-162285 A | 6/2003 |
| JP | 2003-177749 A | 6/2003 |
| JP | 2003-224677 A | 8/2003 |

| | | | |
|---|---|---|---|
| JP | 2004-073272 A | 3/2004 |
| JP | 2004-078467 A | 3/2004 |
| JP | 2004-139576 A | 5/2004 |
| JP | 2004-151855 A | 5/2004 |
| JP | 2004-173102 A | 6/2004 |
| JP | 2004-185535 A | 7/2004 |
| JP | 2004-199667 A | 7/2004 |
| JP | 2004-222239 A | 8/2004 |
| JP | 2004-226625 A | 8/2004 |
| JP | 2004-234807 A | 8/2004 |
| JP | 2004-526372 A | 8/2004 |
| JP | 2004-252654 A | 9/2004 |
| JP | 2004-259313 A | 9/2004 |
| JP | 2004-259430 A | 9/2004 |
| JP | 2004-282775 A | 10/2004 |
| JP | 2004-317819 A | 11/2004 |
| JP | 2004-326840 A | 11/2004 |
| JP | 2004-361713 A | 12/2004 |
| JP | 2004-362145 A | 12/2004 |
| JP | 2004-362489 A | 12/2004 |
| JP | 2004-362601 A | 12/2004 |
| JP | 3598613 B2 | 12/2004 |
| JP | 2005-004604 A | 1/2005 |
| JP | 2005-043916 A | 2/2005 |
| JP | 2005-062971 A | 3/2005 |
| JP | 2005-084336 A | 3/2005 |
| JP | 2005-093068 A | 4/2005 |
| JP | 2005-107867 A | 4/2005 |
| JP | 2005-156641 A | 6/2005 |
| JP | 2005-196918 A | 7/2005 |
| JP | 2005-202319 A | 7/2005 |
| NL | 1023191 C2 | 10/2004 |
| WO | WO 93/22762 A1 | 11/1993 |
| WO | WO 01/82302 A1 | 11/2001 |
| WO | WO 02/05124 A1 | 1/2002 |
| WO | WO 02/080524 A2 | 10/2002 |
| WO | WO 02/093344 A1 | 11/2002 |
| WO | WO 03/043007 A2 | 5/2003 |
| WO | WO 2004/023358 A1 | 3/2004 |
| WO | WO 2004/077706 A1 | 9/2004 |

OTHER PUBLICATIONS

Hawley, Structure out of sound. MIT PhD Thesis. 1993, pp. 1-185.
Koike et al., Timeslider: an interface to specify time point. Proc. of the ACM 10$^{th}$ Annual Symposium on User Interface Software and Technology. Oct. 17, 1997, pp. 43-44, Alberta, Canada.
Little et al., A digital on-demand video service supporting content-based queries. http://portal.acm.org/ft_gateway.cfm?id=168450 &type=pdf&coll=GUIDE&dl=GUIDE&CFID=16 387603 &CFTOKEN=17953305. Proc. of the First ACM International Conference on Multimedia. New York, Aug. 1, 1993, 9 pages, XP-002429294.
McParland et al., Exchanging TV-anytime metadata over IP networks. Document AN462 submitted to the TV-anytime forum, Sep. 17, 2002, pp. 1-38.
O'Keeffe, Karl, Dancing monkeys. Masters project. Jun. 18, 2003, pp. 1-66.
Zhang et al., Database and metadata support of a web-based multimedia digital library for medical education. http://www.springerlink.com/content/69Ohg1rxv19gwy2q/fulltext.pdf. Proc. of the First International Conference on Advances in Web-based Learning, ICWL 2002. China, Aug. 17, 2002, pp. 339-350, XP002429295.

* cited by examiner

FIG. 2

| ID | TYPE | CATEGORY | TITLE | PERFORMER | TIME INFORMATION 1 | | TIME INFORMATION 2 | | TIME INFORMATION 3 | |
|---|---|---|---|---|---|---|---|---|---|---|
| | | | | | TIME INFORMATION | ATTRIBUTE | TIME INFORMATION | ATTRIBUTE | TIME INFORMATION | ATTRIBUTE |
| 1 | MUSIC | POPS | ○○×○○ | □□□□ | AUGUST 25, 1997 | RELEASED | FEBRUARY 1998 | JOINED TEN BESTS | DECEMBER 1998 | LIVE AT BUDOKAN |
| ... | ... | ... | ... | ... | | | | | | |
| 100 | MOVIE | HORROR | "○○×" | □×□× | JUNE 8, 1995 | RELEASED IN JAPAN | AUGUST 3, 1994 | RELEASED IN USA | AUGUST 2, 1994 | SHOWN AT TV |
| ... | ... | ... | ... | ... | | | | | | |
| 250 | TV BROADCAST PROGRAM | ENTERTAINMENT | △△○○ | △△□□ | JANUARY 1, 2001 | BROADCASTED | FEBRUARY 28, 2002 | DVD RELEASED | APRIL 1, 2003 | RE-BROADCASTED |
| ... | ... | ... | ... | ... | | | | | | |
| 1001 | NEWS | GENERAL | PRESIDENT K INAUGURATED | ×□× | JUNE 1, 2000 | BROADCASTED | MAY 31, 2000 | INCIDENT HAPPENED | JUNE 1, 2000 | PRINTED IN NEWSPAPER |
| 1002 | NEWS | SPORT | I, 2000 BASE HITS | □×× | AUGUST 20, 2004 | PRINTED IN NEWSPAPER | AUGUST 19, 2004 | INCIDENT HAPPENED | | |
| ... | ... | ... | ... | ... | | | | | | |
| 2001 | E-BOOK | HISTORICAL NOVEL | "XX WAR" | ○○□ | MAY 1, 1995 | ISSUED AS PAPER BOOK | APRIL 10, 1996 | ISSUED AS E-BOOK | DECEMBER 10, 1995 | PLACED IN BEST-SELLER LIST |
| ... | ... | ... | ... | ... | | | | | | |

CONTENT PROVIDING SYSTEM, CONTENT PROVIDING APPARATUS AND METHOD, CONTENT DISTRIBUTION SERVER, AND CONTENT RECEIVING TERMINAL

CROSS REFERENCES TO RELATED APPLICATIONS

This application is a divisional of U.S. Ser. No. 11/486,322 filed Jul. 13, 2006, which claims the priority benefit of Japanese patent application number 2005-210803, filed in the Japanese Patent Office on Jul. 21, 2005, which is hereby incorporated by reference to the maximum extent allowable by law.

BACKGROUND OF THE INVENTION

1. Field of the Invention

The present invention relates to a content providing system, a content providing apparatus, and a content providing method that enable users to search a large-capacity storage device for a large volume of content, such as music pieces, movies, and electronic books by using time information as a search key. The invention also relates to a content distribution server and a content receiving terminal used for the content providing system, apparatus, and method.

In this specification, content is information composed of, for example, music, video (including movies, television broadcast programs, and photographed images), electronic books (text information, such as theses, novels, and magazines, and still image information), guidance information, web pages, and programs (including game programs).

2. Description of the Related Art

Hitherto, time information, composed of, for example, second, minute, hour, day, month, and year, is stored in a content storage unit in association with corresponding content, and when searching for content, the stored time information is used as a keyword.

For example, Japanese Unexamined Patent Application Publication No. 2004-259313 discloses a recording/playback apparatus that enables a user to easily find desired content. In this recording/playback apparatus, the titles of programs and their recording dates are stored in a content storage unit in association with each other, and when the user specifies a date to search for a recorded program, the title of the found program can be displayed as a search result.

Japanese Unexamined Patent Application Publication No. 2004-139576 discloses an apparatus and method for creating albums from image data obtained through, for example, journeys. Image data is stored together with information concerning the photograph date. Also, information concerning journeys, such as departure places, departure times, and final destinations, is stored in a server. Then, the places where the image data have been obtained along a user's route in a journey are estimated on the basis of the photograph date information added to the image data. Then, image data of images photographed by other persons related to the estimated places, or text data, such as a description of the estimated places, are read from a corresponding storage unit. As a result, an album can be created from the image data and the related data.

SUMMARY OF THE INVENTION

In the related art disclosed in the above-described publications, when specifying time information for searching for content, the user generally inputs numerical values representing, for example, time, day, month, and year.

In this inputting operation, the user has to take the trouble to input numerical values. If expected search results are not obtained, the user has to specify time information by inputting numerical values again, which is a nuisance.

If the user does not remember an exact date, the user has to input numerical values until he/she finds desired content. Additionally, in response to a vague demand, such as wishing to watch and listen to content around the year 1990, the user has to specify the days and months near 1990 many times, which is very time-consuming and troublesome.

It is thus desirable to enable users to search for content by easily specifying time information, and to enable the users to easily change time information many times even when the users specify time information vaguely.

According to an embodiment of the present invention, there is provided a content providing system including a content distribution server and a content receiving terminal connected to the content distribution server through a communication channel. The content receiving terminal includes operation input means for performing an input operation for specifying one point on a line, time information output means for outputting the point specified by the operation input means as time information, request sending means for sending a content providing request including the output time information to the content distribution server, and providing means for receiving at least one content item sent from the content distribution server in response to the content providing request and for providing the received content item to a user. The content distribution server includes a content storage unit in which a plurality of content items are stored in association with at least time information concerning each of the plurality of content items, search means for searching the content storage unit for at least one content item according to a search condition based on the time information included in the content providing request sent from the content receiving terminal, and content distribution means for distributing at least one content item searched by the search means to the content receiving terminal.

The time information output means may include determining means for determining whether the input operation performed by the user indicates that the user intends to specify one point on the line. If the determining means determines that the input operation performed by the user indicates that the user intends to specify one point on the line, the request sending means may send the content providing request including the time information corresponding to the specified point to the content distribution server.

The content providing request may include accompanying information for specifying a range of content to be searched by using the time information in the content providing request.

According to an embodiment of the present invention, as the means for specifying time information, an operation input unit that allows a user to specify one point while sequentially changing the time information and that receives the specified point as a point specified on the linear axis is used.

The operation input means may be a turn knob (dial knob), which enables the user to input the time information by simply rotating the turn knob without having to input numerical values. The user can obtain, by a simple operation, content searched from the content storage unit according to a search condition based on the time information.

The determining means for determining whether the input operation performed by the user indicates that the user intends to specify one point on the linear axis is provided.

Then, the user can easily make a content providing request using the intended time information by specifying one point on the linear axis through the operation input means.

Accompanying information for specifying a range of content to be searched by using time information is included in a content providing request. Then, the content distribution server searches for at least one content item stored in the content storage unit by using the search unit according to a search condition based on the time information and accompanying information included in the content providing request, and distributes the searched content item to the content receiving terminal.

Accordingly, the content distribution server can search the content storage unit by using, not only the time information, but also the time information attribute information and content attribute information, as search conditions. The user can conduct fine search by using detailed information in addition to time information.

According to an embodiment of the present invention, the user can change time information by a simple operation, such as by rotating a turn knob, and can obtain content searched from the content storage unit by using the time specified through such a simple operation as a search condition.

BRIEF DESCRIPTION OF THE DRAWINGS

FIG. 2 illustrates an example of attribute information concerning content stored in a content database provided for a content distribution server according to an embodiment of the present invention;

DESCRIPTION OF THE PREFERRED EMBODIMENTS

A content providing system according to an embodiment of the present invention is described in detail below with reference to the accompanying drawings.

Figure 1:
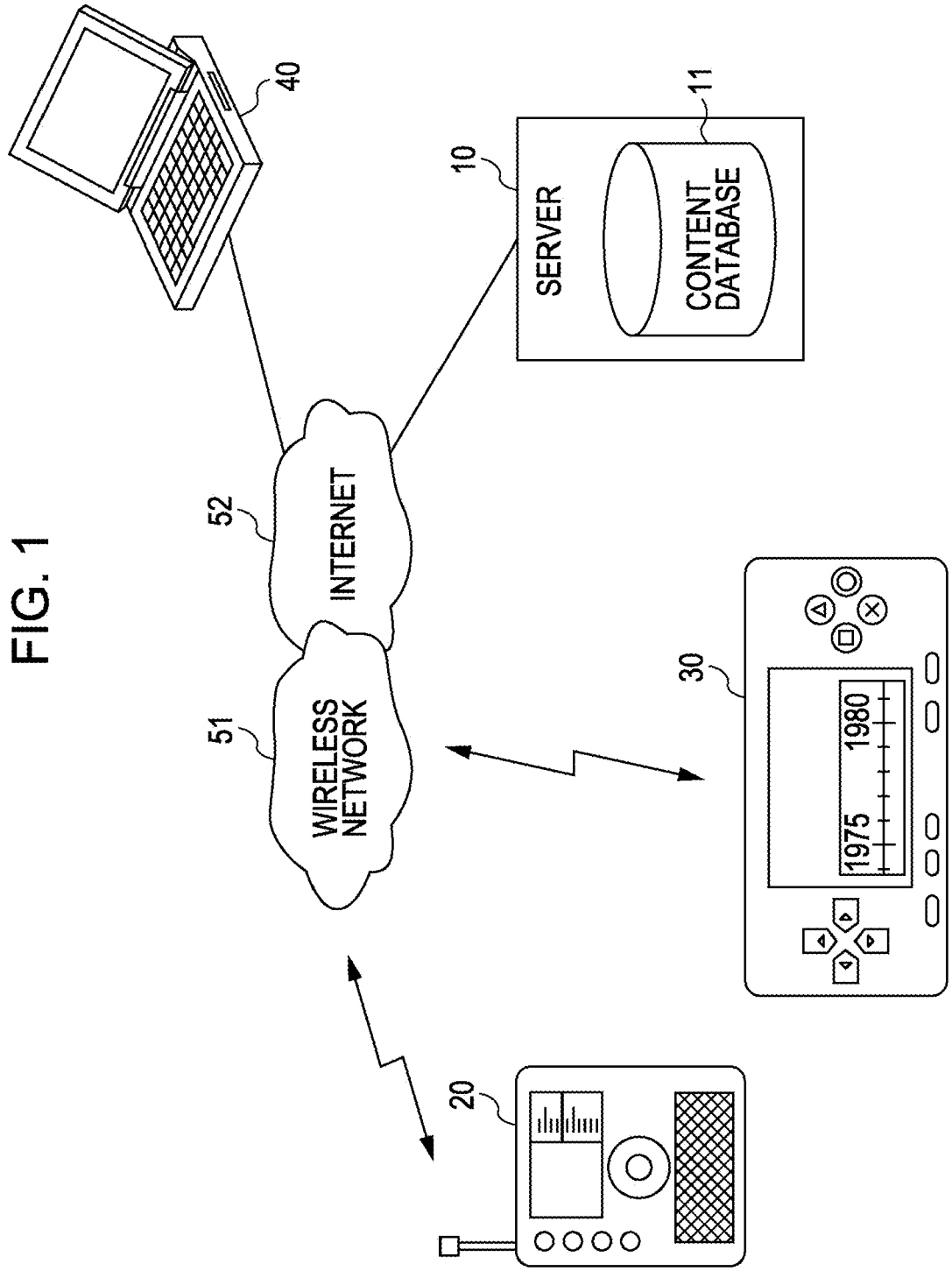
FIG. 1 is a block diagram illustrating an overview of a content providing system according to an embodiment of the present invention.

In a content providing system according to an embodiment of the present invention shown in FIG. 1, a content distribution server 10 and a plurality of (three, in the example shown in FIG. 1) content receiving terminals 20, 30, and 40 are connected to each other through predetermined communication channels. In FIG. 1, the communication channels include a wireless network 51 and the Internet 52.

The content receiving terminal 20, which is an example of a receiving terminal dedicated for music content, can be used as a portable device, such as a portable radio receiver. The content receiving terminal 20, which is also referred to as the "music content receiving terminal" 20, forms a communication channel by accessing the content distribution server 10 via the wireless network 51 and the Internet 52 so that it can connect to the content distribution server 10 through this communication channel.

The content receiving terminal 30, which is an example of a receiving terminal dedicated for audiovisual (AV) content, such as movies, is a portable game machine having an AV playback function. The content receiving terminal 30, which is also referred to as the "AV content receiving terminal" 30, also forms a communication channel by accessing the content distribution server 10 via the wireless network 51 and the Internet 52 so that it can connect to the content distribution server 10 through this communication channel.

The content receiving terminal 40, which is a personal computer, has the function as a content receiving terminal by using software so that it can obtain and play back various pieces of content. The content receiving terminal 40, which is also referred to as the "general-purpose content receiving terminal" 40, forms a communication channel by accessing the content distribution server 10 via the Internet 52 so that it can connect to the content distribution server 10 through this communication channel.

The above-described content receiving terminals 20, 30, and 40 are only examples of content receiving terminals in this embodiment. Accordingly, various other content receiving terminals may be used in an embodiment of the present invention. For the convenience of simplicity, however, a description is given below, assuming that only the content receiving terminals 20, 30, and 40 are used as content receiving terminals in the content providing system.

The content distribution server 10 includes a content database 11. In the content database 11, music content, video content, broadcast program content, electronic book content, photo content (photographed image content), and other types of content are stored in association with attribute information concerning such content.

FIG. 2 illustrates an example of content attribute information. In this content attribute information, content data items are associated with content identification information IDs. More specifically, content data items are stored in the content database 11 in association with the content identification information IDs (not shown), and content attribute information is stored in the content database 11 in association with the content identification information IDs, as shown in FIG. 2.

In this example shown in FIG. 2, as the content attribute information, the type of content, such as music, movies, television broadcast programs, and electronic books, the category of the content, the title of the content, the performer, such as players or cast, time information, and the compression method and data format of content data are stored.

In this embodiment, time information is stored together with attribute information concerning the time information (hereinafter sometimes simply referred to as "time information attribute information"). Time information attribute information indicates what the corresponding time information represents. Accordingly, depending on the type or variation of attribute information, a plurality of items of time information can be associated with one piece of content. That is, in this embodiment, the time information concerning content stored in the content database 11 includes a plurality of different types of time information, and the time information attribute information is used for specifying each type of time information.

For example, for music content, time information, such as the date when a record or a compact disc (CD) of a certain music piece was released, the date when the music piece joined the ten best in the hit chart, the date when the music piece was introduced at live, and the date when the music piece was broadcast on the radio or on television, can be stored, as shown in FIG. 2, in the content database 11 together with the time information attribute information, such as text information representing the time information.

For movie content, time information, such as the date when a certain movie was released in Japan, the date when the movie was released in the United States, and the date when the movie was broadcast on television, can be stored, as shown in FIG. 2, in the content database 11 together with the time information attribute information, such as text information representing the time information.

For television broadcast program content, time information, such as the date when a certain television broadcast program was broadcast, the date when the television broadcast program was released as a digital versatile disc (DVD), and the date when the television broadcast program was rebroadcast, can be stored, as shown in FIG. 2, in the content database 11 together with the time information attribute information, such as text information representing the time information.

For news content, time information, such as the date when news was broadcast, the date when an incident in the news happened, and the date when the news story was printed in the newspaper, can be stored, as shown in FIG. 2, in the content database 11 together with time information attribute information, such as text information representing the time information. In this embodiment, news content is stored by being minutely divided according to events or incidents. That is, news stories are divided according to events or incidents even if they are broadcast in the same time zone.

For electronic book content, time information, such as the date when a certain book was released in paper form, the date when the book was released in electronic form, and the date when the book was placed in the best-seller list, can be stored, as shown in FIG. 2, in the content database 11 together with the time information attribute information, such as text information representing the time information.

Content data are stored in the content database 11 after being compressed according to the type of each content piece. For example, music content data is compressed according to MPEG-1 audio layer III (MP3) or Adaptive Transform Acoustic Coding 3 (ATRAC3). Music content may be Musical Instrument Digital Interface (MIDI) data.

Video content data is compressed according to Moving Picture Experts Group 2 (MPEG2), MPEG4, or JPEG.

The compression format or data format of music content or video content is stored in the content database 11 as content attribute information, though it is not shown in FIG. 2. Then, upon receiving a content providing request from a content receiving terminal, the content distribution server 10 selects content data that can be decoded and played back by the content receiving terminal based on information, indicated in the content providing request, concerning the decoding function provided for the content receiving terminal and the data format that can be played back by the content receiving terminal, and distributes the selected content data to the content receiving terminal.

As described above, according to this embodiment, the content distribution server 10 stores a plurality of types of content in the content database 11 in association with time information. Then, in response to a content providing request from the content receiving terminal 20, 30, or 40, the content distribution server 10 distributes requested content to the corresponding content receiving terminal.

In this embodiment, the user of the content receiving terminal 20, 30, or 40 requests content by specifying time information, such as years or dates, as a search condition. For example, the user can request music content in the 60s, movie content shown in 1980, or an incident happened at 10:00 p.m. Nov. 11, 1999.

Accordingly, the content receiving terminal 20, 30, or 40 sends a content providing request including at least time information as a search keyword to the content distribution server 10.

In this case, if the user specifies only time information without specifying the type of content, all content pieces that match the time information as the search condition are extracted as search results and are distributed. Accordingly, when the user desires only music content, movie content, or news content, the user of the content receiving terminal includes, not only time information, but also information indicating the type of content in a content providing request.

If only time information is contained in the content providing request without time information attribute information, it is unknown what the time information represents. Accordingly, in this embodiment, time information attribute information is included in the content providing request to indicate what the time information represents. For example, if music content including only hit tunes in the 70s is requested, the user inputs 1970 as time information and includes information representing hit tunes as the time information attribute information.

As the time information attribute information representing hit tunes, the same information as that stored in the content database 11 of the distribution server 10, such as that shown in FIG. 2, for example, "ten best in the hit charts", can be used.

It is not essential, however, that the same information as that stored in the content database 11 is used as the time information attribute information. The reason for this is that the content distribution server 10 can analyze the time information attribute information included in a content providing request sent from a content receiving terminal to search the content database 11 for the corresponding attribute information.

That is, if the time information attribute information included in the content providing request from the content receiving terminal indicates hit tunes, the content distribution server 10 can determine that the time information attribute information to be searched is "ten best in the hit charts", and then searches the content database 11 by using the attribute information together with the time information specified by the user, and then obtains music content including hit tunes in the 70s.

In this embodiment, to facilitate the generation of search conditions in the content distribution server 10, information attribute information to be selected are predetermined, and the user can select time information attribute information from the predetermined attribute information.

As discussed above, in this embodiment, the content distribution server 10 stores a plurality of types of content. Accordingly, when the user requests a specific type of content, it is necessary to specify the type of content.

The music content receiving terminal 20 and the AV content receiving terminal 30 are dedicated terminals for requesting music content and video content, respectively. Accordingly, the music content receiving terminal 20 and the AV content receiving terminal 30 send content providing requests by including information indicating the types of content in the requests to save users from inputting the types of content.

However, it is necessary for the user of the general-purpose content receiving terminal 40 to input the type of content requested by the user.

In this embodiment, it is not always necessary for the user to specify the time information attribute information. If the content distribution server 10 receives a content providing request without time information attribute information from a content receiving terminal, it determines that the content receiving terminal has requested recommended content.

If the content distribution server 10 receives a content providing request with time information attribute information from a content receiving terminal, it searches for content that satisfies a search condition indicated by the time information attribute information, and distributes the search results to the content receiving terminal.

In this embodiment, the user of a content receiving terminal can set content attribute information, such as the category of content, other than time information (such attribute information other than time information is simply referred to as "content attribute information"). The content attribute information set by the user is included in a content providing request and is used as one of the search conditions by the content distribution server 10. The user does not have to specify content attribute information, in which case, the content distribution server 10 searches for content without considering content attribute information.

As described above, according to this embodiment, a content receiving terminal sends a content providing request by including time information and accompanying information, which is used for specifying a range of content to be searched by using the time information, in the request. Then, the content distribution server 10 searches the content database 11 by using the time information and accompanying information as search conditions. It is thus possible to easily obtain content including time information as metadata, such as music content which was released at a date specified by time information, broadcast program content which was broadcast at a date specified by time information, or movie content which was shown at a date specified by time information.

Details of the configurations and operations of the content distribution server 10 and the content receiving terminals 20, 30, and 40 are described below. For the convenience of simplicity, in the following examples, information that can be selected by the user as content attribute information is restricted to category information.

Hardware Configuration of Content Distribution Server 10

Figure 3:
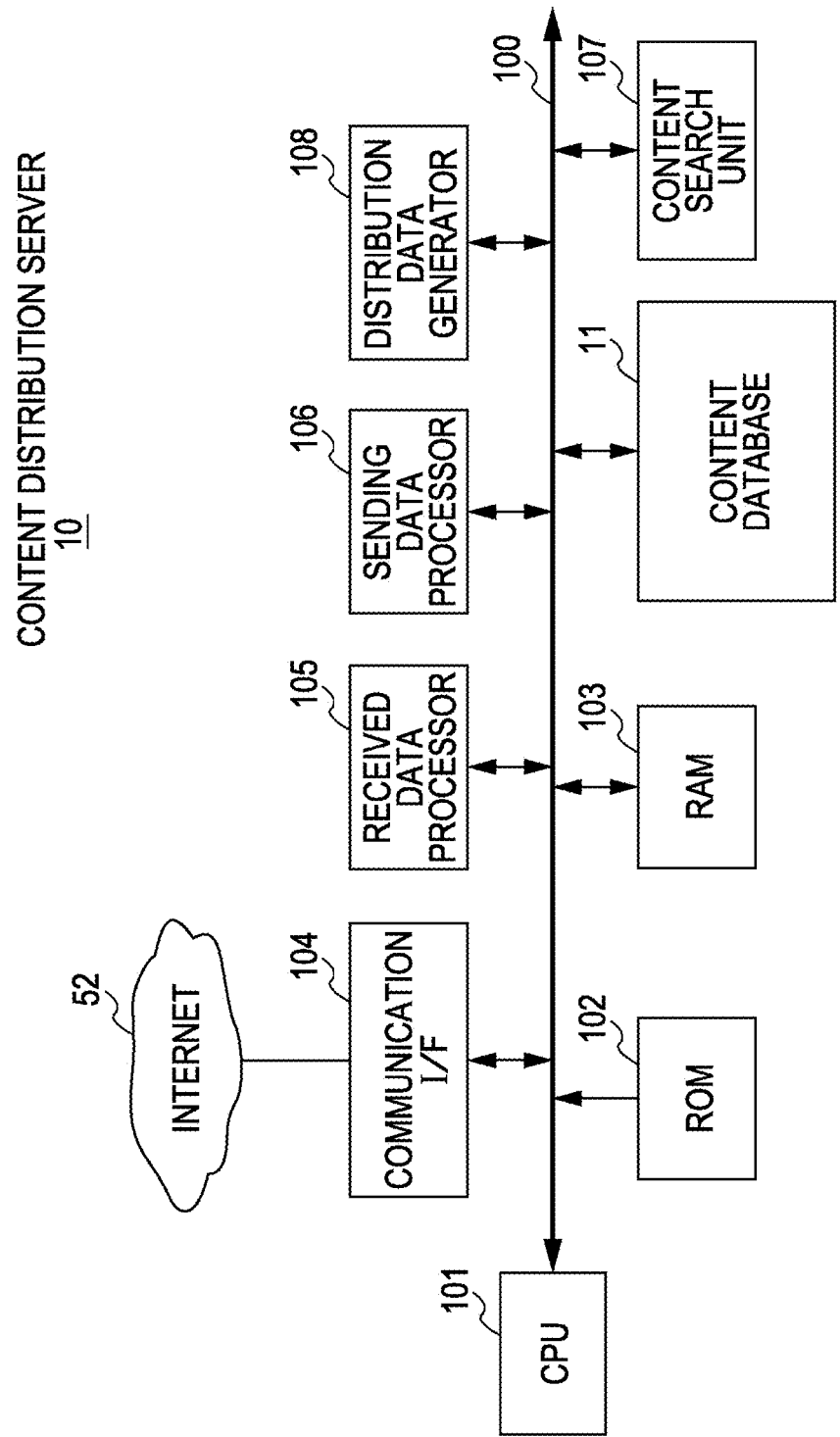
FIG. 3 is a block diagram illustrating the hardware configuration of a content distribution server according to an embodiment of the present invention.

An example of the hardware configuration of the content distribution server 10 is shown in FIG. 3.

In the content distribution server 10 shown in FIG. 3, a central processing unit (CPU) 101 is connected through a system bus 100 to a program read only memory (program ROM) 102, a work area random access memory (work area RAM) 103, a communication interface 104, a received data processor 105, a sending data processor 106, the content database 11, a content search unit 107, and a distribution data generator 108. The communication interface 104 is connected to the Internet 52.

In the program ROM 102, a processing program to be executed by the CPU 101 is stored. The work area RAM 103 is used as a work area for executing the processing program by the CPU 101. Information indicating a communication network address, which is used as the sender address, of the content distribution server 10 is also stored in the program ROM 102.

The received data processor 105 receives a content providing request received via the communication interface 104 from a content receiving terminal, converts the request into data that can be processed by the content distribution server 10, and then sends the converted request to the system bus 100.

The sending data processor 106 converts distribution data generated by the distribution data generator 108 to data that can be sent via a communication network, and sends the converted distribution data to the Internet 52 via the communication interface 104.

The content database 11 stores content data, at least content-related time information, and content attribute information, such as that shown in FIG. 2, including time information attribute information. As stated above, content data and the corresponding content attribute information are associated with each other through content identification information IDs.

The content search unit 107 searches the content database 11 for attribute information by using, as search conditions, time information and the associated time information attribute information and category information included in a content providing request sent from a content receiving terminal, and then extracts content data based on the searched attribute information. The content search unit 107 may be implemented by software which is executed by the CPU 101.

The distribution data generator 108 generates distribution data from search results obtained by the content search unit 107, and transfers the generated distribution data to the sending data processor 106.

If the requested content is music content, the distribution data generator 108 sends music content data searched from the content database 11 to the music content receiving terminal 20 so that the music content receiving terminal 20 can perform stream playback on the music content.

If a plurality of music pieces are found as a search result, the content distribution server 10 sends the plurality of music pieces to the music content receiving terminal 20 in a random order. This random order can be determined based on the time when a content providing request is sent or the time when a content providing request is received. With this arrangement, if the request sending times or request receiving times for a plurality of content providing requests are different, the plurality of content pieces obtained as a search result in response to one content providing request are sent in an order different from that in which the plurality of content pieces in response to another content providing request are sent even if the obtained content pieces are the same among the received requests.

The reason for this is to prevent the user from getting board by repeatedly receiving the same music pieces in the same order when the user sends content providing requests at different times by specifying time information.

Distribution histories for individual users may be stored so that the same music content can be prevented from repeatedly sending to the same user.

As described above, according to this embodiment, concerning music content, the user requests the content distribution server 10 to provide music content by specifying at least time information by using the music content receiving terminal 20. Then, music content that matches the specified time information can be sent to the music content receiving terminal 20 and is played back as if the user were listening to music in a radio receiver. Accordingly, the user can listen to, for example, popular music pieces in the 60s in a certain order. Thus, in this embodiment, a novel providing method for music content can be provided.

When a plurality of content items are obtained from the content database 11 as a search result, instead of sequentially distributing the content items as discussed above, a list of the content items as a search result may be sent to a content receiving terminal before distributing specific content data to the content receiving terminal. Then, the user selects desired content items from the list and sends back the selection result to the content distribution server 10. Accordingly, the content distribution server 10 can send the content items selected by the user to the content receiving terminal.

In this embodiment, music content items obtained as a search result are sequentially distributed in a random order, as discussed above. However, concerning other types of content, for example, AV content or electronic book content, a list of content items as a search result is sent before distributing final content data.

That is, if requested content is other than music content, the distribution data generator 108 generates a list of content including at least one content item obtained from the content database 11, and then sends the list to the content receiving terminal 30 or 40.

The content receiving terminal 30 or 40 receives the list and then receives the selection of one specific content item from the list by the user, and sends a request to provide the content selected by the user to the content distribution server 10.

In response to this request, the content distribution server 10 returns the requested content data to the content receiving terminal 30 or 40.

Hardware Configuration of Music Content Receiving Terminal 20

Figure 4:
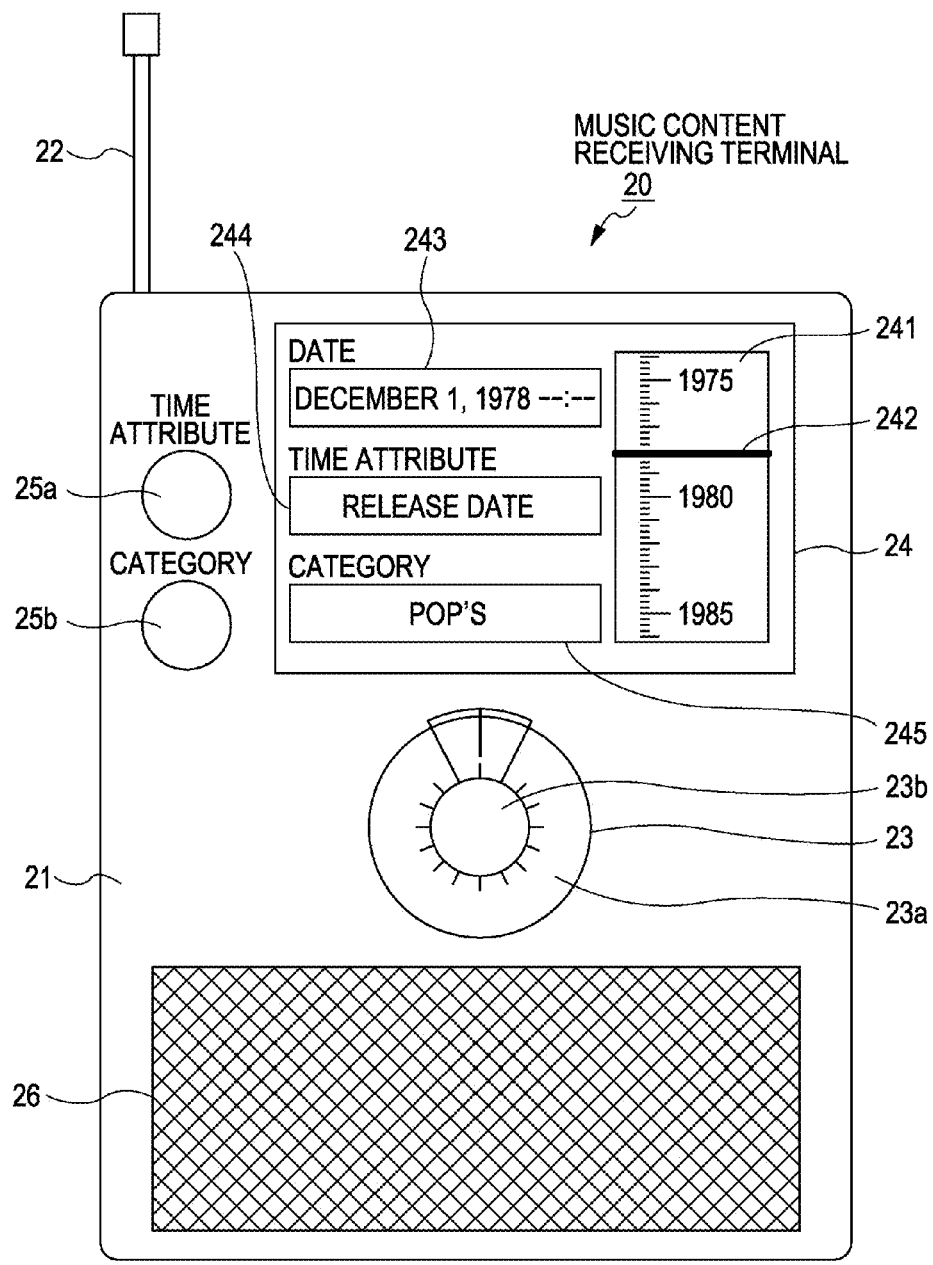
FIG. 4 illustrates an example of the operation panel of a music content receiving terminal according to an embodiment of the present invention.

FIG. 4 is a front view illustrating the external configuration of the music content receiving terminal 20, and more specifically, an operational panel of a casing 21 of the music content receiving terminal 20.

In this embodiment, the music content receiving terminal 20 includes a transmission/reception antenna 22 to connect to a wireless network. On the operational panel of the casing 21 of the music content receiving terminal 20, a turn knob operation unit 23 for setting time information, a display screen 24, which is, for example, a liquid crystal display (LCD), a plurality of operation buttons, such as an operation button for setting time information attribute information (time attribute changing operation button) 25a and an operation button for setting a category (category changing operation button) 25b, and a sound output unit 26 for outputting sound from a speaker are disposed.

The turn knob operation unit 23 serves as an operation input unit that allows the user to continuously change time information by rotating the turn knob operation unit 23, and to input one point by stopping the turn knob operation unit 23 at a predetermined position. The turn knob operation unit 23 also serves as an operation input unit that receives the point specified by the user as one point on a linear axis, which is assumed in association with the continuous rotation operation performed on the turn knob operation unit 23.

In this example, the turn knob operation unit 23 is used for setting time information. Accordingly, when the user rotates the turn knob operation unit 23, the music content receiving terminal 20 recognizes that the rotation operation performed by the user changes the position of the point on the linear axis, which serves as the time axis, and that a point on the time axis traced by the rotation operation is a point while the user is setting the time information or a point set by the user on the time axis. Then, the music content receiving terminal 20 recognizes that the point at which the user stops the rotation operation is the point set by the user on the time axis, i.e., the point on the time information.

This embodiment shows that, in this specification, the linear axis is not restricted to a straight line, but includes a curve or a combination of a straight line and a curve. Since the turn knob operation unit 23 shown in FIG. 4 is circular, the linear axis becomes a curve along the circle. Points can be continuously input along an external periphery surface of a tube, and accordingly, the linear axis may include a three-dimensional curve. That is, the operation input unit may be formed in any manner as long as the user can specify one point on a line.

The display screen 24 includes a time axis indicator 241, a time axis cursor 242, a time information display column 243, a time information attribute display column 244, and a content category display column 245.

The time axis indicator 241 is vertically calibrated as the time axis. In the example shown in FIG. 4, large markings are provided in five-year increments, and years are indicated for the large markings every five years. The medium markings are provided in one-year increments, and small markings are provided in three-month increments.

The time axis cursor 242 is indicated as a horizontal bar, and the position of the time axis cursor 242 is shifted in the time axis direction of the time axis indicator 241 in accordance with the rotation performed on the turn knob operation unit 23 by the user. In this example, the position of the time axis cursor 242 is shifted by software control in accordance with the rotation of the turn knob operation unit 23.

In this case, the time axis cursor 242 can be continuously shifted. This corresponds to a bar, which indicates a currently received frequency, in accordance with the operation of a frequency dial knob in an existing radio receiver. Accordingly, in this embodiment, the user can continuously change the date (second, minute, hour, day, month, and year) by operating the turn knob operation unit 23.

The markings indicated on the time axis in the time axis indicator 241 are only part of the time information that can be set by the user. If the user changes the time information in the present-to-past direction when the time axis cursor 242 is located at the topmost position of the time axis indicator 241, the markings indicated in the time axis indicator 241 are scrolled in the present-to-past direction. Similarly, if the user changes the time information in the past-to-present direction when the time axis cursor 242 is located at the bottommost position of the time axis indicator 241, the markings indicated in the time axis indicator 241 are scrolled in the past-to-present direction.

Alternatively, the time axis cursor 242 may be fixed, and the markings indicated in the time axis indicator 241 may be scrolled in accordance with the rotation operation performed on the turn knob operation unit 23 by the user, thereby changing the time information.

In this embodiment, the turn knob operation unit 23 includes a flat disk-shaped large knob 23a and a cylindrical small knob 23b which has a sufficient height for the user to easily hold the small knob 23b. The large knob 23a and the small knob 23b are coaxially rotatable.

The turn knob operation unit 23 has a double rotation axis structure. More specifically, the user rotates the turn knob operation unit 23 by mainly holding the small knob 23b. The small knob 23b is movable in the direction of the center line of the rotation axis. When the small knob 23b is pulled up in the direction of the center line of the rotation axis toward the user, the large knob 23a and the small knob 23b are integrally rotated around a first rotation axis. When the small knob 23b is pressed down, only the small knob 23b is rotated around a second rotation axis. That is, when the small knob 23b is pressed down, the integral locking mechanism allowing the large knob 23a to integrally move with the small knob 23b is released, and when the small knob 23b is pulled up, the integral locking mechanism is enabled.

The integral rotation of the large knob 23a and the small knob 23b corresponds to a rough adjusting operation, and the user can adjust the position on the time axis relatively roughly. For example, with this operation, the user can change only the year. The single rotation of the small knob 23b corresponds to a fine adjusting operation, and the user can adjust the position on the time axis relatively finely. For example, the user can change the time, day, and month.

The above-described structure of the turn knob operation unit 23 is only an example, and may be configured in another structure, for example, as a uniaxial turn knob.

The time information display column 243 on the display screen 24 displays the time information (time, day, month, and year) input by the user by using the turn knob operation unit 23 while checking the position of the time axis cursor 242 in the time axis display column 241. When the turn knob operation unit 23 is being rotated, numerical values representing the time are sequentially displayed in the time information display column 243.

In the time information attribute display column 244 on the display screen 24, attributes indicating what the time information set by the user represents are indicated. In the time information attribute display column 244, every time the time attribute changing operation button 25a is pressed, a different attribute indicating what the time information represents is indicated and a desired attribute can be selected as time information attribute information.

As stated above, in this embodiment, the user does not have to specify time information attribute information. In this case, search is conducted under the search condition that time information set by the turn knob operation unit 23 includes all attribute information.

The time attribute changing operation button 25a can be pressed and rotated. In this structure, by pressing the time attribute changing operation button 25a, a list of time information attributes that can be displayed in the time information attribute display column 244, i.e., a list of attributes representing time information, is displayed as a pull-down menu.

Then, by rotating the time attribute changing operation button 25a, one attribute is selected from the list, and by re-pressing the time attribute changing operation button 25a, the selected attribute can be set.

In the category display column 245 on the display screen 24, the category set by the user is displayed. In the category display column 245, every time the category changing operation button 25b is pressed, a different category is displayed and a desired category can be selected.

As stated above, in this embodiment, the user does not have to specify the category. In this case, search is conducted under the search condition that time information set by the turn knob operation unit 23 includes all categories.

As in the operation of the time attribute changing operation button 25a, a list of categories may be displayed as a pull-down menu in the category display column 245, and the user can select one category from the list.

Figure 5:
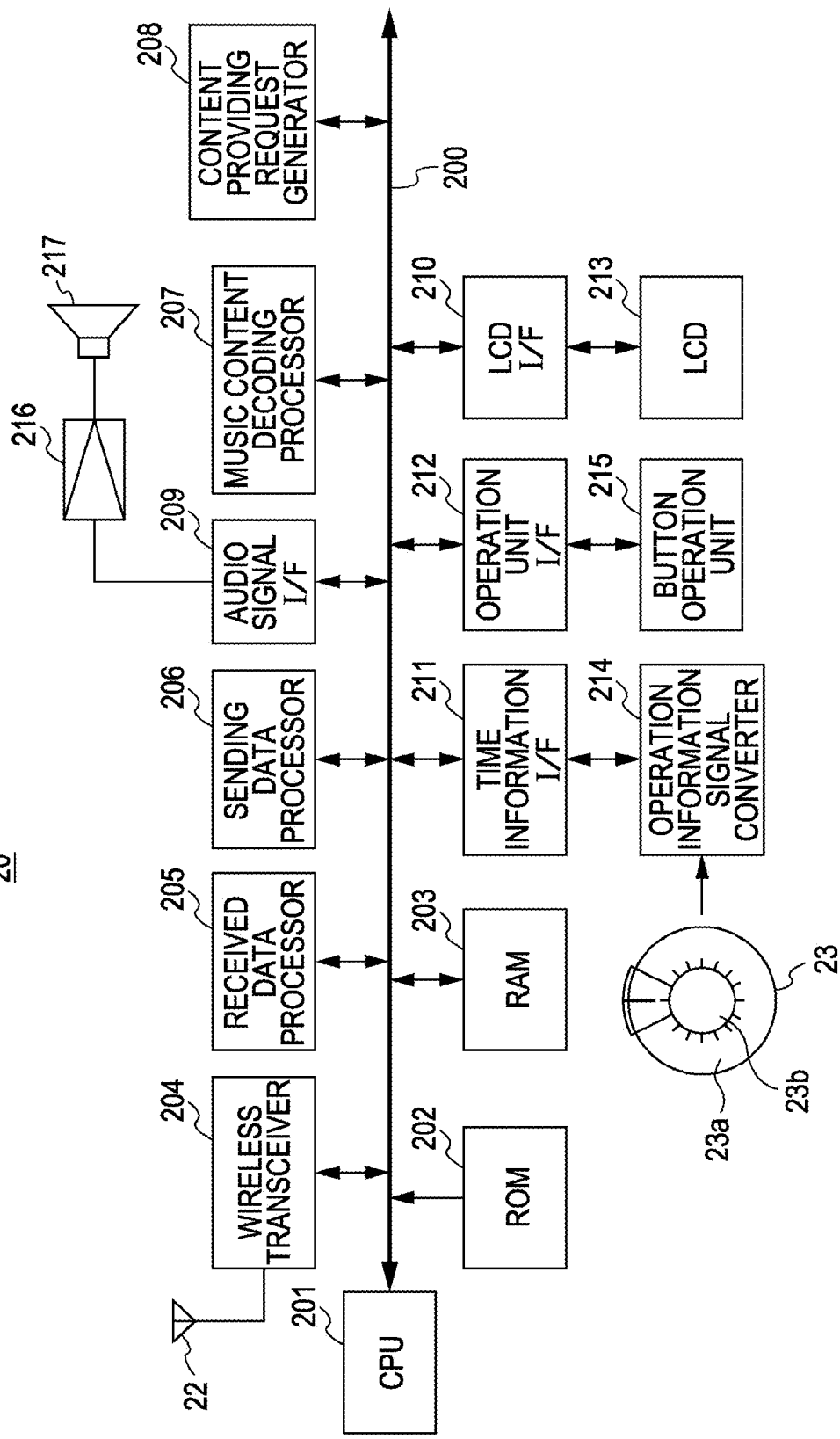
FIG. 5 is a block diagram illustrating the hardware configuration of a music content distribution server according to an embodiment of the present invention.

FIG. 5 is a block diagram illustrating the hardware configuration of the music content receiving terminal 20.

In the music content receiving terminal 20, a CPU 201 is connected, as shown in FIG. 5, through a system bus 200, to a program ROM 202, a work area RAM 203, a wireless transceiver 204, a received data processor 205, a sending data processor 206, a music content decoding processor 207, a content providing request generator 208, an audio signal interface 209, an LCD interface 210, a time information interface 211, and an operation unit interface 212.

An LCD 213 including the display screen 24 is connected to the LCD interface 210. A button operation unit 215 including the time attribute changing operation button 25a and the category changing operation button 25b is connected to the operation interface 212. The operation interface 212 supplies operation information concerning the operation performed on the time attribute changing operation button 25a or the category changing operation button 25b by the user to the system bus 200.

The operation information supplied to the system bus 200 is analyzed by the CPU 201 according to a program stored in the ROM 202, and is converted into time information attribute information or category information. The time information attribute information or the category information may indicate that neither attribute nor category has been specified. The time information attribute information or the category information is transferred to the content providing request generator 208, and is used for generating information to be included in a content providing request as information which accompanies time information.

An operation information signal converter 214 is connected to the time information interface 211. Upon receiving an operation information signal in accordance with the amount by which the large knob 23a and the small knob 23b are rotated, the operation information signal converter 214 converts the operation information signal into time information projected on the time axis. The time information interface 211 receives the converted time information from the operation information signal converter 214 and supplies it to the system bus 200. The time information is then transferred to the content providing request generator 208 under the control of the CPU 201 and is used for generating information to be included in a content providing request.

The content providing request generator 208 generates a content providing request including, as search condition information, the time information obtained from the time information interface 211 and the operation unit interface 212 and accompanying information composed of time information attribute information and category information, and supplies the generated content providing request to the sending data processor 206 under the control of the CPU 201.

The sending data processor 206 obtains a communication network address of the content distribution server 10 from the ROM 202, and converts the data to be included in the network address into a signal format that matches wireless communication to generate sending data, and then sends the generated data to the wireless transceiver 204.

The wireless transceiver 204 wirelessly transmits the sending data from the sending data processor 206 via the antenna 22, and also transfers data received by the antenna 22 to the received data processor 205.

The received data processor 205 converts received data transferred from the wireless transceiver 204 to data that can be processed by the music content receiving terminal 20, and sends the converted data to the system bus 200. The CPU 201 analyzes the received data, and if the received data is music content data, the CPU 201 transfers it to the music content decoding processor 207.

The music content decoding processor 207 decodes the music content into a digital audio signal, and supplies the decoded digital audio signal to the audio signal interface 209.

The audio signal interface 209 converts the digital audio signal into an analog audio signal, and supplies it to a speaker 217 through an audio amplifier 216 so that the audio signal can be played back.

In this embodiment, a content providing request includes information for identifying a music content decoding function provided for the music content decoding processor 207 of the music content receiving terminal 20. Then, music content that can be decoded by the music content decoding processor 207 can be received from the content distribution server 10.

Hardware Configuration of AV Content Receiving Terminal 30

Figure 6:
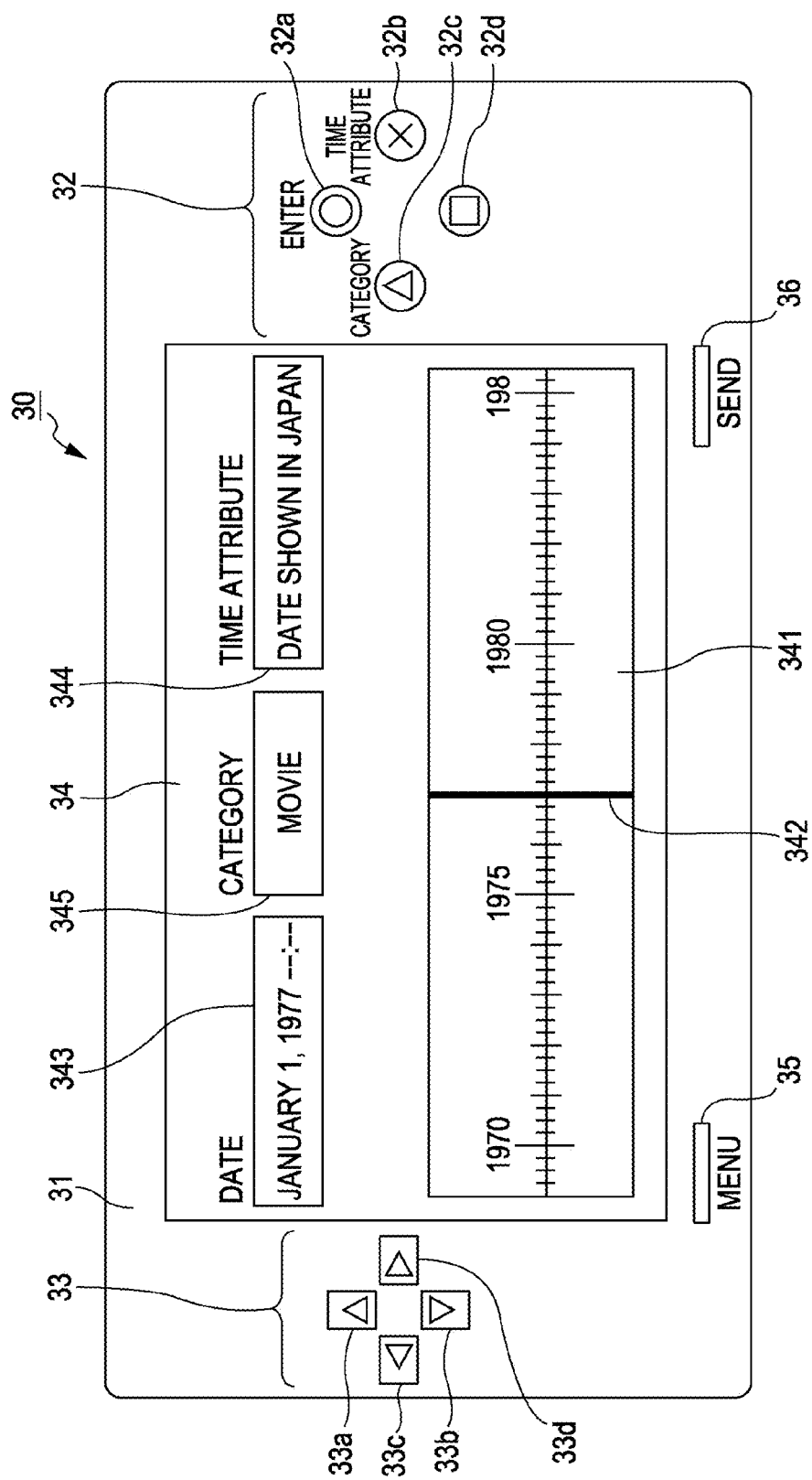
FIG. 6 illustrates an example of the operation panel of an AV content receiving terminal according to an embodiment of the present invention.

FIG. 6 is a front view illustrating the external configuration of the AV content receiving terminal 30 in this embodiment, and more specifically, an operational panel of a casing 31 of the AV content receiving terminal 30.

As stated above, the AV content receiving terminal 30 is a portable terminal having a game machine function, and has a transmission/reception antenna for connecting to a wireless network.

On the operational panel of the casing 31 of the AV content receiving terminal 30, button operation units 32 and 33, which serve as game machine operation controllers, are disposed, and also, an LCD display screen 34 is provided. In this embodiment, a menu button 35 and a send button 36 are also provided on the operational panel of the casing 31.

The button operation unit 32 includes game machine operation buttons 32a, 32b, 32c, and 32d. In this embodiment, the operation buttons 32a, 32b, 32c, and 32d are also used as operation buttons for requesting AV content. In this example, the operation buttons 32a, 32b, and 32c also serve as an enter button (setting button), time information attribute information specifying button, and a category specifying button, respectively.

The button operation unit 33 includes operation buttons 33a, 33b, 33c, and 33d for specifying directions, i.e., top, bottom, left, and right, respectively. The operation buttons 33a, 33b, 33c, and 33d are used for specifying the directions regardless of whether the AV content receiving terminal 30 is used as a game machine or used for requesting AV content. In particular, the operation buttons 33c and 33d for specifying the horizontal directions, i.e., left and right, serve as operation buttons for inputting time information.

In this embodiment, on the display screen 34 of the AV content receiving terminal 30, a time axis indicator 341, a time axis cursor 342, a time information display column 343, a time information attribute display column 344, and an AV content category display column 345 are disposed.

The time axis indicator 341 is horizontally calibrated as the time axis. In the example shown in FIG. 6, large markings are provided in five-year increments, and years are indicated for the large markings every five years. The middle markings are provided in one-year increments, and small markings are provided in three-month increments.

In FIG. 6, the time axis cursor 342 is indicated as a vertical bar, and the position of the time axis cursor 342 is horizontally shifted in the time axis direction in the time axis indicator 341 in accordance with the user operation performed on the horizontal direction specifying button 33c or 33d. In this example, the position of the time axis cursor 342 is shifted horizontally by software control in accordance with the operation performed on the horizontal direction specifying button 33c or 33d.

In this case, the time axis cursor 342 can be continuously shifted. This corresponds to a bar, which indicates a currently received frequency, in accordance with the operation of a frequency dial knob in an existing radio receiver. Accordingly, in this embodiment, the user can continuously change the date (second, minute, hour, day, month, and year) by operating the horizontal direction specifying buttons 33c and 33d.

The markings indicated on the time axis in the time axis indicator 341 are only part of the time information that can be set by the user. If the user changes the time information in the present-to-past direction when the time axis cursor 342 is located at the leftmost position of the time axis indicator 341, the markings indicated in the time axis indicator 341 are scrolled in the present-to-past direction. Similarly, if the user changes the time information in the past-to-present direction when the time axis cursor 342 is located at the rightmost position of the time axis indicator 341, the markings indicated in the time axis indicator 341 are scrolled in the past-to-present direction.

Alternatively, the time axis cursor 342 may be fixed, and the markings indicated in the time axis indicator 341 may be scrolled in accordance with the user operation on the horizontal direction specifying operation buttons 33c and 33d, thereby changing the time information.

The horizontal direction specifying operation button 33c or 33d serves as an operation input unit that allows the user to continuously change time information by operating the operation button 33c or 33d, and to input one point by stopping the operation. The operation button 33c or 33d also serves as an operation input unit that receives the point specified by the user as one point on a linear axis, which is assumed in association with the operation on the horizontal direction specifying operation button 33c or 33d.

In this example, the horizontal direction specifying operation buttons 33c and 33d are used for setting time information. Accordingly, when the user operates the operation button 33c or 33d, the AV content receiving terminal 30 recognizes that the operation performed by the user changes the position of the point on the linear axis, which is the time axis, and that a point on the time axis traced by the operation is a point while the user is setting the time information or a point set by the user on the time axis. Then, the AV content receiving terminal 30 recognizes that the point at which the user stops the operation is the point set by the user on the time axis, i.e., the point on the time information.

The time information display column 343 on the display screen 34 displays the time information (time, day, month, and year) input by the user by using the horizontal direction specifying operation buttons 33c and 33d while checking the position of the time axis cursor 342 in the time axis display column 341. When the operation button 33c or 33d is being pressed, numerical values representing the time are sequentially displayed in the time information display column 343.

In the time information attribute display column 344 on the display screen 34, attributes indicating what the time information set by the user represents are indicated. In the time information attribute display column 344, every time the operation button 32b is pressed, a different attribute indicating what the time information represents is indicated and a desired attribute can be selected as time information attribute information.

As stated above, in this embodiment, the user does not have to specify time information attribute information. In this case, search is conducted under the search condition that time information set by the horizontal direction specifying operation button 33c or 33d includes all attribute information.

By pressing the operation button 32b, a list of attributes that can be indicated in the time information attribute display column 344, i.e., a list of attributes that can be selected, may be displayed as a pull-down menu. Then, by operating the vertical direction specifying operation button 33a or 33b, one attribute may be selected from the list, and by pressing the operation button (enter key) 32a, the selected attribute may be set.

In the category display column 345 on the display screen 34, the category set by the user is displayed. In the category display column 345, every time the operation button 32c is pressed, a different category is displayed and a desired category can be selected.

As stated above, in this embodiment, the user does not have to specify the category. In this case, search is conducted under the search condition that time information set by the horizontal direction specifying operation unit 33c or 33d includes all categories.

As in the operation of the operation button 32b, a list of categories may be displayed in the category display column 345 as a pull-down menu, and the user can select one category from the list.

The menu button 35 is used for displaying a list of function modes including a game machine mode, an AV content providing request mode, and other function modes provided for the AV content receiving terminal 30 on the display screen 34. After displaying the list of function modes by pressing the menu button 35, the user operates the direction specifying buttons 33a through 33d to select the function mode to be executed in the AV content receiving terminal 30, and then, presses the operation button 33a, which serves as the enter button, to set the selected function mode.

The send button 36 is operated by the user when sending a content providing request to the content distribution server 10 in the content providing request mode.

Figure 7:
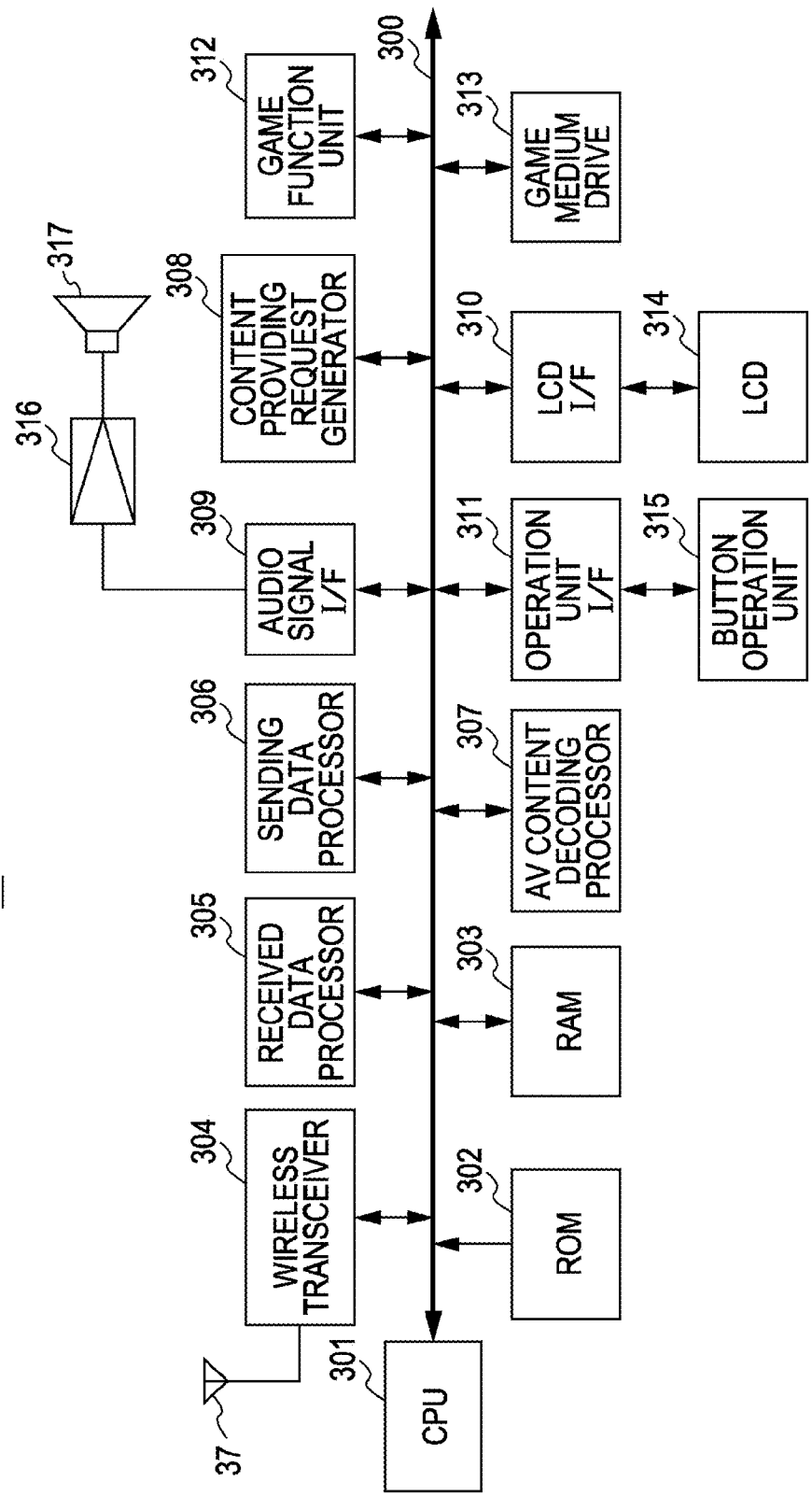
FIG. 7 is a block diagram illustrating the hardware configuration of an AV content receiving terminal according to an embodiment of the present invention.

FIG. 7 is a block diagram illustrating the hardware configuration of the AV content receiving terminal 30.

In the AV content receiving terminal 30, a CPU 301 is connected, as shown in FIG. 7, through a system bus 300, to a program ROM 302, a work area RAM 303, a wireless transceiver 304, a received data processor 305, a sending data processor 306, an AV content decoding processor 307, a content providing request generator 308, an audio signal interface 309, an LCD interface 310, an operation unit interface 311, a game function unit 312, and a game medium drive 313.

An LCD 314 including the display screen 34 is connected to the LCD interface 310. A button operation unit 315 including the operation buttons 32a through 32d, the direction specifying buttons 33a through 33d, the menu button 35, and the send button 36 is connected to the operation interface 311. The operation interface 311 detects, under the control of the CPU 301, operation information concerning which button has been operated by the user among the operation buttons 32a through 32d, the direction specifying buttons 33a through 33d, the menu button 315, and the send button 316, and supplies the detected operation information to the system bus 300.

The CPU 301 analyzes the operation information concerning the operation performed on the button operation unit 315 in accordance with a program stored in the program ROM 302, and then executes processing in accordance with the corresponding function mode.

For example, in the content providing request mode, in response to the operation on the horizontal direction specifying button 33c or 33d, the CPU 301 determines that time information has been set, and then changes the position of the time axis cursor 342 on the time axis in the time axis indicator 341 in accordance with the operation on the horizontal direction specifying button 33c or 33d, and also displays the time information associated with the time on the time axis in the time information display column 343. The CPU 301 then transfers the time information to the content providing request generator 308, and the content providing request generator 308 uses the time information for generating information included in a content providing request.

The CPU 301 also changes the display in the time information attribute display column 344 or the category display column 345 in response to the operation on the operation button 32b or 32c, respectively, and transfers the attribute information or category information (including information indicating that no attribute or category has been specified) to the content providing request generator 308 and the content providing request generator 308 uses the attribute information or category information for generating accompanying information included in a content providing request.

Under the control of the CPU 301, the content providing request generator 308 generates a content providing request including the time information and accompanying information, which is composed of the time information attribute information and category information, as search condition information, and supplies the generated content providing request to the sending data processor 306.

The sending data processor 306 obtains a communication network address of the content distribution server 10 from the program ROM 302, and converts the data to be included in the network address into a signal format that matches wireless communication to generate sending data, and then sends the generated data to the wireless transceiver 304.

The wireless transceiver 304 wirelessly transmits the sending data from the sending data processor 306 via an antenna 37, and also transfers data received by the antenna 37 to the received data processor 305.

The received data processor 305 converts received data transferred from the wireless transceiver 304 to data that can be processed by the AV content receiving terminal 30, and sends the converted data to the system bus 300. The CPU 301 analyzes the received data and transfers AV content data to the AV content decoding processor 307.

The AV content decoding processor 307 decodes the AV content data and transfers the decoded digital video data to the LCD 314 via the LCD interface 310 so that the corresponding images can be played back. The CPU 301 also transfers the decoded digital audio signal to the audio signal interface 309.

The audio signal interface 309 converts the digital audio signal into an analog audio signal, and supplies it to a speaker 317 through an audio amplifier 316 so that the audio signal can be played back.

In this embodiment, a content providing request includes information for identifying the AV content decoding function provided for the AV content decoding processor 307 of the AV content receiving terminal 30. Then, AV content that can be decoded by the AV content decoding processor 307 can be received from the content distribution server 10.

The game function unit 312 displays a game screen on the display screen 34 of the LCD 314 by using a game program or game data recorded on a game medium, for example, a CD-ROM or a DVD, installed in the game medium drive 313. The game function unit 312 changes the display of the game screen in response to the operation on the operation buttons 32 or 33 of the button operation unit 315.

Hardware Configuration of General-Purpose Content Receiving Terminal 40

As stated above, since the general-purpose content receiving terminal 40 is a personal computer, the specific hardware configuration thereof is not shown. This personal computer can access the content distribution server 10 via the Internet 52.

The general-purpose content receiving terminal 40 of this embodiment includes the functions of the music content receiving terminal 20 and the AV content receiving terminal 30 as software programs stored in a built-in ROM, and also includes functions of requesting electronic books or other types of content as software programs.

As the display screen of the general-purpose content receiving terminal 40, a display screen similar to the operation screen for requesting content in the AV content receiving terminal 30 shown in FIG. 6 is used. Then, time information can be set by using direction specifying keys provided for the keyboard of the personal computer, and the attribute of the time information or the category can also be set by performing a predetermined key operation.

Requesting other types of content, such as electronic books, by the content receiving terminal, performing processing by the content distribution server 10 in response to a content providing request, and receiving content by a content receiving terminal are similar to those when requesting and receiving AV content. However, the content requesting mode or the content distribution mode may be different in accordance with the characteristic of content.

In the case of the general-purpose content receiving terminal 40, it is necessary for the user to select the type of content to be requested. However, the user may request all types of content without specifying the type of content.

Accordingly, an operation unit for allowing the user to select the type of content and a unit (function unit) for displaying the selected type of content on the display screen are provided.

Overview of Content Requesting Operation

Concerning the operation for requesting content, several modes can be considered in accordance with the user operation for requesting content or the difference in search conditions included in a content providing request.

In a first mode, only time information is set when requesting content by the user. In this embodiment, however, a content providing request includes, not only time information set by the user, but also accompanying information as search condition information for specifying a range of content to be searched by using the time information. In the first mode, the accompanying information is automatically included in a content providing request by a content receiving terminal.

The accompanying information used for specifying a range of content and automatically contained in a content providing request by the content receiving terminal itself includes predetermined time information attribute information and/or predetermined content attribute information, such as the category. In this case, the accompanying information may be included in a content providing request in three different manners, such as including only predetermined time information attribute information, including only predetermined content attribute information, such as the category, and including both the predetermined time information attribute information and the content attribute information, such as the category.

In the above-described first mode, a content providing request is provided by a content receiving terminal dedicated for specific content, such as the music content receiving terminal 20 or the AV content receiving terminal 30, in which case, an input unit for setting time information attribute information or an input unit for setting the category, which allows the user to input specific information, is not provided for the content receiving terminal.

If the content database 11 of the content distribution server 10 stores a plurality of types of content, it is necessary for the content receiving terminal to include information for specifying a desired type of content in a content providing request as accompanying information.

On the other hand, if the content distribution server 10 is a distribution server dedicated for a specific type of content that matches the type of content dedicated for the content receiving terminal, it is not necessary for the content receiving terminal to include information for specifying a desired type of content in a content providing request as accompanying information.

Figure 8:
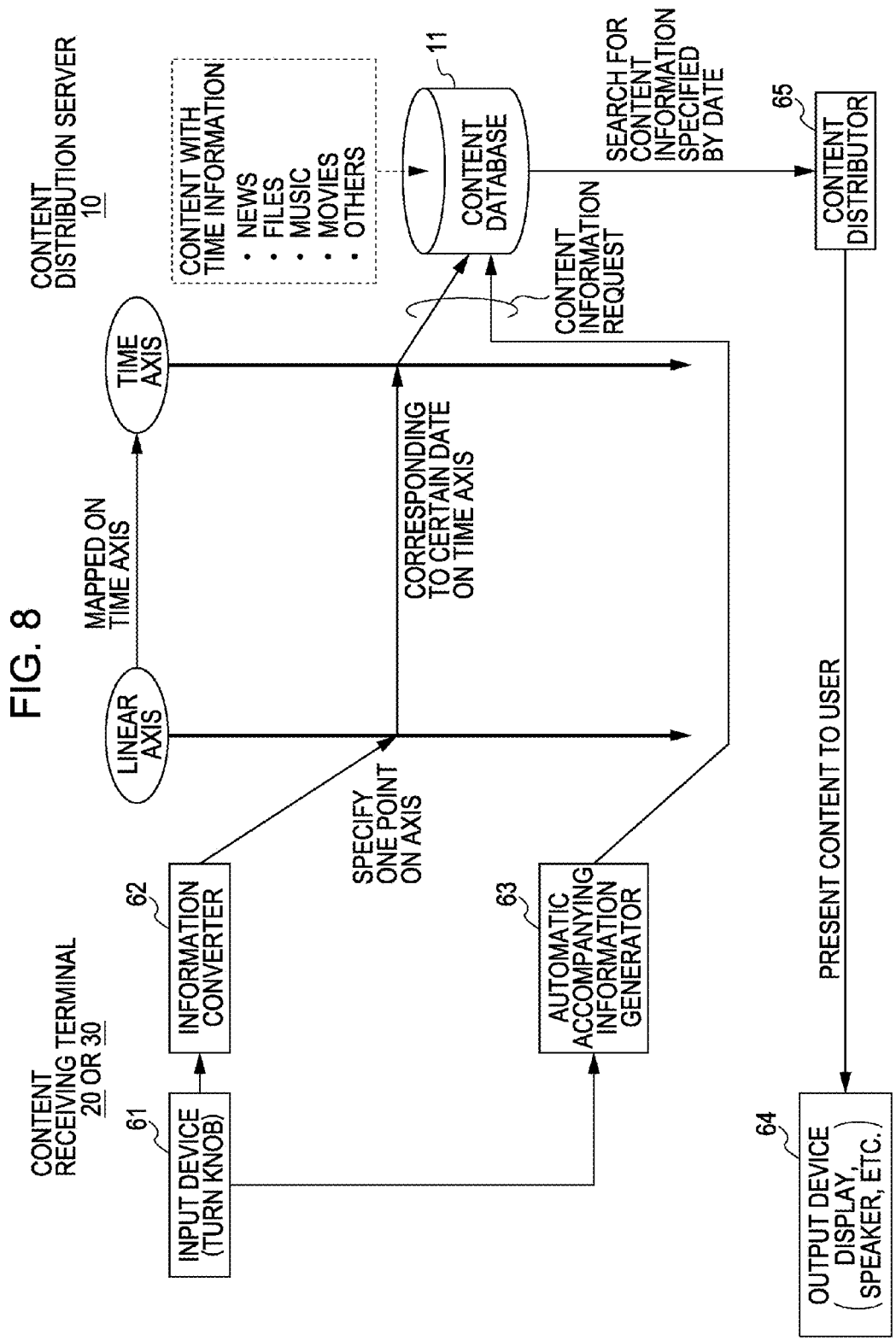
FIGS. 8 through 11 illustrate examples of content requesting operations performed by the content providing system according to an embodiment of the present invention.

FIG. 8 illustrates the concept of a request to provide content from the content receiving terminal 20 or 30 to the content distribution server 10 in the above-described first mode.

An input device 61 shown in FIG. 8 forms an input unit for setting time information, such as the turn knob operation unit 23 of the music content receiving terminal 20 or the button operation unit 33 of the AV content receiving terminal 30.

In response to time information set by the user by operating the input device 61, the CPU 201 or 301 converts operation information concerning the operation performed on the input device 61 into information indicating a point on the linear axis by using an information converter 62 having a software processing function. In this embodiment, the linear axis corresponds to the time axis, and information concerning a certain point on the linear axis is mapped onto a specific time on the time axis so that the operation input information concerning the operation performed on the input device 61 can be converted into time information. The time information is included in a content providing request, and the content providing request with the time information is then sent to the content distribution server 10.

In response to the operation performed on the input device 61, the CPU 201 or 301 automatically generates accompanying information for specifying a range of content to be searched by using the time information by using an automatic accompanying information generator 63 having a software processing function, and includes the generated accompanying information in a content providing request, and then sends the request to the content distribution server 10.

The content distribution server 10 generates search conditions based on the time information and accompanying information contained in the received content providing request, and searches the content database 11 according to the generated search conditions to extract one or a plurality of content items requested by the content receiving terminal from the content database 11.

The content distribution server 10 sends the extracted content data to the content receiving terminal by using a content distributor 65 having a software processing. The content receiving terminal then decodes the received content data and presents the decoded data to the user through an output device 64, such as a display or a speaker.

A first example of the accompanying information included in a content providing request by the content receiving terminal itself using the automatic accompanying information generator 63 is time information attribute information only, and in this case, such attribute information indicates that no time attributes are specified.

In the first example, the content distribution server 10 may determine that all time attributes are included as search conditions or that one or a plurality of specific, recommended time attributes are specified.

In this case, content attribute information, for example, the category, is not specified. The content distribution server 10 may determine that all categories are included as search conditions or that one or a plurality of specific, recommended categories is specified.

A second example of the accompanying information included in a content providing request by the content receiving terminal itself using the automatic accompanying information generator 63 is time information attribute information only, and in this case, the attribute information is predetermined, specified information, such as the date at which, for example, a certain music piece, has joined ten bests in the hit chart.

In the second example, if the content is music content, the content distribution server 10 searches the content database 11 for music pieces that have joined ten bests in the hit chart at the date specified by the time information, and distributes the matched content pieces to the content receiving terminal.

A third example of the accompanying information included in a content providing request by the content receiving terminal itself using the automatic accompanying information generator 63 is content attribute information only, and in this case, such content attribute information indicates that no content attributes are specified.

In the third example, the content distribution server 10 may determine that all content attributes are included as search conditions or that one or a plurality of specific, recommended content attributes is specified.

In this case, time information attribute information is not specified. The content distribution server 10 may determine that all time attributes are included as search conditions or that one or a plurality of specific, recommended time attributes is specified.

A fourth example of the accompanying information included in a content providing request by the content receiving terminal itself using the automatic accompanying information generator 63 is both the time information attribute information and content attribute information, and in this case, such information indicates that neither of time attributes nor content attributes are specified.

In this case, the content distribution server 10 may conduct search in a manner similar to that described above in the first or third example.

A fifth example of the accompanying information included in a content providing request by the content receiving terminal itself using the automatic accompanying information generator 63 is both the time information attribute information and content attribute information, and in this case, one of the attribute information indicates that no attributes are specified, and the other attribute information is predetermined, specified attribute information.

For the unspecified attribute information, the content distribution server 10 may conduct search in a manner similar to that described above in the first, third, or fourth example.

A sixth example of the accompanying information included in a content providing request by the content receiving terminal itself using the automatic accompanying information generator 63 is both the time information attribute information and content attribute information, and in this case, both the time information attribute information and the content attribute information are predetermined, specified information.

In the sixth example, content distribution under very restricted search conditions is assumed, such as requesting one or a plurality of content items specified by the predetermined, specified time information.

In a second mode, not only time information, but also time information attribute information is input or selectively input when requesting content by the user. In the above-described content receiving terminals, time information attribute information can be input only by selecting from predetermined attributes by the user. However, the user can input specific text as the time information attribute information. The same applies to the input of content attribute information, such as the category. This can be easily performed particularly in the general-purpose content receiving terminal 40.

The time information attribute information set by the user is included in a content providing request as accompanying information for specifying a range of content to be searched by using time information.

In the second mode, as well as the first mode, the type of content is not input. Accordingly, in the second mode, content is requested by a content receiving terminal dedicated for specific content, such as the music content receiving terminal 20 or the AV content receiving terminal 30. In this case, an input unit (content attribute input unit) for inputting the category by the user is not provided for the content receiving terminal.

In the second mode, if it is not necessary to include content attribute information or information indicating the type of content in a content providing request as accompanying information, the automatic accompanying information generator 63 provided in the first mode is not necessary.

However, if the content database 11 of the content distribution server 10 stores a plurality of types of content, as stated above, it is necessary for the content receiving terminal to include information for specifying the type of content in a content providing request as accompanying information. Thus, information for specifying the type of content is generated in the automatic accompanying information generator 63 and is included in a content providing request as the accompanying information.

As in the first mode, it is not always necessary that the content attribute, such as the category, be included as accompanying information. In this case, the content distribution server 10 may determine that no content attributes are specified, and conducts search by assuming that all categories are included or only a specific, recommended category is specified.

Predetermined content attribute information (may indicate that no content attributes are specified), such as the category, may be generated in the automatic accompanying information generator 63, and is included in a content providing request as accompanying information.

Figure 9:
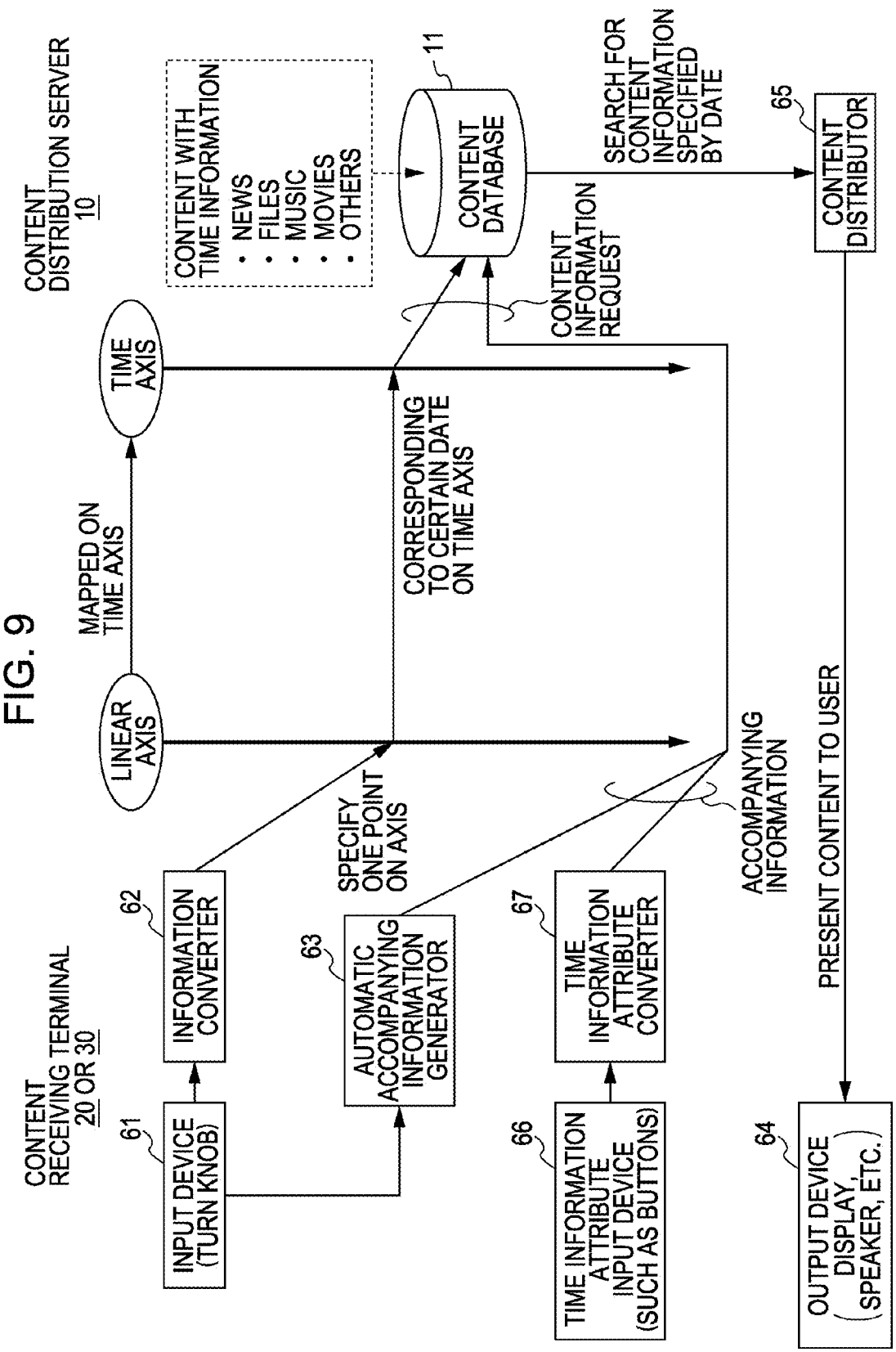

FIG. 9 illustrates the concept of a request to provide content from the content receiving terminal 20 or 30 to the content distribution server 10 in the above-described second mode. In FIG. 9, elements corresponding to those in FIG. 8 are designated with like reference numerals.

In FIG. 9, the content receiving terminal includes a time information attribute input device 66, which is formed of the time attribute changing operation button 25*a* of the music content receiving terminal 20 shown in FIG. 4 or the operation button 32*b* of the AV content receiving terminal 30 shown in FIG. 6.

Then, in the content receiving terminal, in response to the input operation by the user through the time information attribute input device 66, a time information attribute converter 67, which serves as a software function processor, converts attribute information in accordance with the input operation. This corresponds to the operation for setting the time information attribute information in response to the operation performed on the time attribute changing operation button 25*a* or the operation button 32*b*.

Then, the time information attribute information output from the time information attribute converter 67 is included, together with another type of accompanying information output from the automatic accompanying information generator 63, if it is provided at all, in a content providing request as accompanying information, and the content providing request is then sent to the content distribution server 10.

As discussed above, the second mode is similar to the first mode, except that time information attribute information is set by the user. Also, in the second mode, the automatic accompanying information generator 63 may not be provided.

In a third mode, not only time information, but also content attribute information is input or selectively input when requesting content by the user. The content attribute information input by the user is included in a content providing request as accompanying information for specifying a range of content to be searched by using time information.

As in the first or second mode, in the third mode, the type of content is not input. Accordingly, in the third mode, content is requested by a content receiving terminal dedicated for specific content, such as the music content receiving terminal 20 or the AV content receiving terminal 30. In the third mode, an input unit (content attribute input unit) for inputting time information attribute information by the user is not provided for the content receiving terminal.

In the third mode, if it is not necessary to include time information attribute information or information indicating the type of content in a content providing request as accompanying information, the automatic accompanying information generator 63 provided in the first mode is not necessary.

However, if the content database 11 of the content distribution server 10 stores a plurality of types of content, as stated above, it is necessary for the content receiving terminal to include information for specifying the type of content in a content providing request as accompanying information. Thus, information for specifying the type of content is generated in the automatic accompanying information generator 63 and is included in a content providing request as the accompanying information.

As in the first mode, it is not always necessary that the time information attribute information be included as accompanying information. In this case, the content distribution server 10 may determine that no time attributes are specified, and conducts search by assuming that all time attributes are included or only a specific, recommended time attribute is specified.

Predetermined time information attribute information (may indicate that no time attributes are specified) may be generated in the automatic accompanying information generator 63, and is included in a content providing request as accompanying information.

Figure 10:
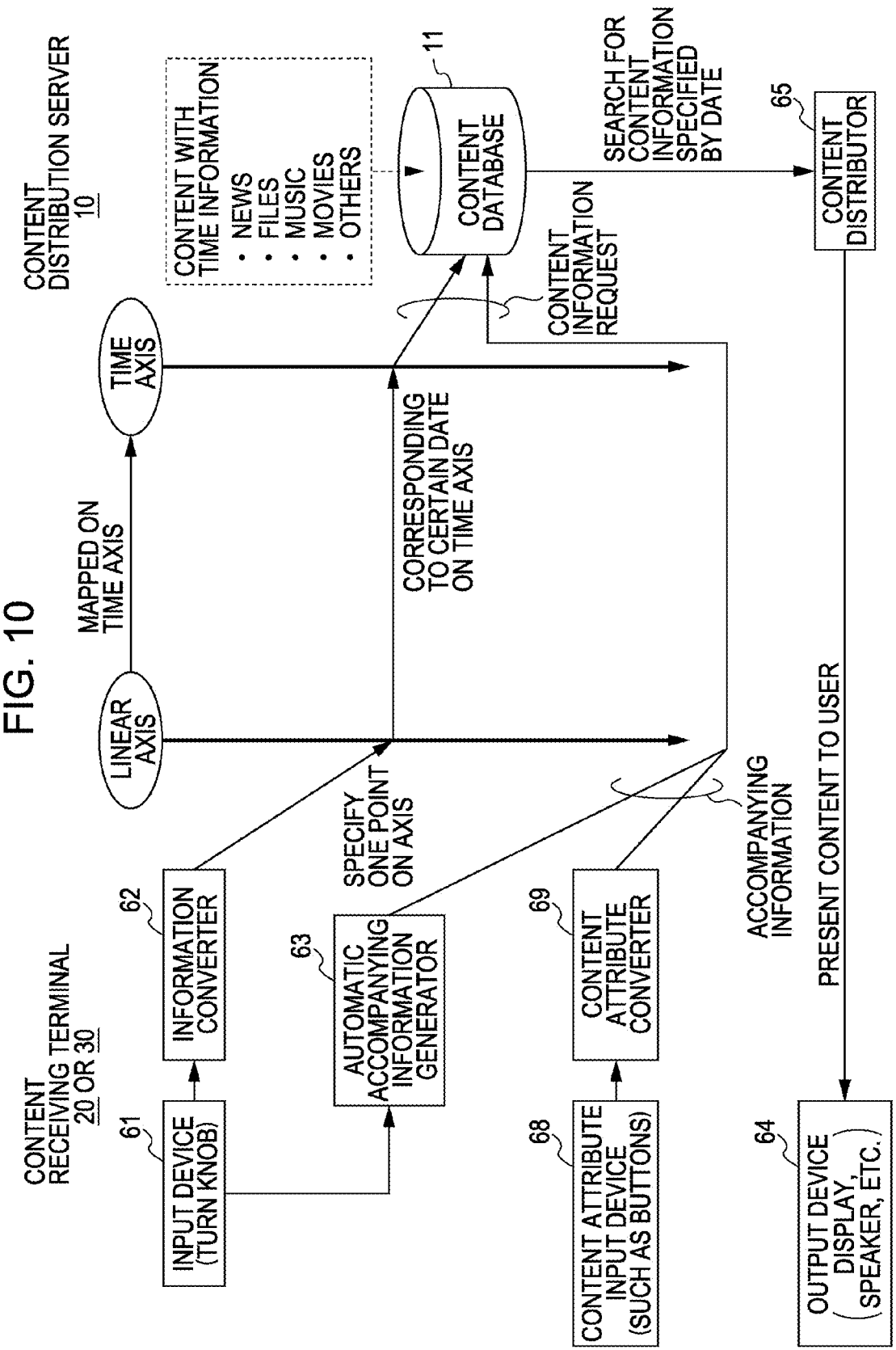

FIG. 10 illustrates the concept of a request to provide content from the content receiving terminal 20 or 30 to the content distribution server 10 in the above-described third mode. In FIG. 10, elements corresponding to those in FIG. 8 are designated with like reference numerals.

The content receiving terminal includes a content attribute input device 68, which is formed of the category changing operation button 25*b* of the music content receiving terminal 20 shown in FIG. 4 or the operation button 32*c* of the AV content receiving terminal shown in FIG. 6.

Then, in the content receiving terminal, in response to the input operation by the user through the content attribute input device 68, a content attribute converter 69, which serves as a software function processor, converts content attribute information in accordance with the input operation. This corresponds to the operation for setting the content attribute information in response to the operation performed on the category changing operation button 25*b* or the operation button 32*c*.

Then, the content attribute information output from the content attribute converter 69 is included, together with another type of accompanying information output from the automatic accompanying information generator 63, if it is provided at all, in a content providing request as accompanying information, and the content providing request is then sent to the content distribution server 10.

As discussed above, the third mode is similar to the first mode, except that content attribute information is set by the user. Also, in the third mode, the automatic accompanying information generator 63 may not be provided.

In a fourth mode, not only time information, but also time information attribute information and content attribute information are input or selectively input when requesting content by the user. The time information attribute information and content attribute information input by the user are included in a content providing request as accompanying information for specifying a range of content to be searched by using time information.

As in the first, second, or third mode, in the fourth mode, the type of content is not input. Accordingly, in the fourth mode, a request to provide content is made from a content receiving terminal dedicated for specific content, such as the music content receiving terminal 20 or the AV content receiving terminal 30. In the fourth mode, an input unit for inputting time information by the user and an input unit (content attribute input unit) for inputting the category by the user are provided for the content receiving terminal.

In the fourth mode, if it is not necessary to include information indicating the type of content in a content providing request as accompanying information because the content distribution server 10 is a server dedicated for content that matches the content dedicated for the content receiving terminal, the automatic accompanying information generator 63 provided in the first mode is not necessary.

However, if the content database 11 of the content distribution server 10 stores a plurality of types of content, as stated above, it is necessary for the content receiving terminal to include information for specifying the type of content in a content providing request as accompanying information. Thus, information for specifying the type of content is generated in the automatic accompanying information generator 63 and is included in a content providing request as the accompanying information.

Figure 11:
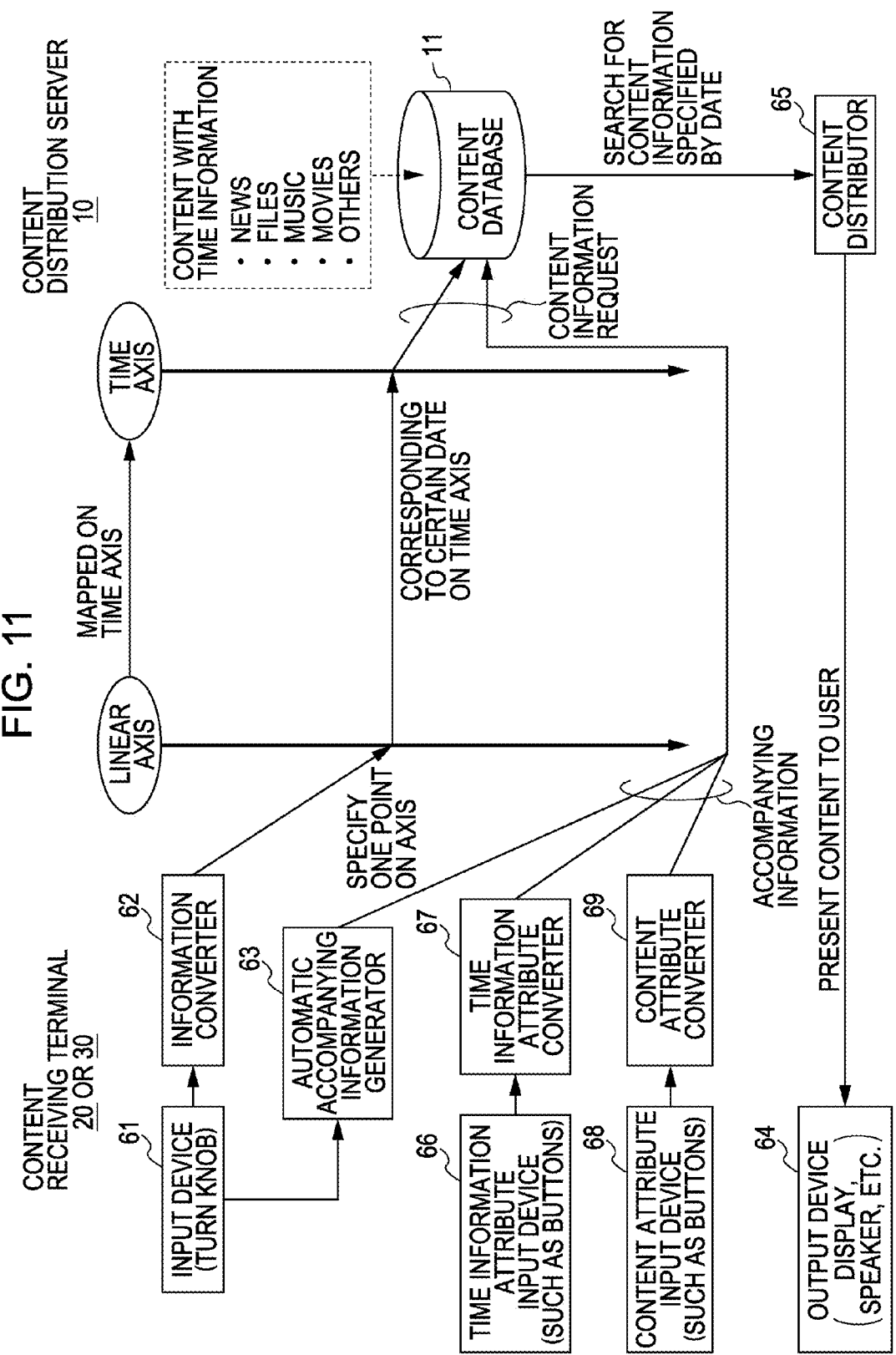

FIG. 11 illustrates the concept of a request to provide content from the content receiving terminal 20 or 30 to the content distribution server 10 in the above-described fourth mode. In FIG. 11, elements corresponding to those in FIGS. 8 through 10 are designated with like reference numerals.

In FIG. 11, the content receiving terminal includes the time information attribute input device 66, the time information attribute converter 67, the content attribute information input device 68, and the content attribute converter 69. This configuration is similar to that of the music content receiving terminal 20 shown in FIG. 4 or the AV content receiving terminal 30 shown in FIG. 6.

The operations of the individual elements have been discussed above, and a detailed explanation is thus omitted here. In the fourth mode, a content providing request includes time information attribute information and content attribute information (such information may indicate that no time attributes or no content attributes are specified) as accompanying information for specifying a range of content to be searched by using time information. Then, the content distribution server 10 searches the content database 11 under search conditions determined based on the time information and accompanying information, and then sends content data to the content receiving terminal as a search result.

In a fifth mode, content is requested from the general-purpose content receiving terminal 40. That is, in the fifth mode, a content providing request is sent from the content receiving terminal 40, assuming that a plurality of types of content are stored in the content database 11 of the content distribution server 10. Accordingly, it is necessary for the user to input or selectively input, not only time information, but also the type of content when requesting content.

Accordingly, in the fifth mode, various modifications can be considered, in which an input unit for inputting the type of content is provided for the content receiving terminal in each of the first mode through the fourth mode discussed with reference to FIGS. 8 through 11 and information concerning the type of content input by the input unit is included in a content providing request as accompanying information.

The operations in the various modifications of the fifth mode are similar to those of the first through fourth modes, except that the type of content is input (including a case where the type of content is not specified) and is included in accompanying information. Thus, a detailed explanation of such operations is omitted here.

The address of a content receiving terminal is contained in a content providing request as the sender address, though it is not shown in FIGS. 8 through 11. The content distribution server 10 distributes content data to the received address as the content destination address. The content providing request may include information concerning the decoding function provided for the content receiving terminal.

Content Distribution Modes

As discussed above, the content distribution server 10 distributes content in a different manner depending on the type of content, i.e., music content or AV content, such as movie content. Several distribution modes employed in the content distribution server 10 are described below.

Figure 12:
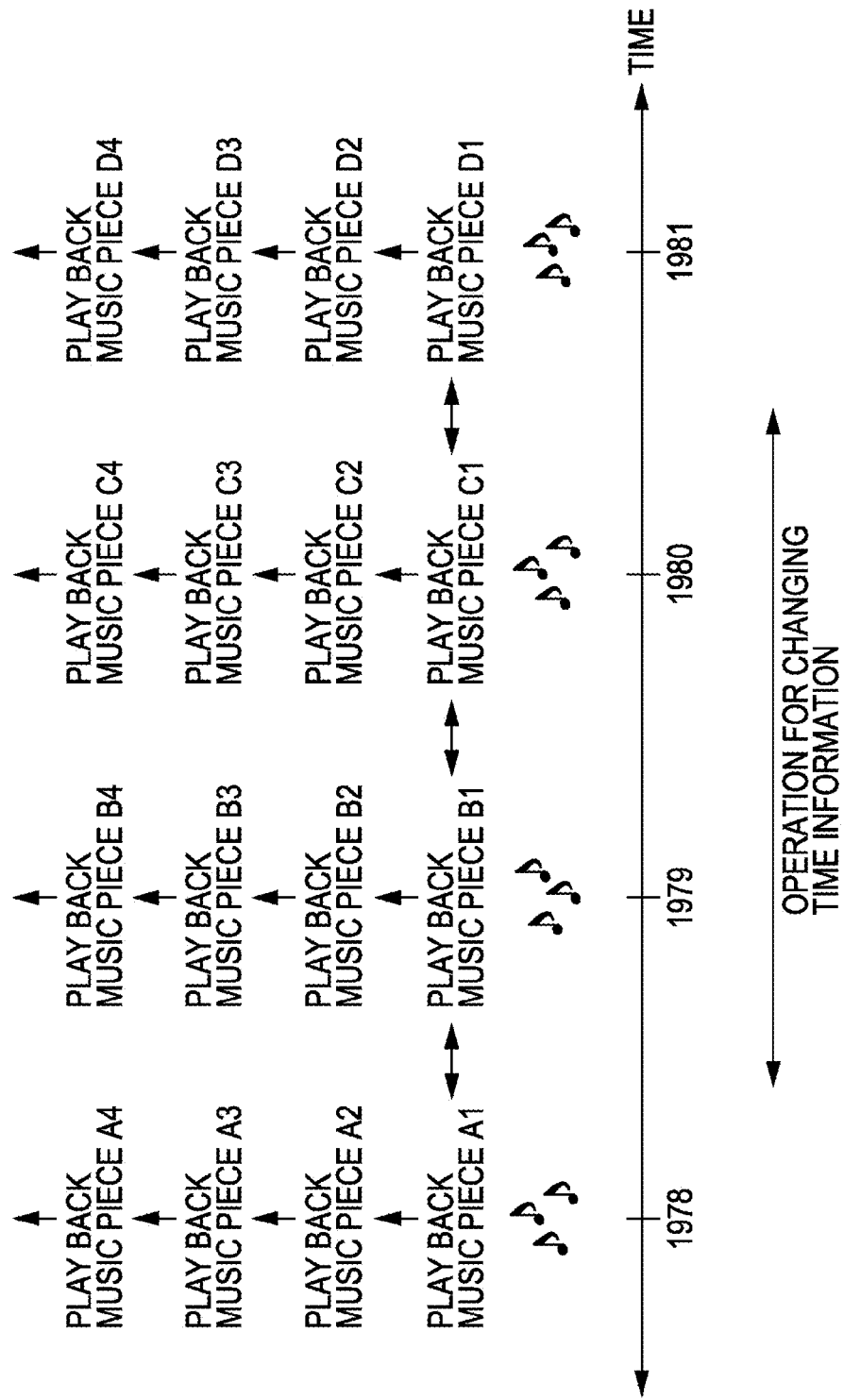
FIGS. 12 through 19 illustrate examples of content distribution modes of the content providing system according to an embodiment of the present invention.

FIG. 12 illustrates the concept of a first distribution mode in which the content distribution server 10 distributes content to the music content receiver 20.

As discussed above, the user can sequentially change the time information along the time axis by using, for example, the turn knob operation unit 23. In this case, if information concerning all time positions on the time axis traced by the operation is sent to the content distribution server 10 as content providing requests as if the user were changing the reception frequency by using the frequency dial of a radio receiver, content items that are not desired by the user are sent to the user.

Accordingly, in this embodiment, the content receiving terminal sends a content providing request to the content distribution server 10 only when it determines that the user is likely to request content. Thus, a specifying operation determining unit is provided for the content receiving terminal to determine by software processing whether the user intends to specify one point on the linear axis by the operation performed on the operation input unit, such as the turn knob operation unit 23.

In this embodiment, when the user suspends the operation for changing the time information for a predetermined period of time by using the turn knob operation unit 23, the specifying operation determining unit determines that the user intends to specify one point on the linear axis, i.e., the user intends to request content by specifying time information.

When the specifying operation determining unit determines that the user has specified one point on the linear axis, the content receiving terminal sends a content providing request to the content distribution server 10 by including the time information specified by the user in the request. It is possible that the specifying operation determining unit may be omitted by providing a content providing request unit (such as a send button) in addition to the time information input unit. In this case, however, the operation becomes complicated. Accordingly, in this embodiment, the specifying operation determining unit is provided.

As stated above, for example, by the integral operation of the large knob 23a and the small knob 23b of the turn knob operation unit 23, the time information can be roughly specified by, for example, the years. An example of the first distribution mode in this case is shown in FIG. 12.

It is now assumed, for example, that the time information is changed for specifying the year 1978 and that a content providing request including that time information is sent to the content distribution server 10. Then, the content distribution server 10 recognizes that the time information specifies the year 1978, and searches the content database 11 according to search conditions determined based on the time information and accompanying information contained in the content providing request, and then sequentially sends music pieces A1, A2, A3, A4, and so on, to the music content receiving terminal 20 as a search result.

Then, as stated above, in the first distribution mode, the music content receiving terminal 20 performs stream playback on the music pieces sent from the content distribution server 10. The content distribution server 10 sends the entire content data of music piece A1 to the music content receiving terminal 20, and then, starts sending content data of the subsequent music piece A2. Accordingly, in the music content receiving terminal 20, after stream playback of one music piece is finished, stream playback of the next music piece is started from the head. This is as if music pieces in the specified year were distributed and played back by radio broadcasting.

Music pieces A1, A2, A3, A4, and so on, shown in FIG. 12, sequentially played back as a search result are only examples of music pieces sequentially played back, and are not fixed music pieces. Instead, music pieces A1, A2, A3, A4, and so on, are randomly changed every time the content distribution server 10 receives a content providing request. The same applies to music pieces B1, B2, B3, B4, and so on, C1, C2, C3, C4, and so on, and D1, D2, D3, D4, and so on, in the specified other years as search results.

If the user operates the turn knob operation unit 23 to specify another year, for example, 1979, while listening to the music piece A1 in 1978 received from the content distribution server 10, a new content providing request including the time information specified by 1979 is sent to the content distribution server 10. Then, the content distribution server 10 suspends the distribution of the music piece A1 and starts distributing music piece B1 as a search result.

Accordingly, in response to the operation on the turn knob operation unit 23, the music content receiving terminal 20 can change stream playback from music piece A1 to music piece B1. Accordingly, the user can change years by suspending the rotation operation at the positions corresponding to the desired years through the turn knob operation unit 23 for a predetermined period of time. With this operation, the user can change the years while listening to the heads of the music pieces.

Although changing the time information has been discussed in the context of changing the year, the time, day, month may be specified as time information by operating only the small knob 23b of the turn knob operation unit 23. That is, time information can be specified in greater details, and content that matches the search conditions can be obtained. In this case, as stated above, if a plurality of items of content are obtained, stream playback is performed on the content items.

Although the distribution of music content has been discussed by way of example, other types of content, such as AV content and electronic book content, may be distributed in the first distribution mode.

In the first distribution mode, while listening to one piece of content, it is difficult for the user to listen to another piece of content specified by the same time information, such as the same year, until playback of the first piece of content has finished. In a second distribution mode, this drawback has been overcome.

In the second distribution mode, the content receiving terminal is provided with an operation unit for requesting next music content to be distributed after a currently receiving music content. For example, a next button 25c shown in FIG. 13 is provided for the music content receiving terminal 20.

In the second distribution mode, the user inputs time information to send a content providing request to the content distribution server 10, and the content distribution server 10 returns content data to the content receiving terminal as a search result, as in the first distribution mode.

Unlike the first distribution mode, however, in the second distribution mode, the content distribution server 10 can receive a next content providing request from the content receiving terminal even if the distribution of a predetermined content piece to the content receiving terminal has not finished.

Figure 13:
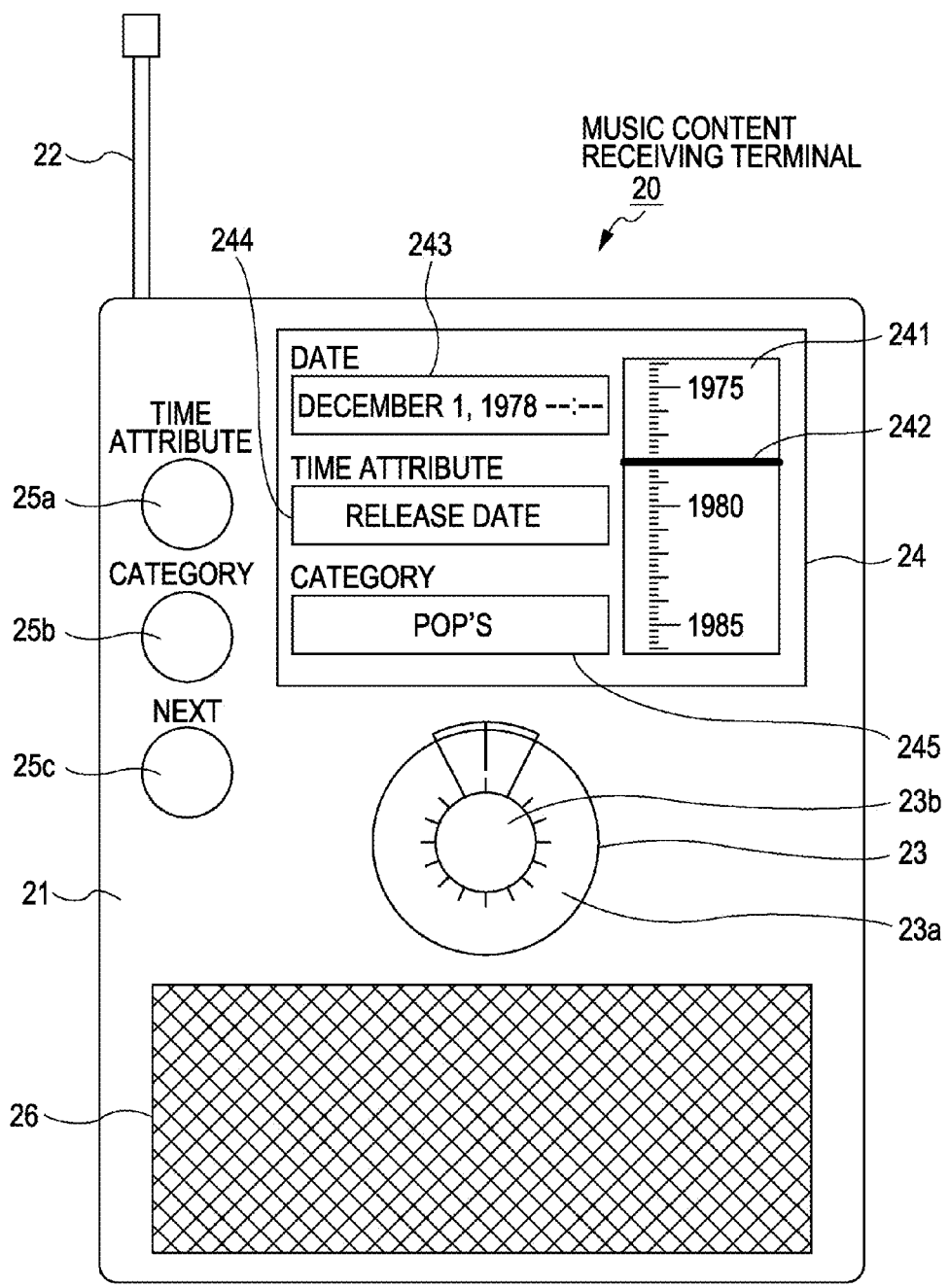

In the music content receiving terminal 20 shown in FIG. 13, when the user of the music content receiving terminal 20 operates the next button 25c while receiving predetermined music content from the content distribution server 10, the music content receiving terminal 20 can send a request to provide next content to the content distribution server 10.

In response to this request, the content distribution server 10 suspends the distribution of the current content and starts distributing the next content. For example, in FIG. 12, in response to a request to send next content from the content receiving terminal while receiving music piece A1, the content distribution server 10 suspends the distribution of music piece A1 and starts distributing the next music piece A2.

In the second distribution mode, the user can request the distribution (playback) of next content by stopping the distribution (playback) of content that the user does not wish to listen to by operating the next button 25c. As a result, the user can select and listen to only his/her favorite content.

In the second distribution mode, content to be distributed is not restricted to music content. For example, in the case of AV content, if the user starts watching part of AV content and does not wish to watch the content any more, he/she can request the distribution of next AV content by operating the next button 25c.

In the above-described example, the content distribution server 10 sends next content when receiving a request based on the operation performed on the next button 25c. Alternatively, the content distribution server 10 may randomly select a content piece from a plurality of content pieces and distributes the selected content.

Unlike the first and second distribution modes, in a third distribution mode, in response to a content providing request, content is distributed by provisional distribution and final distribution. Then, in the provisional distribution, instead of sending all content pieces, which is performed in the first distribution mode, the content distribution server 10 sends only part of prepared content pieces, together with identification information for identifying each content piece, to the user.

In the third distribution mode, for example, music pieces A1, A2, A3, A4, and so on, shown in FIG. 12 are part of prepared content items, which are preferably characteristic portions of music pieces, for example, introductions or highlight portions. Accordingly, playback of each music piece A1, A2, A3, A4, and so on, is finished for relatively a short period of time, and then, playback of a next music piece is started.

Then, the content receiving terminal receives a final distribution request from the user while the provisional distribution is being conducted, and sends the final distribution request to the content distribution server 10. That is, the user watches or listens to part of content pieces provided in the provisional distribution and selects content to be provided by final distribution, and then requests the distribution of the selected content.

Accordingly, in the third distribution mode, an operation input unit, such as a final distribution button (including a software button), is provided for the content receiving terminal. When the user operates the final distribution button while the provisional distribution is being conducted, content to be provided by final distribution is selected, and the distribution of the selected content by final distribution is requested.

In the third distribution mode, if the content receiving terminal determines that the final distribution button has been operated while the provisional distribution is being conducted, it generates final distribution request information including identification information concerning the content which is being received by provisional distribution when the final distribution button is operated, and then sends the final distribution request information to the content distribution server 10.

Upon receiving final distribution request information from the content receiving terminal while conducting provisional distribution, the content distribution server 10 suspends the provisional distribution and distributes the content data specified by the identification information contained in the final distribution request information to the content receiving terminal.

As in the second distribution mode, in the third distribution mode, a next button may be provided. In this case, when the content receiving terminal sends a next distribution request to the content distribution server 10 through the operation on the next button by the user, the content distribution server 10 starts distributing part of the next content to be distributed by provisional distribution even if the provisional distribution of current content is not finished.

In the third distribution mode, if the content receiving terminal includes a display screen, images of content items may be sent as auxiliary information together with part of the content distributed by provisional distribution, thereby assisting the user to request content by final distribution. In the case of music content, for example, images of record jackets or CD jackets, such as those shown in FIG. 14, may be sent from the content distribution server 10 to the content receiving terminal, and then, the content receiving terminal can sequentially scroll the jacket images in accordance with the playback order in provisional distribution.

Figure 14:
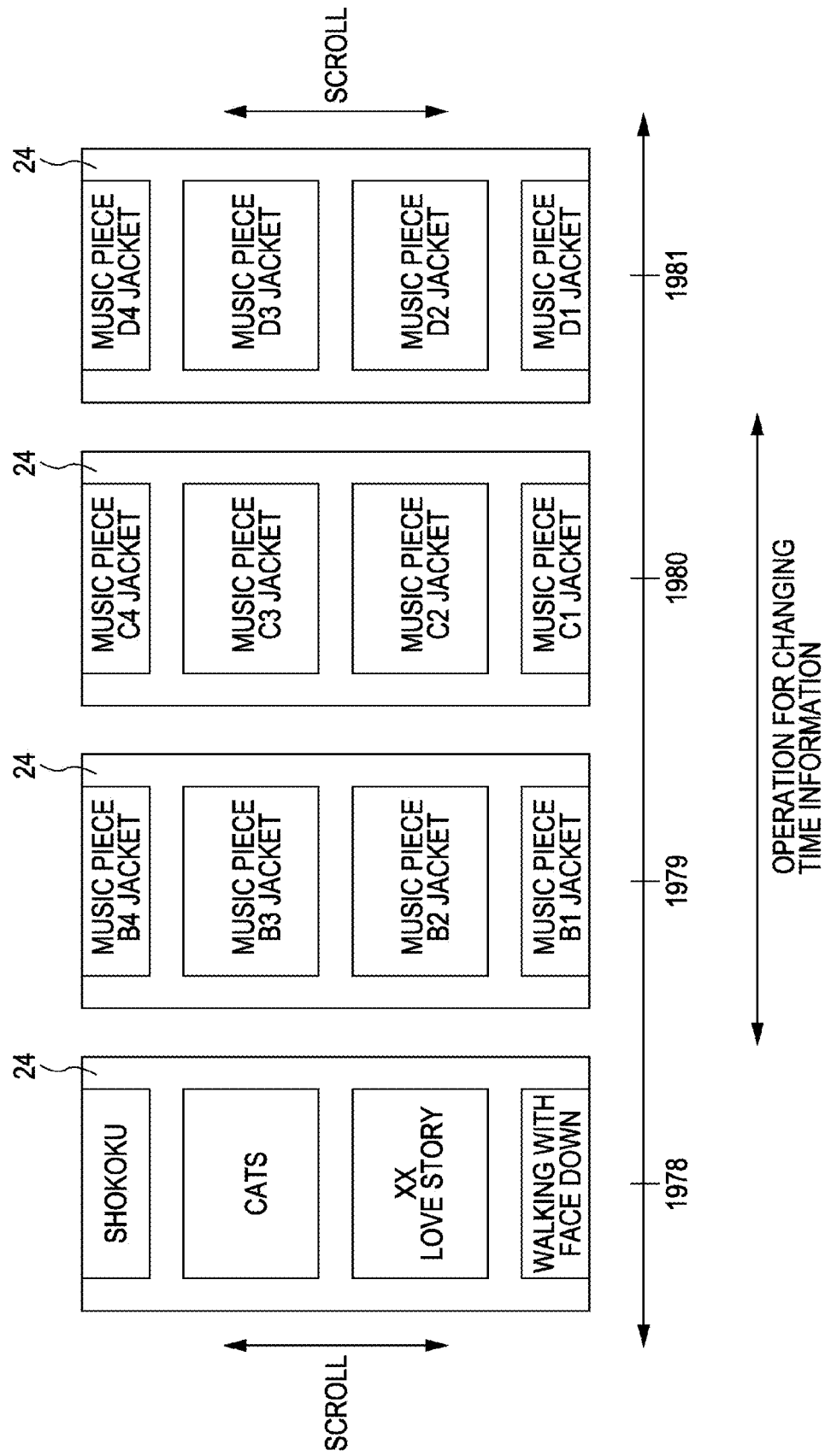

In the example shown in FIG. 14, the jacket images are displayed, for example, in the time axis indicator 241 on the display screen 24 of the music content receiving terminal 20. When sending a final distribution request, the jacket images disappear, and then, the display of the time axis indicator 241 is resumed.

The type of content to be distributed in the third distribution mode is not restricted to music content, and may be other types of content, such as AV content and electronic book content. In the case of AV content, several characteristic scenes can be extracted and played back in the provisional distribution. In the case of electronic book content, the first page or the first and second pages of a book can be distributed in the provisional distribution.

As the auxiliary information for assisting the user to select content in final distribution, such as record jackets or CD jacket for music content, cassette tape jackets, DVD jackets, or characteristic scene thumbnails may be used for AV content, or the cover of a book in paper form corresponding to an electronic book may be used for electronic book content.

In the third distribution mode, when presenting part of content to the user in provisional distribution, fast speed playback, such as at ×1.2, ×1.5, or ×2.0, may be performed instead of normal speed playback.

In a fourth distribution mode, content is also distributed by provisional distribution and final distribution. In the fourth distribution mode, content other than music content, such as AV content, is received from the content distribution server 10. Details of such a distribution mode are described below.

In provisional distribution of the fourth distribution mode, in response to a content providing request from the content receiving terminal 30 or 40, the content distribution server 10 searches the content database 11 to generate a list of content including at least one content item obtained from the content database 11 as a search result, and sends the list to the content receiving terminal 30 or 40.

The content receiving terminal 30 or 40 receives the data by provisional distribution from the content distribution server 10, and displays the content list on the display screen, and then instructs the user to input a final distribution request. Examples of lists displayed on the display screen 34 of the content receiving terminal 30 when receiving content by provisional distribution are shown in FIGS. 15 through 19.

Figure 15:
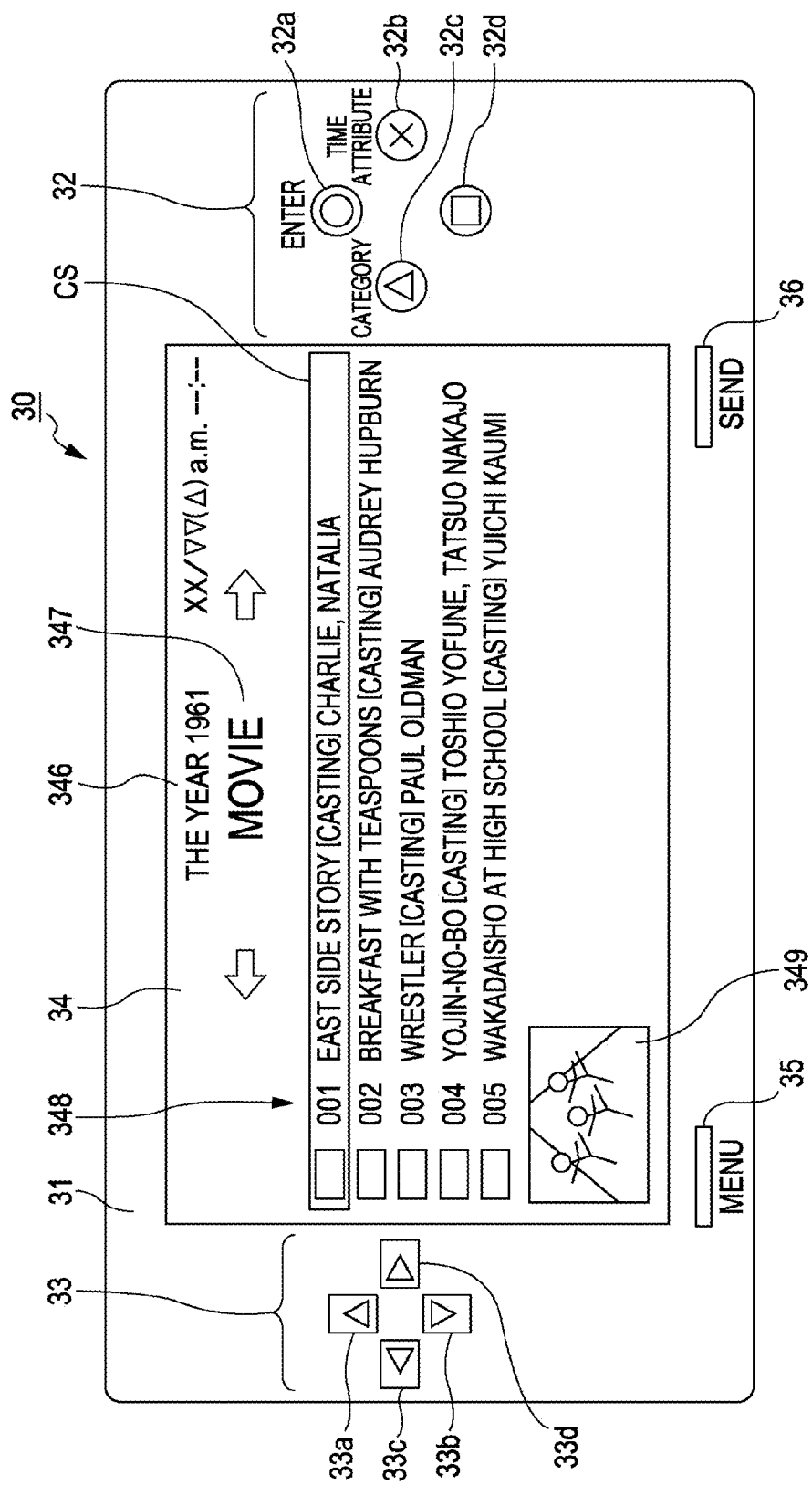
Figure 16:
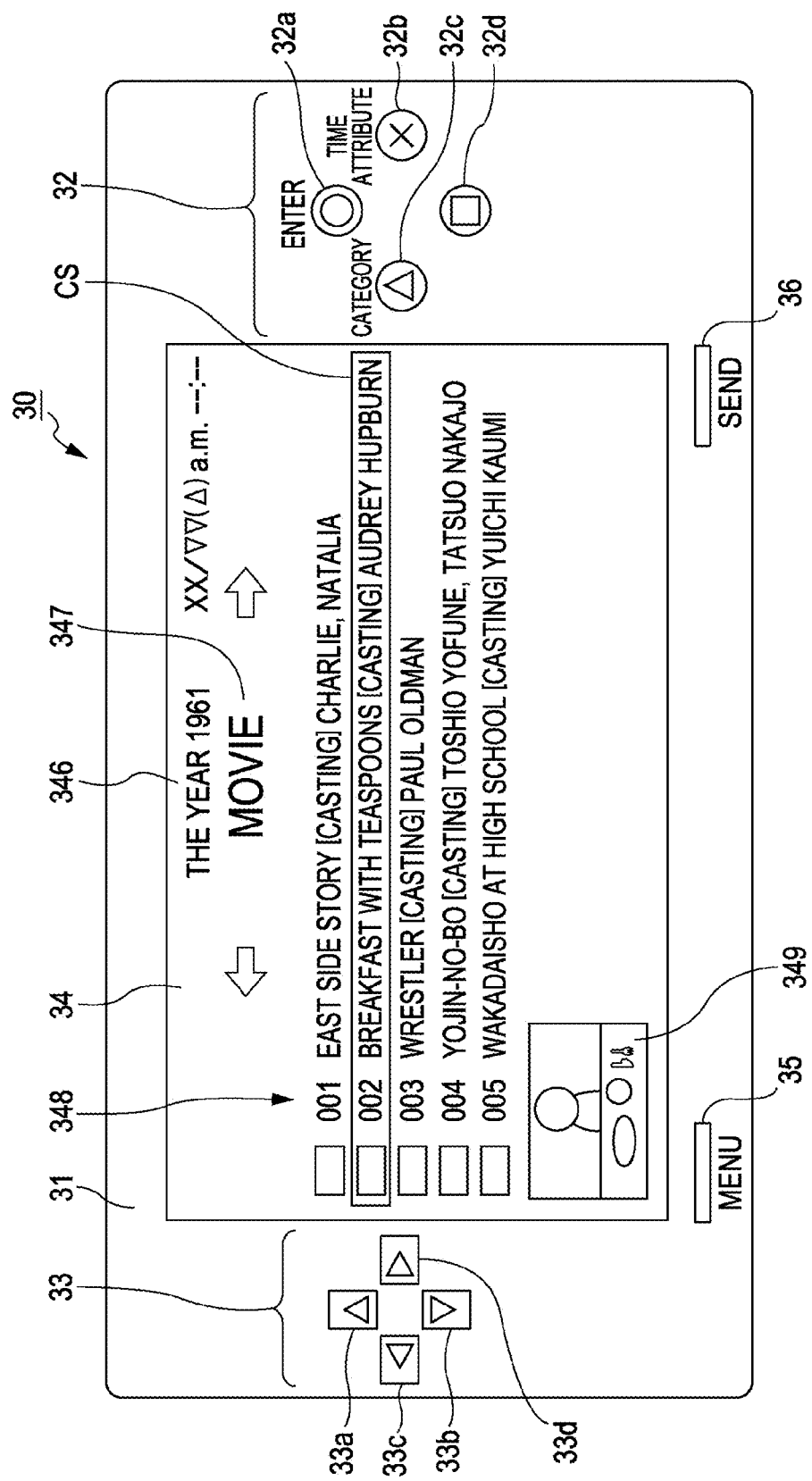
Figure 17:
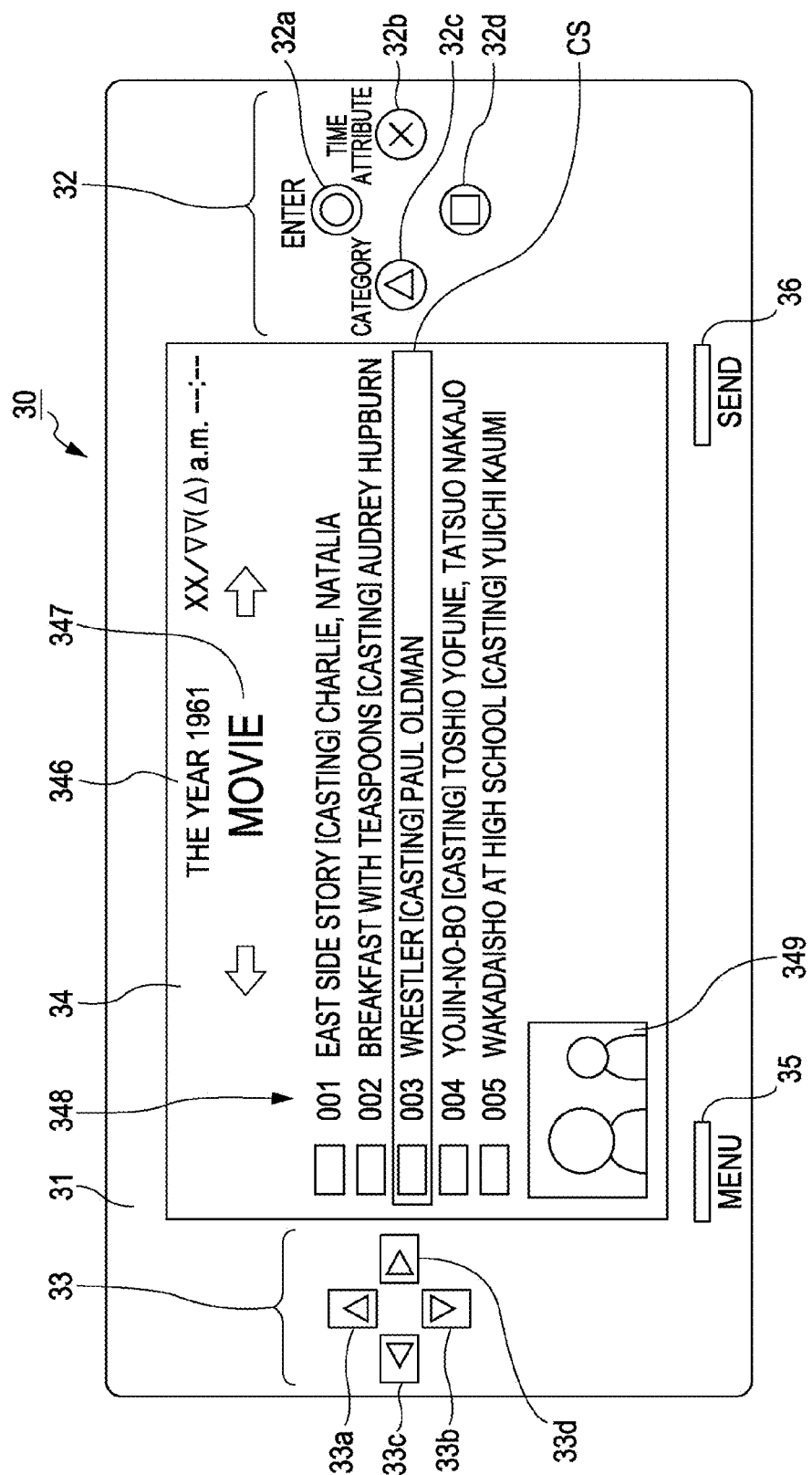

FIGS. 15 through 17 illustrate an example of a list displayed on the display screen 34 of the content receiving terminal 30 when receiving content by provisional distribution in response to a content providing request sent from the content receiving terminal 30 to the content distribution server 10 by specifying the year 1961 as time information and the movie as the category.

On the display screen 34, instead of the time axis indicator 341 for requesting content, such as that shown in FIG. 6, a provisional distribution reception screen is displayed, as shown in FIGS. 15 through 17. In this reception screen, the specified time information is indicated in a time information indicator 346, the specified category is indicated in a category indicator 347, and a content list is indicated in a list indicator 348.

In this example, the movie content list includes a plurality of text fields, such as titles and performers of movies, which are vertically arranged in the list. Content that cannot be shown in the list indicator 348 due to the limited size of the screen 34 can be displayed as a next page or appears by being scrolled.

In the content list in the list indicator 348, movie content which is being selected can be identified by a highlighted or surrounded cursor CS. Then, thumbnail images including characteristic scenes of the movie which is being selected by the cursor CS are indicated in a thumbnail indicator 349, which is part of the display screen 34.

By operating the vertical direction specifying buttons 33a and 33b of the direction specifying buttons 33 in the reception screen, the user can change the movie to be selected. For example, if the user selects the movie content one below the currently selected movie content by operating the operation button 33b in the reception screen in FIG. 15, the reception screen is shifted to that shown in FIG. 16. In response to a change of the movie content, thumbnail images displayed in the thumbnail indicator 349 are changed to those including characteristic scenes of the currently selected movie content.

If the user selects another movie content one below the current movie content by operating the operation button 33b in the reception screen in FIG. 16, the reception screen is shifted to that shown in FIG. 17. In response to a change of the movie content, thumbnail images displayed in the thumbnail indicator 349 are changed to those including characteristic scenes of the currently selected movie content.

Figure 18:
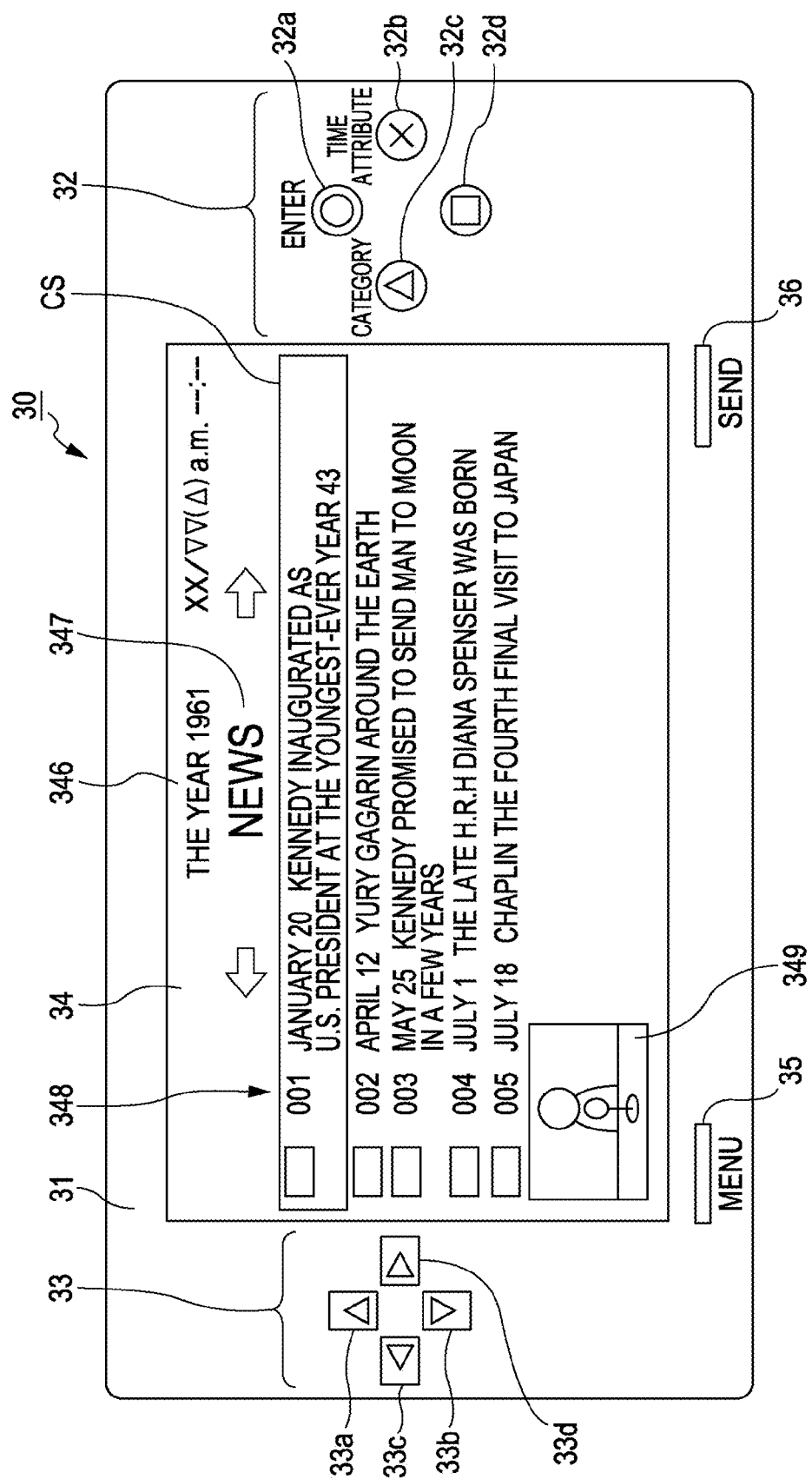
Figure 19:
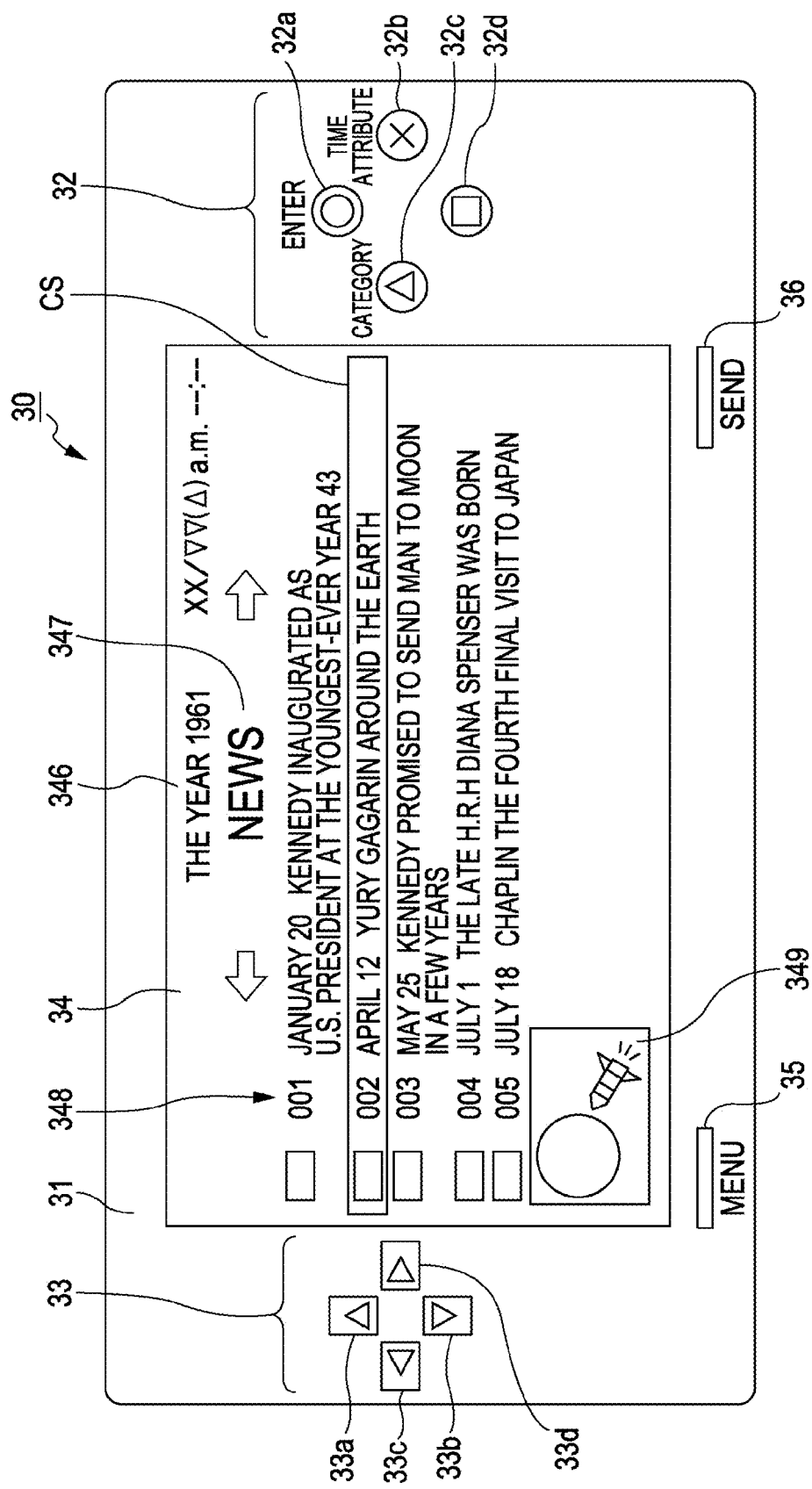

FIGS. 18 and 19 illustrate an example of a list displayed on the display screen 34 of the content receiving terminal 30 when receiving content by provisional distribution in response to a content providing request sent from the content receiving terminal 30 to the content distribution server 10 by specifying the year 1961 as time information and news as the category.

A news content list includes, as shown in FIGS. 18 and 19, a plurality of text fields, such as the dates when incidents or events in news happened and news excerpts, which are vertically arranged in the list. Content that cannot be shown in the list indicator 348 due to the limited size of the screen 34 can be displayed as a next page or appears by being scrolled.

As in the movie content list, in the news content list in the list indicator 348, news which is being selected can be identified by a highlighted or surrounded cursor CS. Then, thumbnail images including characteristic scenes of the news currently selected by the cursor CS are indicated in the thumbnail indicator 349, which is part of the display screen 34.

In the provisional distribution reception screen in FIG. 18, if the user selects the news content one below the currently selected news content by operating the operation button 33b, the reception screen is shifted to that shown in FIG. 19. In response to a change of the news content, thumbnail images displayed in the thumbnail indicator 349 are changed to those including characteristic scenes of the currently selected news content.

In the reception screen shown in one of FIGS. 15 through 19, if the user presses the enter button 32a or the send button 36, the content receiving terminal 30 determines that a final distribution request for the currently selected content has been conducted, and sends a final distribution request including identification information concerning the currently selected content to the content distribution server 10. The content identification information is included in the provisional distribution list in association with each field of the list.

Upon receiving the final distribution request from the content receiving terminal 30, the content distribution server 10 sends the content data requested by the identification information included in the final distribution request to the content receiving terminal 30.

The content receiving terminal 30 receives the content data by final distribution from the content distribution server 10, and displays content, such as a movie, news, or an electronic book, on the display screen 34, or plays back accompanying sound by the speaker. The final distribution display screen is not shown.

As in the first distribution mode, in the second through fourth distribution modes, only the years are specified as the time information. Alternatively, the time, day, and month may also be specified as time information. That is, the time information may be specified in greater details, and content that matches the specified time information can be obtained. In this case, if a plurality of content items are obtained, they are processed as in the first distribution mode.

In the above-described distribution modes, when the specifying operation determining unit determines that the user intends to specify one point on the linear axis, content is distributed from the content distribution server 10 in response to a content providing request sent from the content receiving terminal.

In contrast, in a fifth distribution mode, instead of stopping the rotation operation on the turn knob operation unit 23, when the user operates the turn knob operation unit 23 at a speed lower than a predetermined rotation speed, the specifying operation determining unit determines that the user has requested content search, and the content receiving terminal sends a content search request to the content distribution server 10.

If the large knob 23a is rotated slowly, the content receiving terminal 20 sends a content search request by including the years corresponding to the time points traced by the rotation operation as time information to the content distribution server 10.

If the small knob 23b is rotated slowly, the content receiving terminal 20 sends a content search request by including the months and years corresponding to the time points traced by the rotation operation as time information to the content distribution server 10.

In response to the content search request, the content distribution server 10 searches the content database 11 based on the time information included in the content search request, and randomly selects one piece of content from content pieces obtained as a search result, and sends part of the selected content piece to the content receiving terminal.

The content receiving terminal receives part of the content piece from the content distribution server 10, and plays it back at a normal speed or a faster speed.

Upon receiving a content search request including another time information before finishing the distribution of current content, the content distribution server 10 suspends the distribution of the current content and starts distributing part of the new content to the content receiving terminal as a search result in response to the new content search request.

With this operation, instead of taking trouble to stop the operation by using the operation input unit, such as the turn knob operation unit 23, at the time points, such as the year or the month and year, as in the third distribution mode, the user can continue operating the turn knob operation unit 23 at a speed lower than the predetermined speed so that he/she can watch or listen to part of representative content in a specific year or a specific month and year. This can assist the user to determine in which year or in which month and year of the content to be selected.

A description is given below, with reference to the corresponding flowcharts, of the content requesting operations performed by the content receiving terminals 20, 30, and 40 and the content distribution operation performed by the content distribution server 10.

Content Requesting Operations by Content Receiving Terminals

The operation performed by a content receiving terminal when the content distribution server 10 distributes content in the first distribution mode is described below with reference to the flowchart in FIGS. 20 through 22 in the context of the music content receiving terminal 20. In this case, it is assumed that the music content receiving terminal 20 sends a content providing request in the above-described fourth mode.

Figure 20:
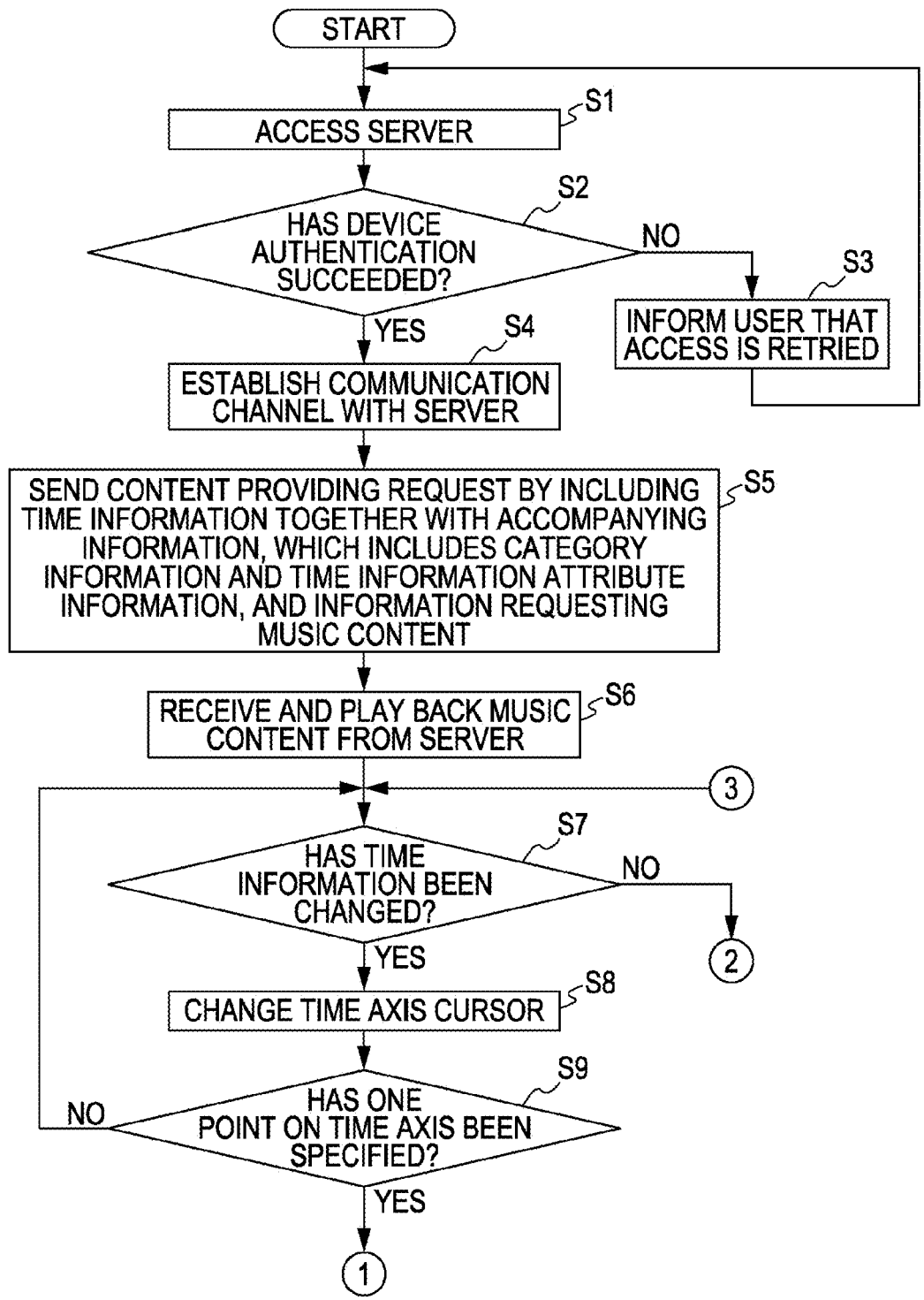
FIGS. 20 through 22 are a flowchart illustrating an example of the operation performed by a music content receiving terminal according to an embodiment of the present invention.
Figure 21:
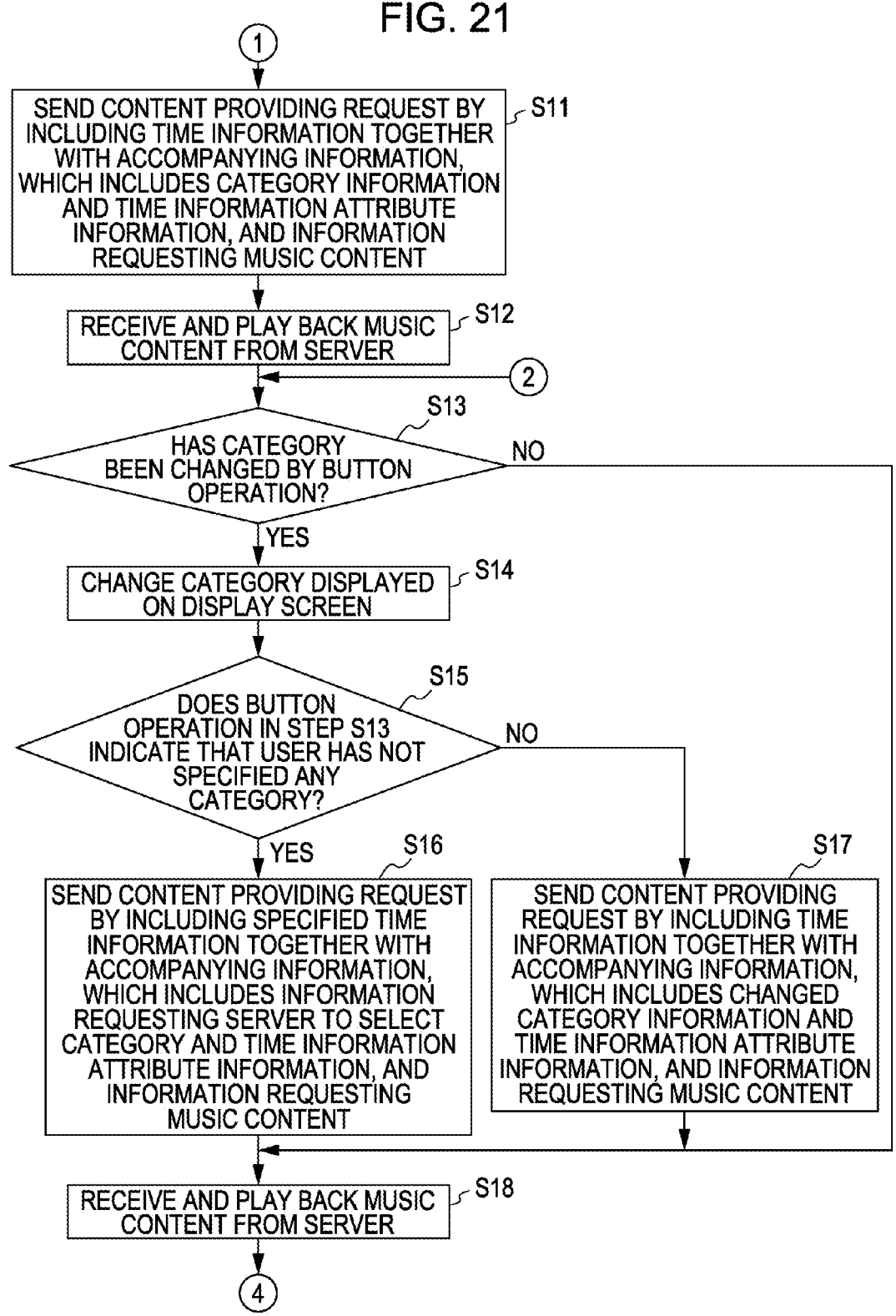
Figure 22:
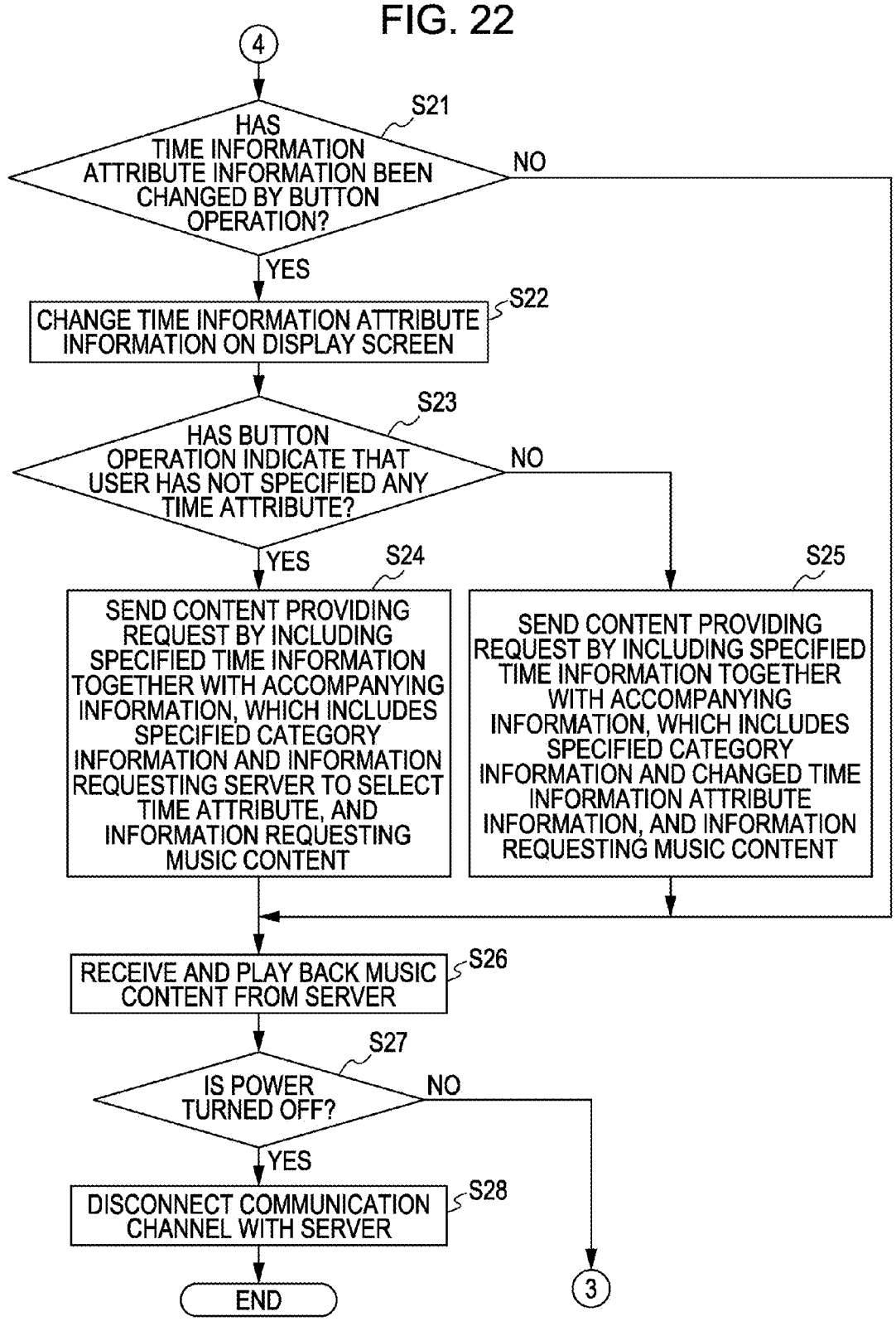

The processing shown in FIGS. 20 through 22 is executed by the CPU 201 of the music content receiving terminal 20 according to a program stored in the program ROM 202 by using the RAM 203 as a work area.

When the music content receiving terminal 20 is powered ON, the CPU 201 starts the processing routine in FIGS. 20 through 22. In step S1, the CPU 201 reads the communication network address of the content distribution server 10 stored in the ROM 202 and accesses the content distribution server 10.

Then, in step S2, the CPU 201 conducts device authentication with the content distribution server 10 and determines whether authentication has succeeded. If it is determined in step S2 that authentication has not succeeded, the CPU 201 proceeds to step S3 to inform the user that the content receiving terminal 20 retries to access the content distribution server 10. Then, the CPU 201 returns to step S1 to access the content distribution server 10.

If it is determined in step S2 that authentication with the content distribution server 10 has succeeded, the CPU 201 proceeds to step S4 to establish a communication channel with the content distribution server 10. In this embodiment, after establishing a communication channel with the content distribution server 10, the music content receiving terminal 20 is constantly connected to the content distribution server 10 via the established communication channel until the content receiving terminal 20 is powered OFF.

Then, in step S5, the CPU 201 sends a content providing request to the content distribution server 10 by including, in the content providing request, the time currently specified by the music content receiving terminal 20 together with accompanying information, which includes time information attribute information and category information, and information requesting music content.

According to step S5, in this embodiment, the music content receiving terminal 20 can be used as in the form of a radio receiver. If the music content receiving terminal 20 is provided with a so-called last memory, the content providing request sent to the content distribution server 10 includes the time information and accompanying information when receiving content distribution from the content distribution server 10 in response to the previous request.

In step S6, the CPU 201 receives music content sent from the content distribution server 10 in response to the content providing request sent in step S5, and performs stream playback on the music content.

The CPU 201 then determines in step S7 whether the user has changed the time information by operating the turn knob operation unit 23 during the stream playback operation. If it is found in step S7 that the time information has changed, the CPU 201 proceeds to step S8 to change the position of the time axis cursor 242 in the time axis indicator 241 in accordance with the changed time information.

Then, the CPU 201 determines in step S9 whether the user has performed an operation to intend to specify one point on the linear axis. In this embodiment, a determination as to whether the user has performed an operation to intend to specify one point on the linear axis can be made by determining whether the user has stopped the operation for changing the time information for a predetermined period of time. If it is determined in step S9 that the user has not performed an operation to intend to specify one point on the linear axis, the CPU 201 returns to step S7 and repeats step S7 and the subsequent steps.

If it is determined in step S9 that the user has performed an operation to intend to specify one point on the time axis, the CPU 201 proceeds to step S11 to send a content providing request to the content distribution server 10 by including, in the content providing request, specified time information, accompanying information including attribute information concerning the specified time information and category information, and information requesting the content distribution server 10 to send music content.

Then, in step S12, the CPU 201 receives music content sent from the content distribution server 10 in response to the content providing request sent in step S11, and then performs stream playback on the music content.

The CPU 201 then determines in step S13 whether the user has changed the category by operating the category changing operation button 25b during the stream playback operation. If it is found in step S13 that the category has been changed, the CPU 201 proceeds to step S14 to change the category displayed in the category display column 245 on the display screen 24 in accordance with the category changed by the user.

Before sending a new content providing request to the content distribution server 10 in response to a change in the category in step S13, the CPU 201 determines in step S15 whether the button operation performed in step S13 indicates that the user has not specified any category.

If it is determined in step S15 that the user has not specified any category, the CPU 201 proceeds to step S16 to send a content providing request to the content distribution server 10 by including, in the content providing request, the specified time information together with accompanying information, which includes attribute information concerning the specified time information and information requesting the content distribution server 10 to select the category, and information requesting music content.

If it is determined in step S15 that the button operation indicates that the user has specified a category, the CPU 201 proceeds to step S17 to send a content providing request to the content distribution server 10 by including, in the content providing request, the specified time information together with accompanying information, which includes attribute information concerning the specified time information and the changed category information, and information requesting music content.

After step S16 or S17, the CPU 201 proceeds to step S18 to receive music content sent from the content distribution server 10 in response to the content providing request sent in step S16 or S17, and performs stream playback on the music content. If it is determined in step S13 that the category changing operation button 25b has not been operated, the CPU 201 proceeds to step S18 to receive music content sent from the content distribution server 10 and performs stream playback on the music content.

If it is determined in step S7 that the time information has not been changed, the CPU 201 proceeds to step S13.

After step S18, the CPU 201 proceeds to step S21 to determine whether the user has changed time information attribute information by operating the time attribute changing operation button 25a. If it is found in step S21 that the time information attribute information has been changed, the CPU 201 proceeds to step S22 to change the time information attribute information indicated in the attribute display column 244 on the display screen 24 in accordance with the changed attribute information.

Before sending a new content providing request to the content distribution server 10 in response to the attribute information changed in step S21, the CPU 201 determines in step S23 whether the button operation performed in step S21 indicates that the user has not specified any time attribute.

If it is determined in step S23 that the user has not specified any time attribute, the CPU 201 proceeds to step S24 to send a content providing request to the content distribution server 10 by including, in the content providing request, the specified time information together with accompanying information, which includes information requesting the content distribution server 10 to select the time attribute and the specified category information, and information requesting music content.

If it is determined in step S23 that the button operation indicates that the user has specified a time attribute, the CPU 201 proceeds to step S25 to send a content providing request to the content distribution server 10 by including, in the content providing request, the specified time information together with accompanying information, which includes the changed time information attribute information and the specified category information, and information requesting music content.

After step S24 or S25, the CPU 201 proceeds to step S26 to receive music content sent from the content distribution server 10 in response to the content providing request sent in step S24 or S25 and performs stream playback on the music content. If it is determined in step S21 that the time attribute changing operation button 25a has not been operated, the CPU 201 proceeds to step S26 to receive music content sent from the content distribution server 10 and performs stream playback on the music content.

Then, the CPU 201 determines in step S27 whether the content receiving terminal 20 is powered OFF. If it is found in step S27 that the content receiving terminal 20 is not powered OFF, the CPU 201 returns to step S7. If it is found in step S27 that the content receiving terminal 20 is powered OFF, the CPU 201 proceeds to step S28 to disconnect the communication channel with the content distribution server 10. The processing routine is then completed.

The operation performed by a content receiving terminal when the content distribution server 10 distributes content in the fourth distribution mode is described below with reference to the flowchart in FIGS. 23 through 25 in the context of the AV content receiving terminal 30. In this case, it is assumed that the AV content receiving terminal 30 sends a content providing request in the above-described fourth mode.

Figure 23:
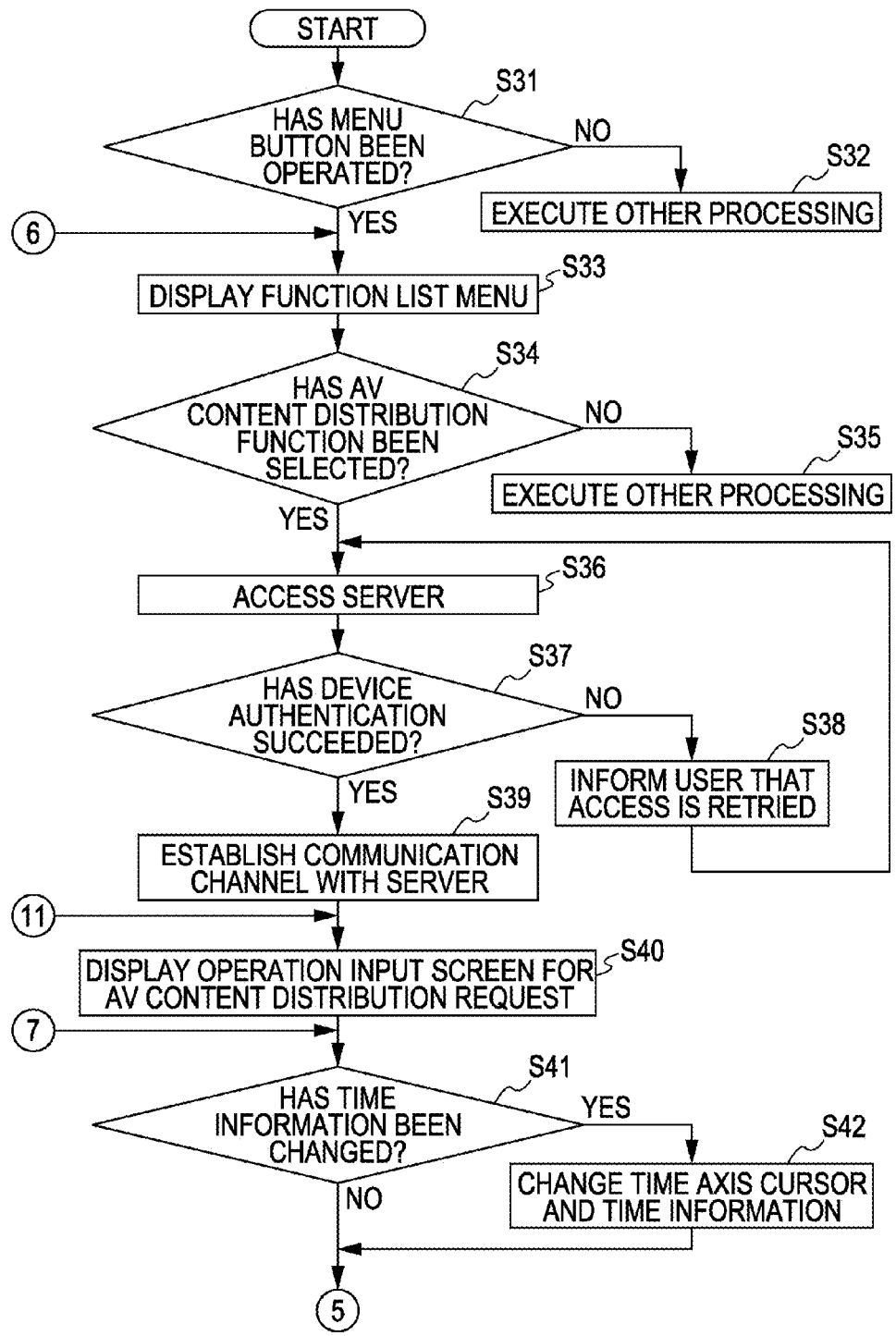
FIGS. 23 through 25 are a flowchart illustrating an example of the operation performed by an AV content receiving terminal according to an embodiment of the present invention.
Figure 24:
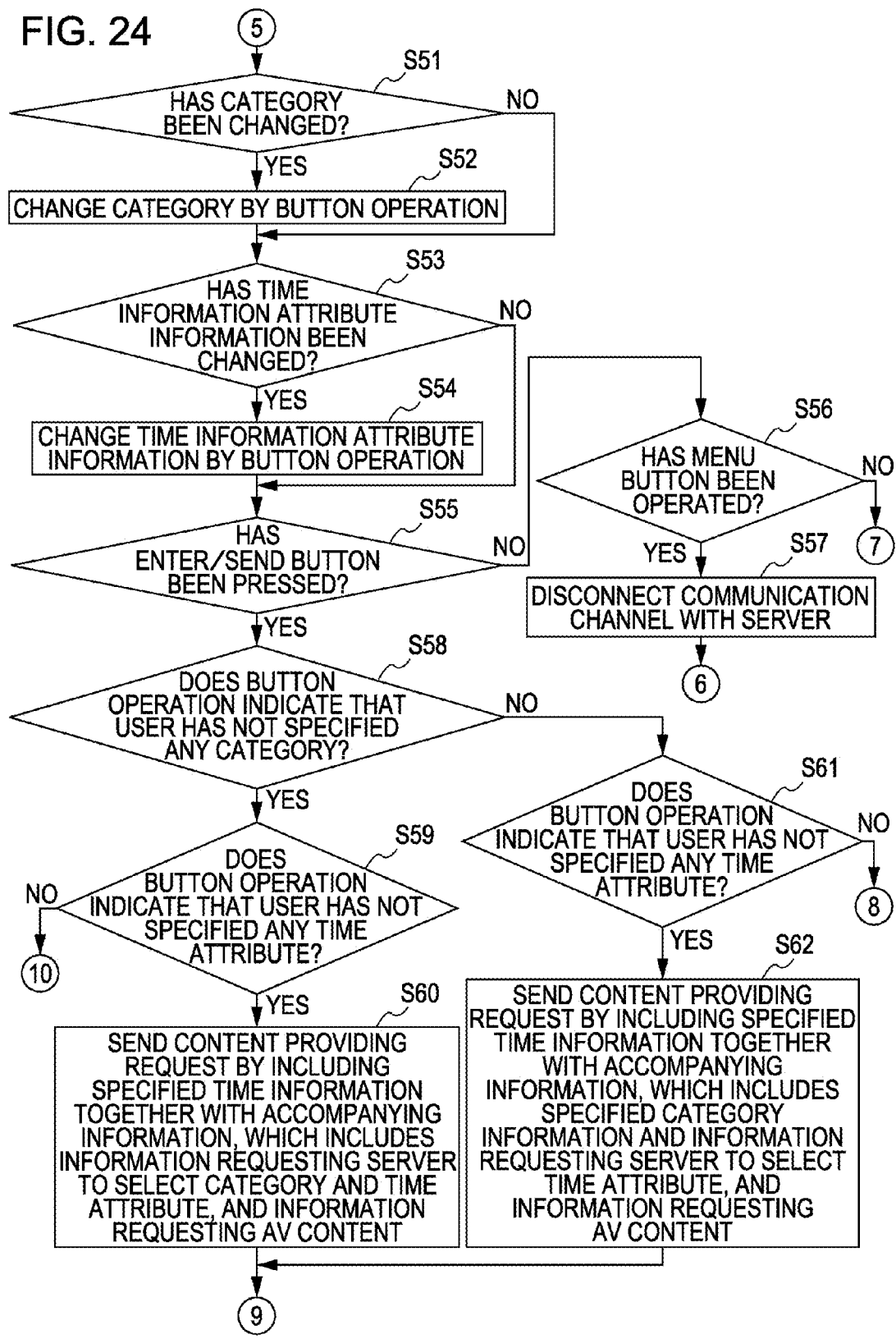
Figure 25:
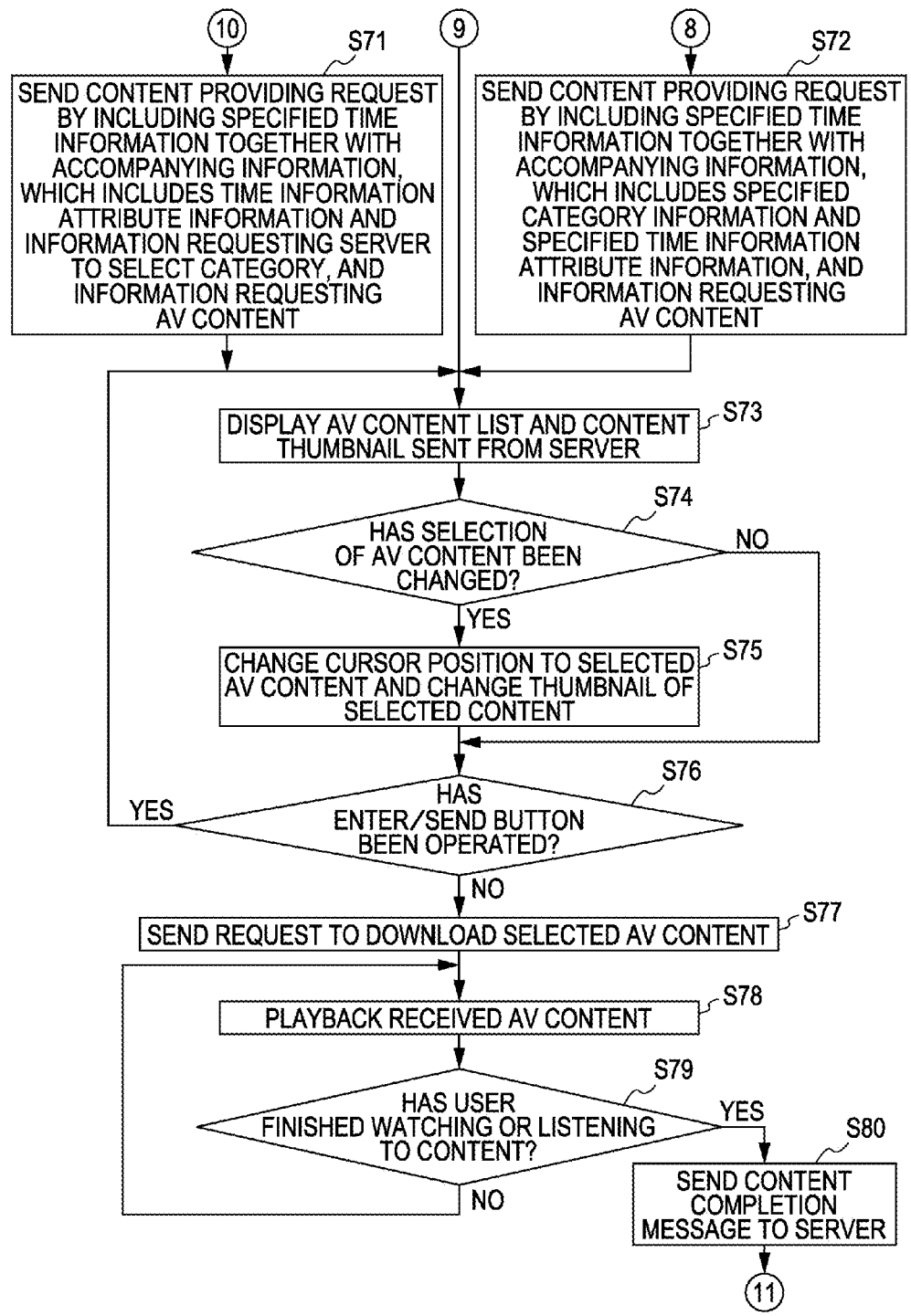

The processing shown in FIGS. 23 through 25 is executed by the CPU 301 of the AV content receiving terminal 30 according to a program stored in the program ROM 302 by using the RAM 303 as a work area.

When the AV content receiving terminal 30 is powered ON, the CPU 301 determines in step S31 whether the menu button 35 has been operated. If it is found in step S31 that the menu button 35 has not been operated, the CPU 301 proceeds to step S32 to execute other processing.

If it is found in step S31 that the menu button 35 has been operated, the CPU 301 proceeds to step S33 to display a list menu of functions provided for the AV content receiving terminal 30 on the display screen 34. Then, the CPU 301 determines in step S34 whether the AV content distribution function has been selected.

If it is found in step S34 that a function other than the AV content distribution function has been selected, the CPU 301 proceeds to step S35 to execute other processing corresponding to the selected function.

If it is found in step S34 that the AV content distribution function has been selected, the CPU 301 proceeds to step S36 to read the communication network address of the content distribution server 10 stored in the program ROM 302 to access the content distribution server 10.

Then, the CPU 301 conducts device authentication with the content distribution server 10 and determines in step S37 whether authentication has succeeded. If authentication has not succeeded in step S37, the CPU 301 proceeds to step S38 to inform the user that the AV content receiving terminal 30 retries to access the content distribution server 10. The CPU 301 then returns to step S36 to access the content distribution server 10.

If it is determined in step S37 that authentication has succeeded, the CPU 301 proceeds to step S39 to establish a communication channel with the content distribution server 10. In this embodiment, after establishing a communication channel with the content distribution server 10, the AV content receiving terminal 30 is constantly connected to the content distribution server 10 via the established communication channel until the AV content receiving terminal 30 is powered OFF.

Then, in step S40, the CPU 301 displays an operation input screen for requesting AV content by using time information. An example of the operation input screen is shown in FIG. 6.

The CPU 301 then determines in step S41 whether the user has changed time information by operating the horizontal direction specifying button 33c or 33d on the operation input screen. If it is found in step S41 that the time information has been changed, the CPU 301 proceeds to step S42 to change the position of the time axis cursor 342 in the time axis indicator 341 in accordance with the changed time information.

The CPU 301 then determines in step S51 whether the category has been changed. If it is determined in step S51 that the category has not been changed, or after step S52, the CPU 301 determines in step S53 whether the user has changed time information attribute information by operating the time attribute changing operation button 32b. If it is determined in step S53 that the time information attribute information has been changed, the CPU 301 proceeds to step S54 to change the time information attribute information indicated in the time information attribute display column 344 on the display screen 34 in accordance with the time attribute changed by the user.

If it is determined in step S53 that the time information attribute information has not been changed or after step S54, the CPU 301 determines in step S55 whether the user has requested content provisional distribution by operating the enter button 32a or the send button 36.

If it is found in step S55 that content provisional distribution has not been requested, the CPU 301 proceeds to step S56 to determine whether the menu button 35 has been operated.

If it is found in step S56 that the menu button 35 has not been operated, the CPU 301 returns to step S41. If the menu button 35 has been operated, the CPU 301 proceeds to step S57 to disconnect the communication channel with the content distribution server 10. The CPU 301 then returns to step S33.

If it is determined in step S55 that the user has requested content provisional distribution by operating the enter button 32a or the send button 36, the CPU 301 sends a new content providing request to the content distribution server 10. However, before sending a content providing request, the CPU 301 determines whether the button operation performed in step S55 indicates that the user has not specified any category or any attribute.

The CPU 301 first determines in step S58 that the button operation indicates that the user has not specified any category. If the user has not specified any category, the CPU 301 proceeds to step S59 to determine whether the button operation indicates that the user has not specified any time attribute.

If it is determined in step S59 that the user has not specify any time attribute, the CPU 301 proceeds to step S60 to send a content providing request by including, in the content providing request, the specified time information together with accompanying information, which includes information requesting the content distribution server 10 to select the time attribute and category, and information requesting AV content.

If it is determined in step S59 that the button operation indicates that the user has specified a time attribute, the CPU 301 proceeds to step S71 to send a content providing request to the content distribution server 10 by including, in the content providing request, the specified time information together with accompanying information, which includes information requesting the content distribution server 10 to select the category and the specified time information attribute information, and information requesting AV content.

If it is determined in step S58 that the button operation indicates that the user has specified a category, the CPU 301 proceeds to step S61 to determine whether the button operation indicates that the user has not specified any time attribute.

If it is determined in step S61 that the button operation indicates that the user has not specified any time attribute, the CPU 301 proceeds to step S62 to send a content providing request to the content distribution server 10 by including, in the content providing request, the specified time information together with accompanying information, which includes the specified category and information requesting the content distribution server 10 to select the time attribute, and information requesting AV content.

If it is determined in step S61 that the button operation indicates that the user has specified a time attribute, the CPU 301 proceeds to step S72 to send a content providing request to the content distribution server 10 by including, in the content providing request, the specified time information together with accompanying information, which includes the specified time information attribute information and the specified category, and information requesting AV content.

After step S60, S62, S71, or S72, the CPU 301 proceeds to step S73 to receive a list of AV content items and thumbnail image data of the currently selected content sent from the content distribution server 10 in response to the content providing request sent in step S60, S62, S71, or S72 and displays the received list and thumbnail image on the display screen 34, as in that in FIG. 15.

Then, the CPU 301 determines in step S74 whether the selection of AV content in the AV content list has been changed. If it is determined in step S74 that the selection of the AV content has been changed, the CPU 301 proceeds to step S75 to change the position of the cursor to the selected AV content and also displays the thumbnail image of the selected AV content.

If it is determined in step S74 that the selection of AV content has not been changed or after step S75, the CPU 301 proceeds to step S76 to determine whether the user has requested content final distribution by operating the enter button 32a or the send button 36.

If it is determined in step S76 that the user has not requested content final distribution, the CPU 301 returns to step S73. If it is determined in step S76 that the user has requested content final distribution, the CPU 301 proceeds to step S77 to send a final distribution request including identification information concerning the selected AV content to the content distribution server 10.

Then, in step S78, the CPU 301 receives the AV content data sent from the content distribution server 10 by final distribution, decodes the data, and then performs stream playback on the data. The CPU 301 then displays the image data on the display screen 34 and also outputs the audio data from the speaker.

The CPU 301 then determines in step S79 whether the user has finished watching or listening to the content. Step S79 can be executed, not only when the user finishes watching or listening to the content, but also while the user is watching or listening to the content. If it is determined in step S79 that the user has not finished watching or listening to the content, the CPU 301 returns to step S78 and continues to play back the AV content. If it is determined in step S79 that the user has finished the AV content, the CPU 301 proceeds to step S80 to send a content completion message to the content distribution server 10. Then, the CPU 301 returns to step S40 to display the operation input screen for requesting AV content distribution. The processing routine has been performed as described above.

In this example, a content completion message is not sent to the content distribution server 10 until the user finishes watching or listening to the content. Alternatively, if a predetermined period of time has elapsed after receiving AV content sent from the content distribution server 10 by final distribution, the CPU 301 may assume that the user has finished watching or listening to the content, and sends a content completion message to the content distribution server 10 and then returns to step S40.

In the examples shown in FIGS. 20 through 22 and FIGS. 23 through 25, when categories or time attributes have not been specified, information requesting the content distribution server 10 to select the category or the time attribute is sent to the content distribution server 10. However, information indicating that categories or time attributes have not been specified may be simply sent to the content distribution server 10.

In this case, the content distribution server 10 may assume that it can select any time attribute or category, and provides content specified by a recommended category or time attribute or content specified by a predetermined category or time attribute to the content providing terminal.

An example of the operation performed by the content distribution server 10 is discussed below with reference to the flowchart in FIGS. 26 through 30. In this example, the content distribution server 10 distributes music content in the first distribution mode and distributes AV content in the fourth distribution mode. Other types of content are transmitted in the distribution modes according to the characteristics of the content, though an explanation thereof is omitted here. If accompanying information, such as the category or time information attribute, is not specified, predetermined, recommended attribute information, such as category information or time information attribute information, is used.

The processing shown in FIGS. 26 through 30 is executed by the CPU 101 according to a program stored in the program ROM 102 by using the RAM 103 as a work area.

In step S81, the CPU 101 monitors access from a content receiving terminal and determines whether access is received from a content receiving terminal. If access is received, the CPU 101 proceeds to step S82 to conduct device authentication with the accessed content receiving terminal and determines whether device authentication has succeeded. If device authentication has not succeeded, the CPU 101 proceeds to step S83 to inform the content receiving terminal that authentication has failed, and then returns to step S81.

If it is determined in step S82 that device authentication has succeeded, the CPU 101 proceeds to step S84 to determine whether a content providing request has been received from the content receiving terminal. If it is found in step S84 that a content providing request has been received, the CPU 101 proceeds to step S85 to analyze the received content providing request.

Then, the CPU 101 determines in step S86 whether the requested content is music content. If music content is requested in step S86, the CPU 101 performs processing in the first distribution mode.

More specifically, in step S91, the CPU 101 first analyzes accompanying information contained in the content providing request to determine whether an analysis result indicates that the user has not specified any category. If it is determined in step S91 that the analysis result indicates that the user has specified a category, the CPU 101 proceeds to step S92 to determine whether the analysis result indicates whether the user has not specified any time attribute.

If it is determined in step S92 that the analysis results indicates that the user has specified a time attribute, the CPU 101 proceeds to step S93 to generate search conditions based on the specified category, time information attribute information, and time information, and searches the content database 11 according to the generated search conditions.

If it is determined in step S92 that the analysis result indicates that the user has not specified any time attribute, the CPU 101 proceeds to step S94 to generate search conditions based on the specified category, predetermined, recommended time information attribute information, and the specified time information, and searches the content database 11 according to the generated search conditions.

If it is determined in step S91 that the analysis result indicates that the user has not specified any category, the CPU 101 proceeds to step S101 to determine whether the analysis result indicates that the user has not specify any time attribute.

If it is determined in step S101 that the analysis result indicates that the user has specified a time attribute, the CPU 101 proceeds to step S102 to generate search conditions based on a predetermined, recommended category, the specified time information attribute information, and the specified time information, and searches the content database 11 according to the generated search conditions.

If it is determined in step S101 that the analysis result indicates that the user has not specified any time attribute, the CPU 101 proceeds to step S103 to generate predetermined, recommended category and time attribute, and the specified time information, and searches the content database 11 according to the generated search conditions.

After step S93, S94, S102, or S103, the CPU 101 proceeds to step S95 to sequentially send music content data to the content receiving terminal in a random order as a search result.

Then, the CPU 101 determines in step S96 whether a request to disconnect the communication channel has been received from the content receiving terminal. If it is determined in step S96 that a request to disconnect the communication channel has not been received, the CPU 101 determines in step S97 whether a new content providing request has been received from the content receiving terminal.

If it is found in step S97 that a new content providing request has been received, the CPU 101 returns to step S85. If it is determined in step S97 that a new content providing request has not been received, the CPU 101 returns to step S95 and continues to distribute the current content data.

If it is determined in step S96 that a request to disconnect the communication channel has been received from the content receiving terminal, the CPU 101 proceeds to step S98 to disconnect the communication channel with the content receiving terminal. Then, the processing routine is completed.

If it is determined in step S86 that the requested content is not music content, the CPU 101 proceeds to step S87 to determine whether the requested content is AV content. If it is found in step S87 that the requested content is not AV content, the CPU 101 proceeds to step S88 to execute processing in a distribution mode corresponding to the requested type of content.

If the requested content is found to be AV content in step S87, the CPU 101 determines that the content providing request received in step S84 is a provisional distribution request, and executes the processing in the fourth distribution mode.

More specifically, in step S111, the CPU 101 analyzes the accompanying information contained in the content providing request to determine whether the analysis result indicates that the user has not specified any category. If the analysis result indicates that the user has specified a category, the CPU 101 proceeds to step S112 to determine whether the analysis result indicates that the user has not specified any time attribute.

If it is determined in step S112 that the analysis result indicates that the user has specified a time attribute, the CPU 101 proceeds to step S113 to generate search conditions based on the specified category, time information attribute information, and time information, and searches the content database 11 according to the generated search conditions.

If it is determined in step S112 that the analysis result indicates that the user has not specified any time attribute, the CPU 101 proceeds to step S114 to generate search conditions based on the specified category, predetermined, recommended time information attribute information, and the specified time information, and searches the content database 11 according to the generated search conditions.

If it is determined in step S111 that the analysis result indicates that the user has not specified any category, the CPU 101 proceeds to step S131 to determine whether the analysis result indicates that the user has not specified any time attribute.

If it is determined in step S131 that the analysis result indicates that the user has specified a time attribute, the CPU 101 proceeds to step S132 to generate search conditions based on a predetermined, recommended category, the specified time information attribute information, and the specified time information, and searches the content database 11 according to the generated search conditions.

If it is determined in step S131 that the analysis result indicates that the user has not specified any time attribute, the CPU 101 proceeds to step S133 to generate search conditions based on predetermined, recommended category and time information attribute information, and the specified time information, and searches the content database 11 according to the generated search conditions.

After step S113, S114, S132, or S133, the CPU 101 proceeds to step S115 to send a list of one or a plurality of content items arranged in a random order and thumbnail image data of each content item to the content receiving terminal.

The CPU 101 then determines in step S116 whether a request to provide a content item selected from the list by final distribution has been received. If such a final distribution request has been received in step S116, the CPU 101 proceeds to step S117 to read the AV content data requested by the identification information included in the final distribution request from the content database 11 and sends it to the content receiving terminal.

The CPU 101 then determines in step S118 whether a content completion message has been received from the content receiving terminal. If a content completion message has not been received, the CPU 101 returns to step S117 to continue to distribute the content. If a content completion message has been received, the CPU 101 proceeds to step S119 to determine whether a request to disconnect the communication channel has been received from the content receiving terminal. If a request to disconnect the communication channel has not been received, the CPU 101 returns to step S84 to wait for a new content providing request from the content receiving terminal.

If it is determined in step S119 that a request to disconnect the communication channel has been received, the CPU 101 proceeds to step S121 to disconnect the communication channel with the content receiving terminal. Then, the processing routine is completed.

If it is determined in step S116 that a request to send specific AV content has not been received, the CPU 101 proceeds to step S120 to determine whether a request to disconnect the communication channel has been received. If a request to disconnect the communication channel has not been received, the CPU 101 returns to step S116 to wait for a final distribution request from the content receiving terminal.

If it is determined in step S120 that a request to disconnect the communication channel has been received from the content receiving terminal, the CPU 101 proceeds to step S121 to disconnect the communication channel with the content receiving terminal. The processing routine is then completed.

In this example, the content distribution server 10 determines that content final distribution has finished by receiving a content completion message from the content receiving terminal. Alternatively, if a predetermined period of time has elapsed after sending the entire content data by the content distribution server 10, the CPU 101 may assume that content final distribution has finished without sending a content completion message.

Figure 31:
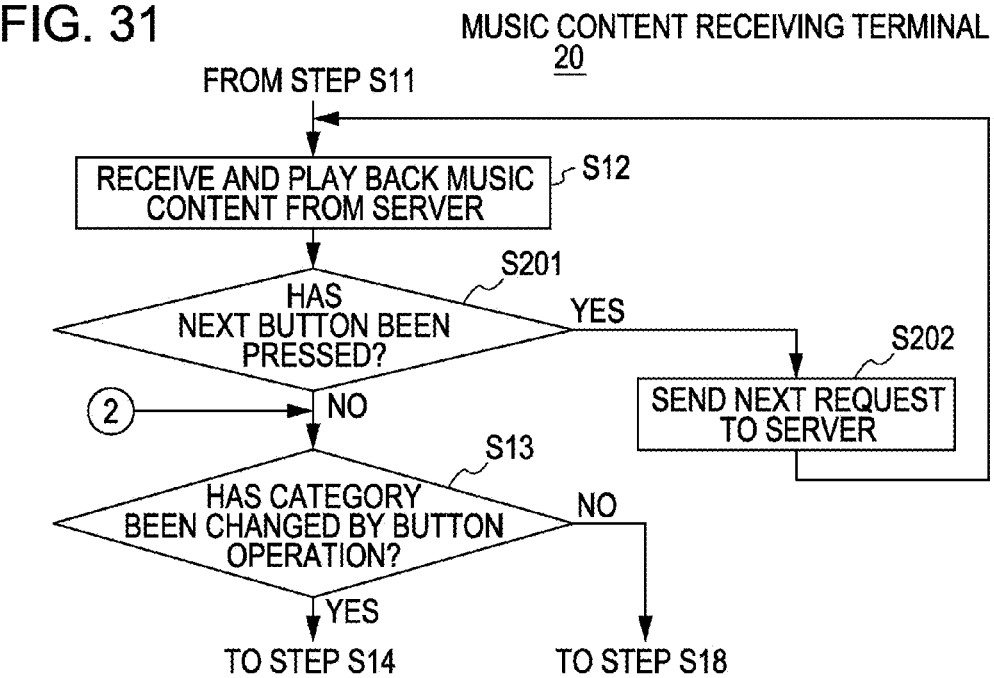
FIG. 31 is a flowchart illustrating another example of the operation performed by a music content receiving terminal according to an embodiment of the present invention.

The operation performed by the music content receiving terminal 20 in the second distribution mode is described below with reference to the flowchart in FIG. 31. In this case, only steps S12 and S13 in the flowchart in FIG. 21 are changed to steps in the flowchart in FIG. 31, and other steps are the same as those shown in FIGS. 20 through 22.

While playing back music content sent from the content distribution server 10 in step S12, the CPU 101 determines in step S201 whether the next button 25c has been pressed.

If it is determined in step S201 that the next button 25c has not been pressed, the CPU 201 proceeds to step S13 to determine whether the category changing operation button 25b has been pressed.

If it is determined in step S201 that the next button 25c has been pressed, the CPU 201 proceeds to step S202 to send a next request to the content distribution server 10. Then, the CPU 201 returns to step S12 to receive the next content data from the content distribution server 10 in response to the next request, and then plays back the received content data. Other steps in the flowchart in FIG. 31 are similar to those discussed with reference to FIGS. 20 through 22.

Figure 26:
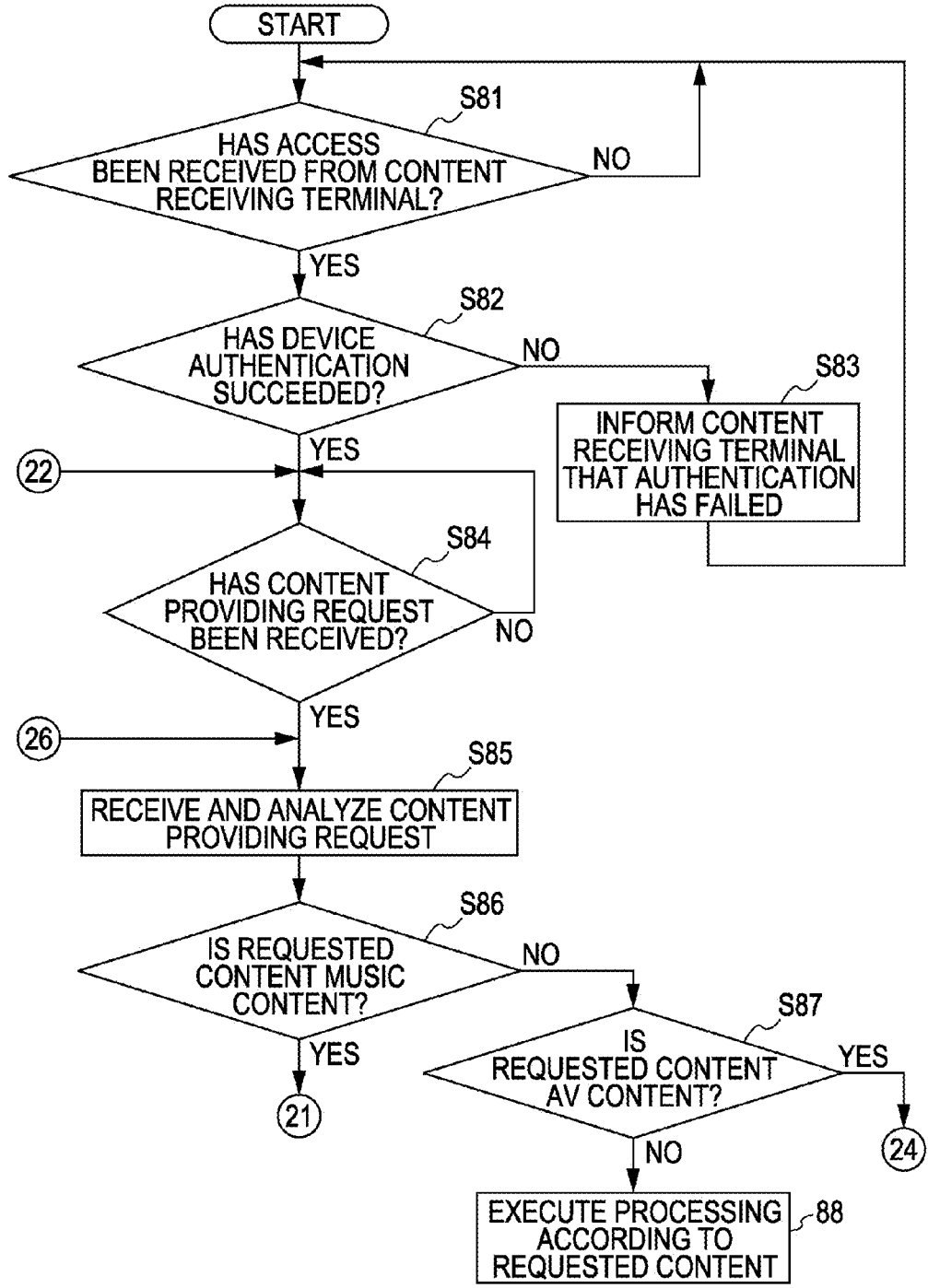
FIGS. 26 through 30 are a flowchart illustrating an example of the operation performed by a content distribution server according to an embodiment of the present invention.
Figure 27:
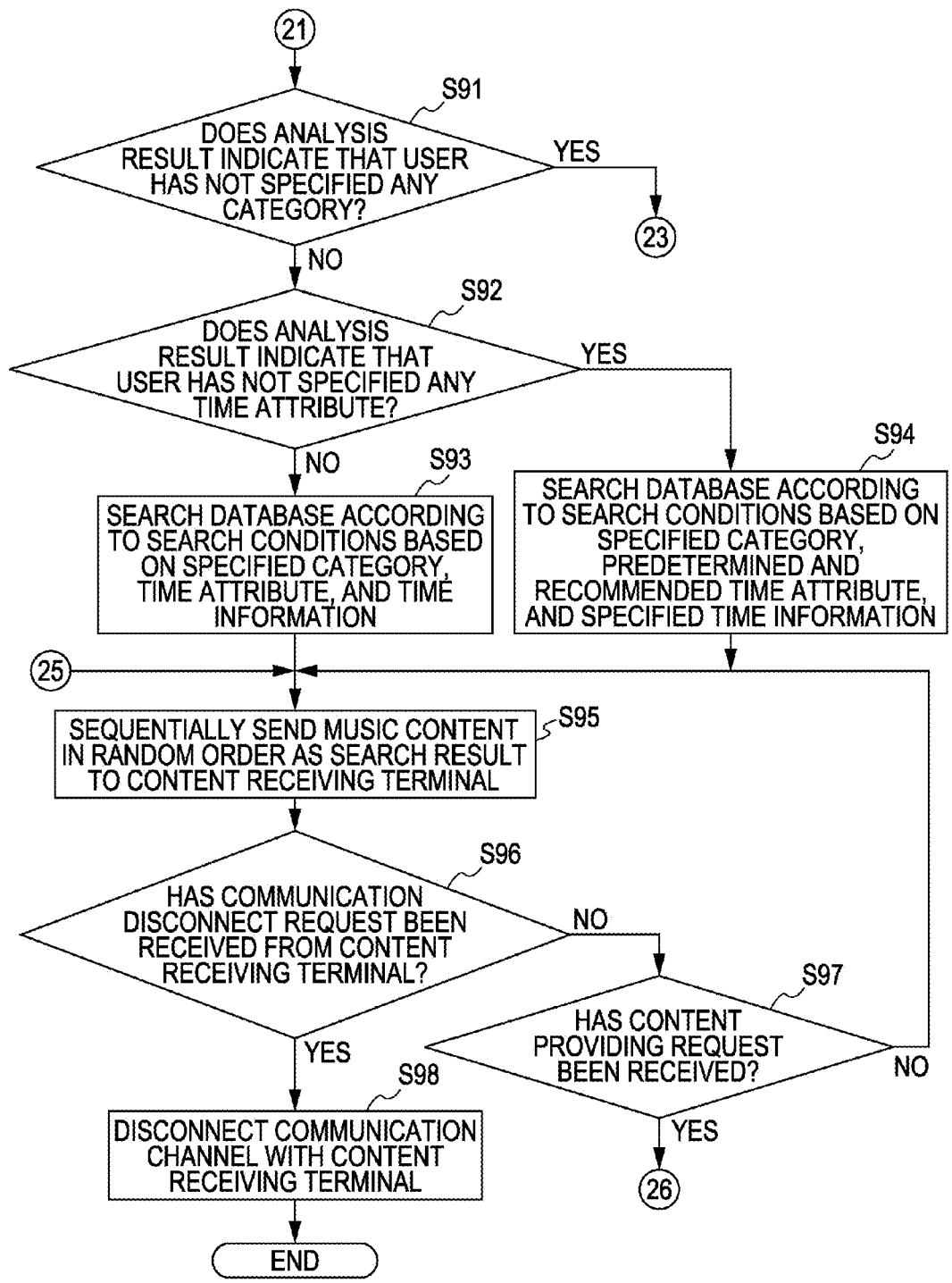
Figure 28:
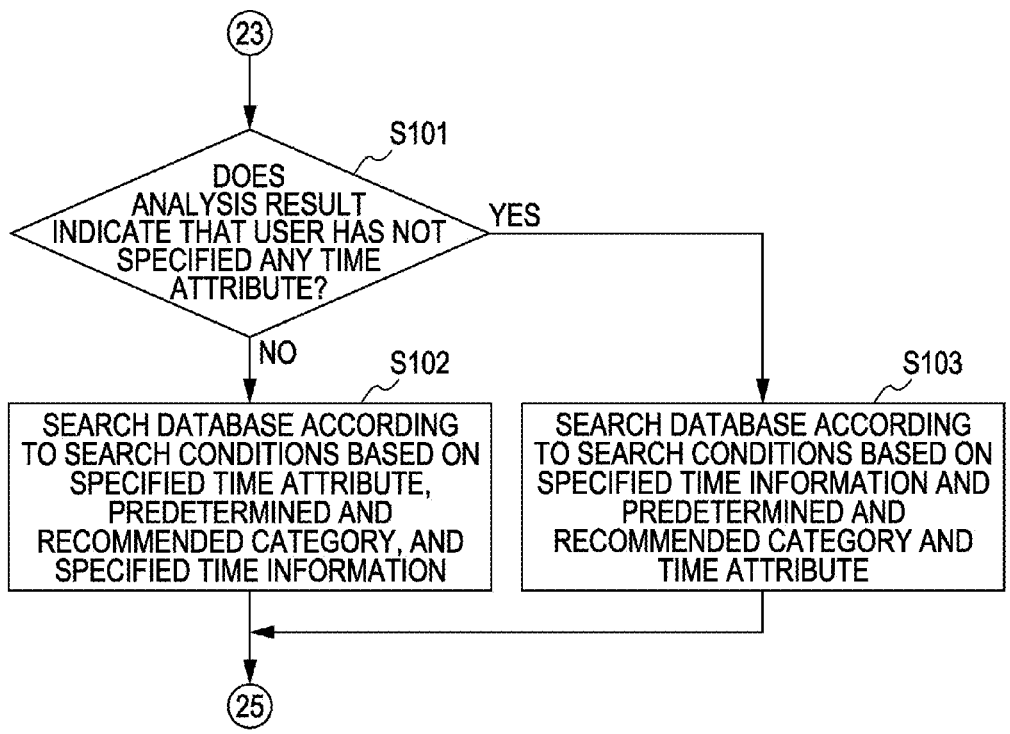
Figure 29:
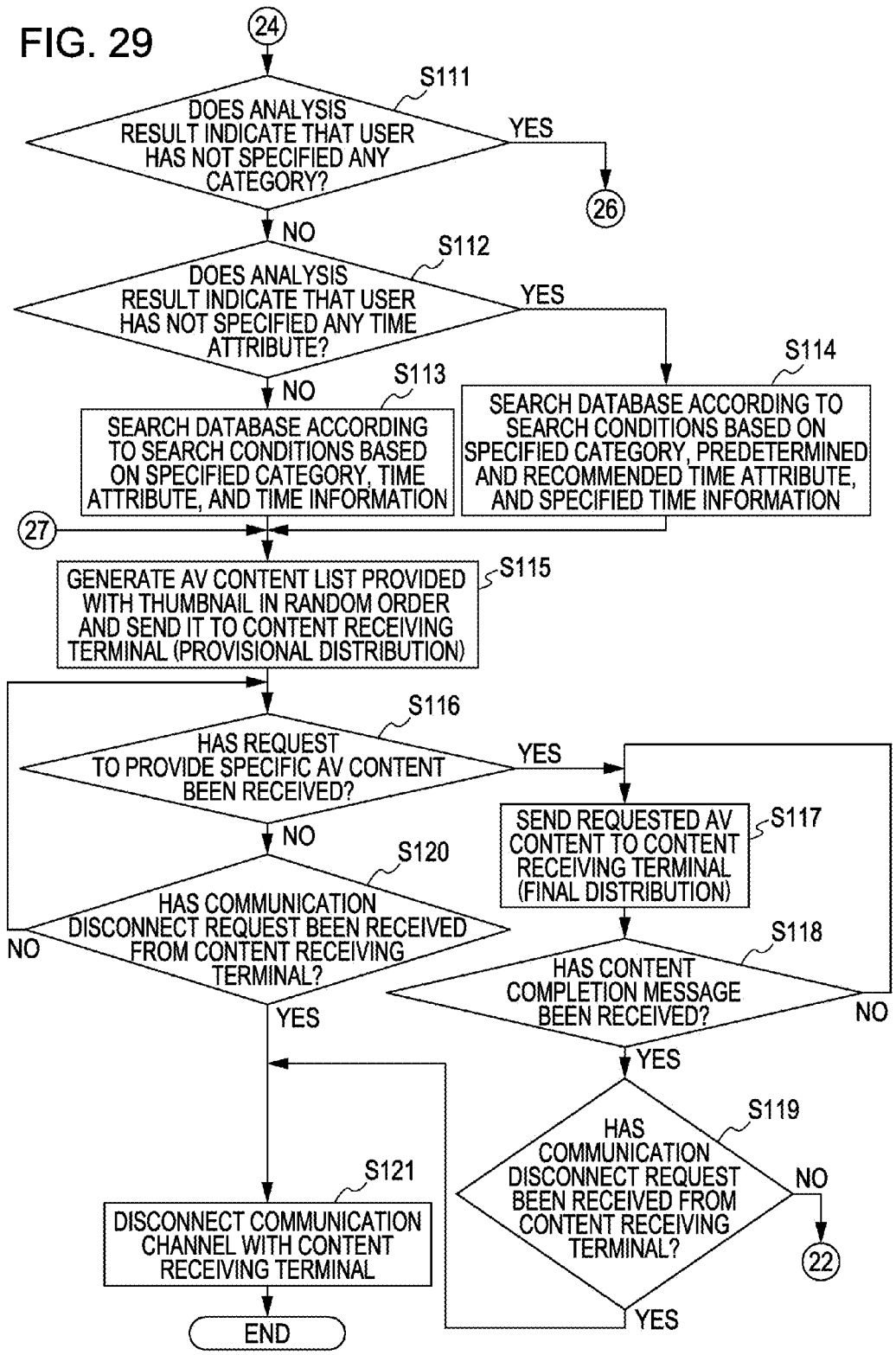
Figure 30:
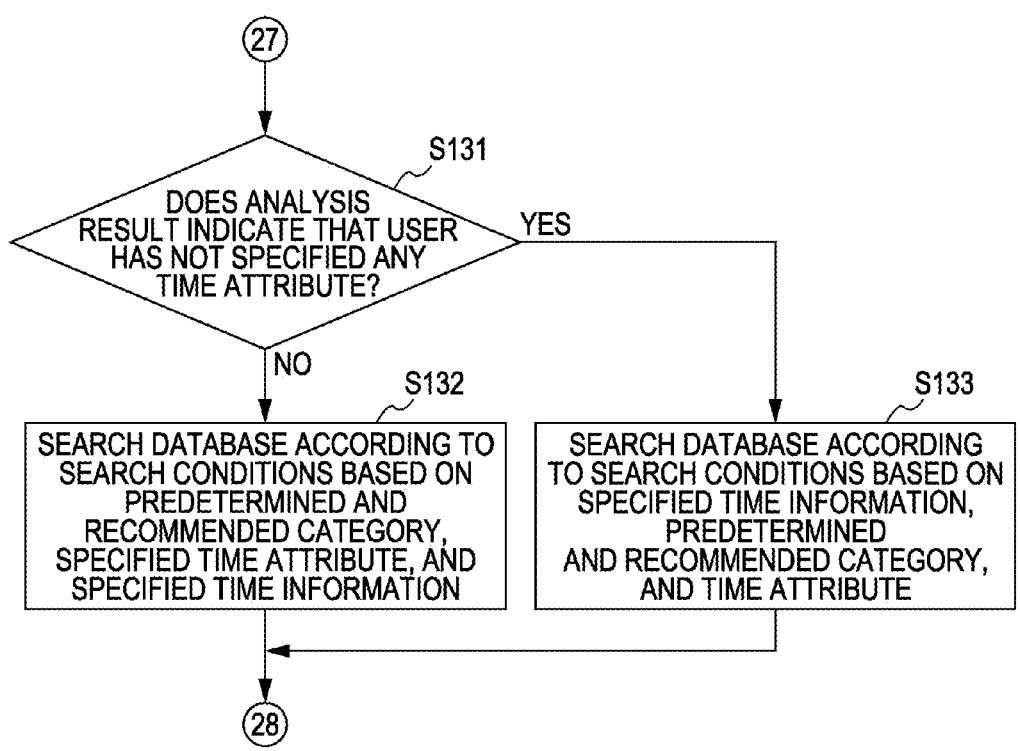
Figure 32:
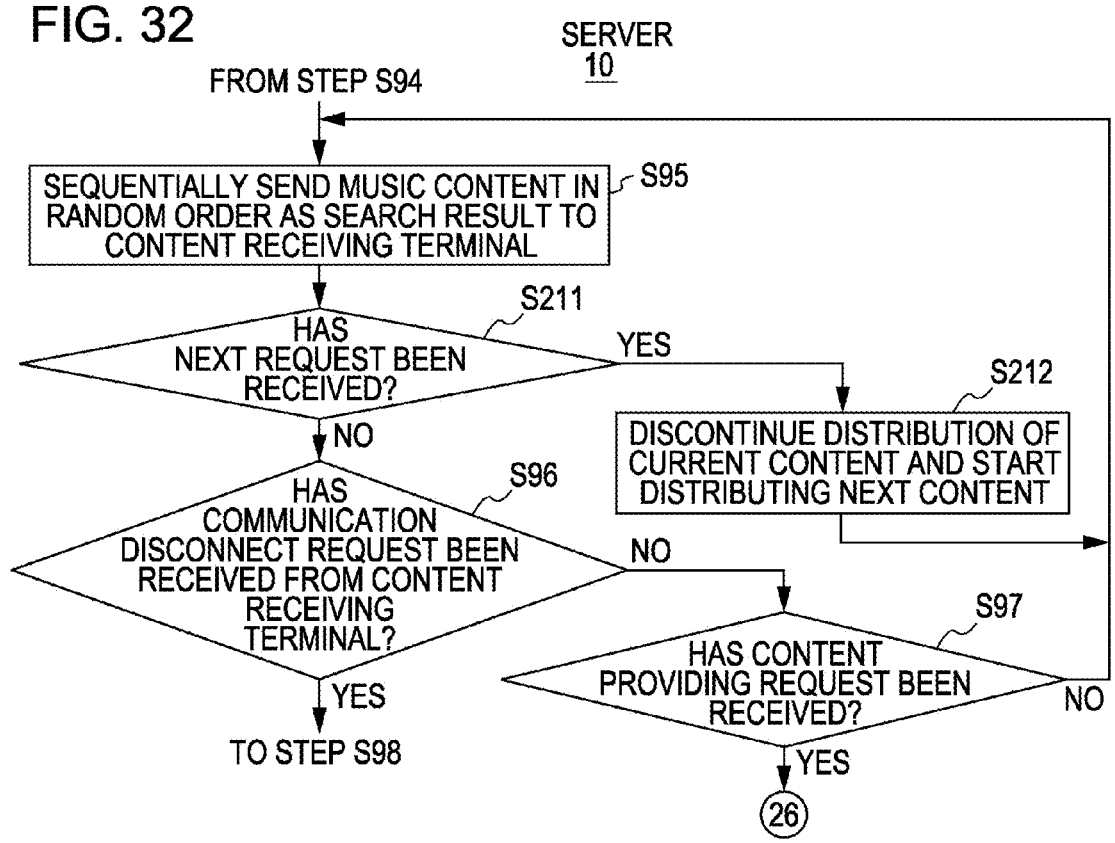
FIG. 32 is a flowchart illustrating another example of the operation performed by a content distribution server according to an embodiment of the present invention.

The operation performed by the content distribution server 10 corresponding to the processing indicated by the flowchart in FIG. 31 in the second distribution mode is now discussed with reference to the flowchart in FIG. 32. In this case, only steps S95 and S96 in the flowchart in FIG. 27 are changed to steps in the flowchart in FIG. 32, and other steps are similar to those shown in FIGS. 26 through 30.

In the second distribution mode, while sequentially distributing music content data in a random order as a search result to the music content receiving terminal 20 in step S95, the CPU 101 determines in step S211 whether a next request has been received from the music content receiving terminal 20.

If it is determined in step S211 that a next request has been received, the CPU 101 proceeds to step S212 to discontinue the distribution of the current content and starts distributing the next content, and then returns to step S95. Then, the CPU 101 re-determines in step S211 whether a next request has been received, and if so, the CPU 101 discontinues the distribution of the current content and starts distributing the next content.

If it is determined in step S211 that a next request has not been received, the CPU 101 proceeds to step S96 to determine whether a communication disconnect request has been received from the music content receiving terminal 20. If a communication disconnect request has not been received, the CPU 101 proceeds to step S97 to determine whether a new content providing request has been received. If a new content providing request has not been received, the CPU 101 returns to step S95.

Other steps are similar to those in the flowchart discussed with reference to FIGS. 26 through 30.

The operation performed by the music content receiving terminal 20 in the third distribution mode is described below with reference to the flowchart in FIG. 33. In this case, only steps S12 and S13 in the flowchart in FIG. 21 are changed to steps in the flowchart in FIG. 33, and other steps are similar to those shown in FIGS. 20 through 22.

Figure 33:
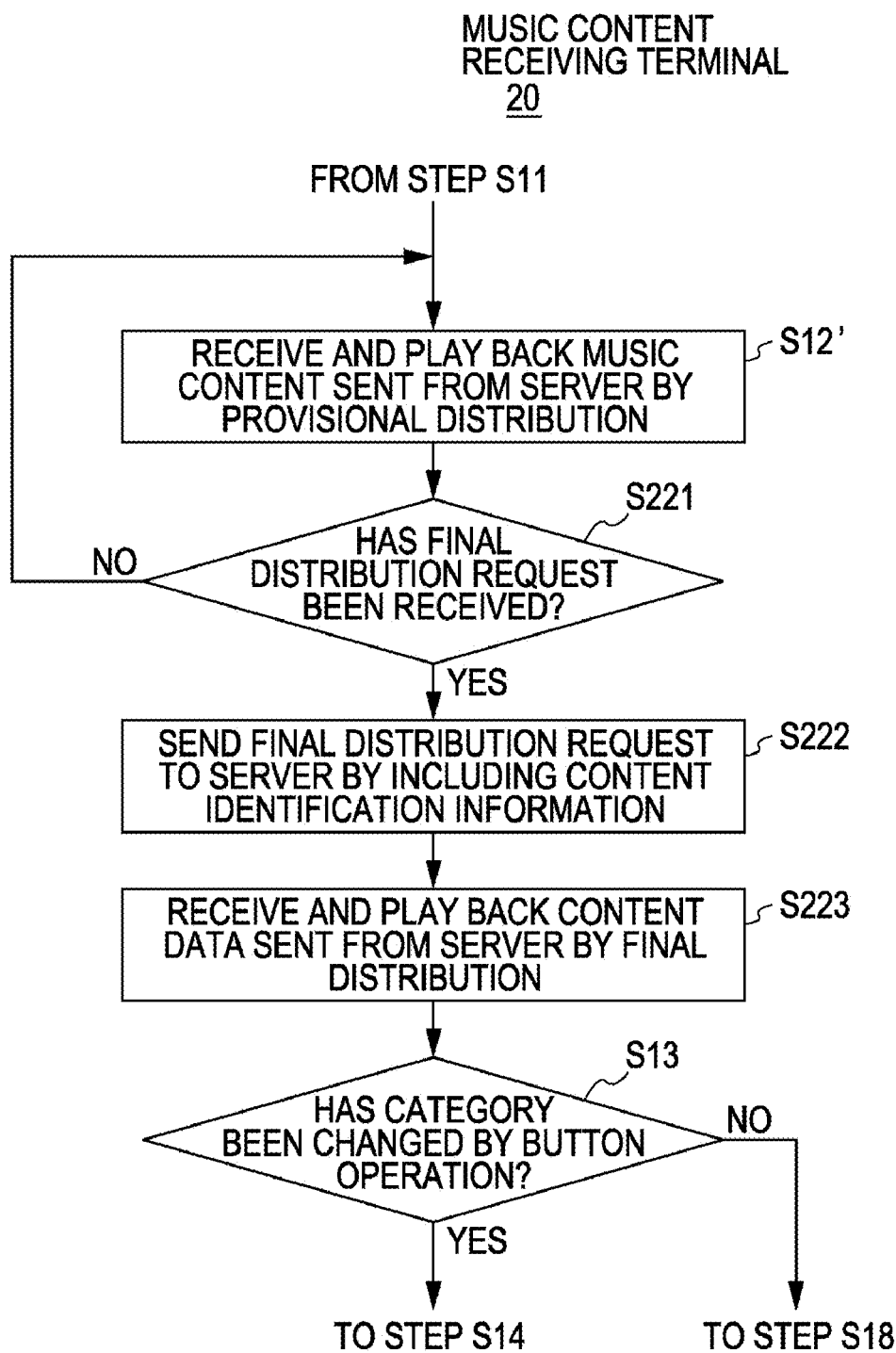
FIG. 33 is a flowchart illustrating another example of the operation performed by a music content receiving terminal according to an embodiment of the present invention.

In step S12' in FIG. 33, the CPU 201 receives and plays back part of one or a plurality of music pieces sent from the content distribution server 10 by provisional distribution. While playing back part of the music pieces, the CPU 201 determines in step S221 whether a final distribution request has been received from the user by performing the button operation.

If it is determined in step S221 that a final distribution request has not been received, the CPU 201 returns to step S12'. If it is determined in step S221 that a final distribution request has been received, the CPU 201 proceeds to step S222 to send a final distribution request to the content distribution server 10 by including, in the request, identification information concerning the content data which was being received by provisional distribution when the final distribution request was received from the user.

Then, in step S223, the CPU 201 receives the content data sent from the content distribution server 10 in response to the final distribution request, and plays back the received content data.

In this case, if part of the content data sent from the content distribution server 10 by provisional distribution corresponds to a music piece from the head to a mid portion, content data corresponding to the rest of the music piece from the mid portion to the end can be sent by final distribution. In this case, the music content receiving terminal 20 receives the rest of the content data requested by the final distribution request and continues to play back the rest of the music piece.

The CPU 201 then proceeds to step S13.

The operation performed by the content distribution server 10 corresponding to the processing indicated by the flowchart in FIG. 33 in the third distribution mode is now discussed with reference to the flowchart in FIG. 34. In this case, only steps S95 through S98 in the flowchart in FIG. 27 are changed to steps in the flowchart in FIG. 34, and other steps are similar to those shown in FIGS. 26 through 30.

Figure 34:
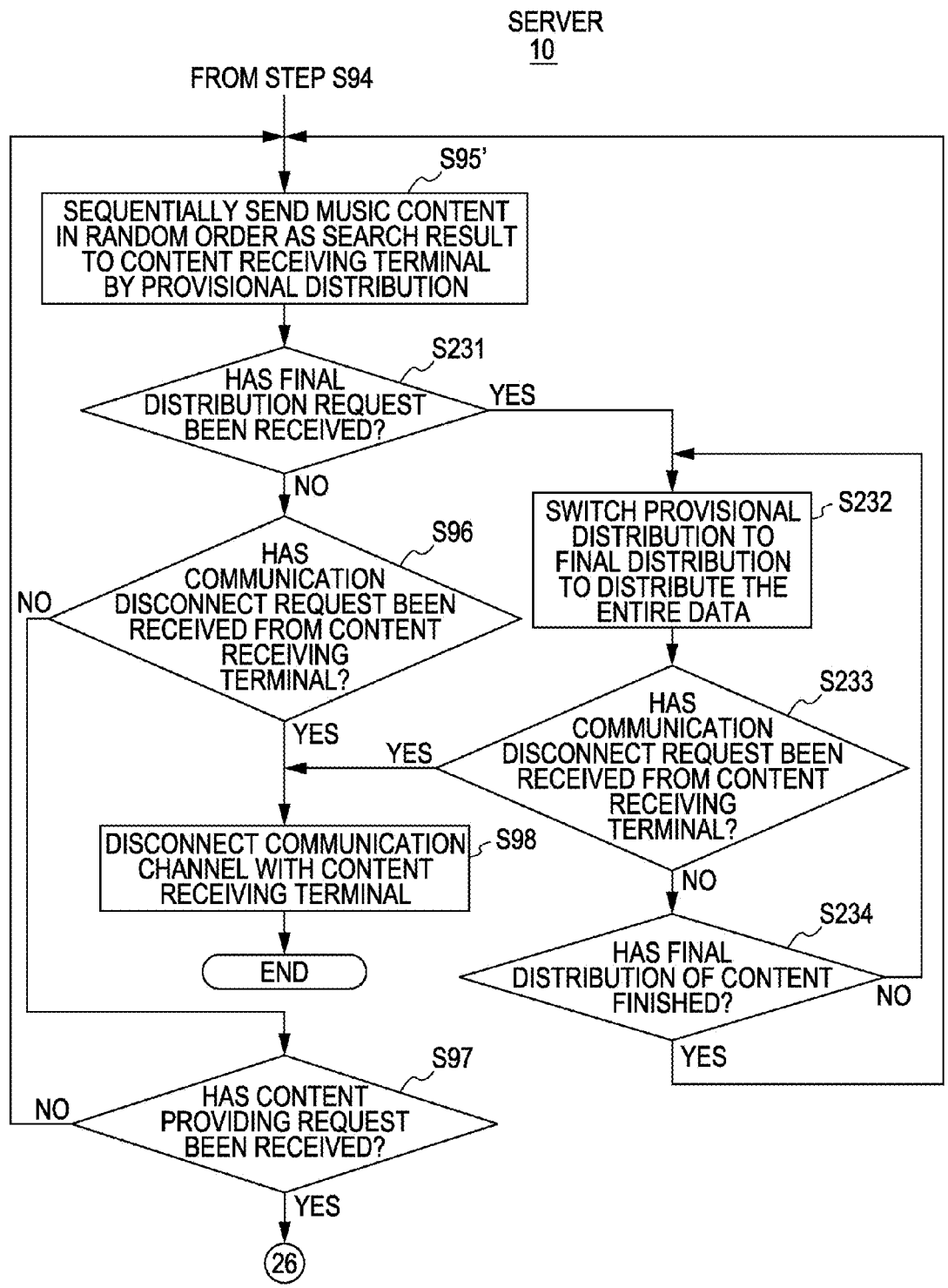
FIG. 34 is a flowchart illustrating another example of the operation performed by a content distribution server according to an embodiment of the present invention.

In this case, in step S95' in FIG. 34, the CPU 101 sequentially distributes part of one or a plurality of music pieces in a random order as a search result to the music content receiving terminal 20 by provisional distribution. While distributing part of music pieces, the CPU 101 determines in step S231 whether a final distribution request has been received from the music content receiving terminal 20.

If it is determined in step S231 that a final distribution request has been received, the CPU 101 proceeds to step S232 to suspend the provisional distribution of the current content and starts distributing the content data in response to the final distribution request.

Then, the CPU 101 determines in step S233 whether a communication disconnect request has been received from the music content receiving terminal 20. If a communication disconnect request has not been received, the CPU 101 proceeds to step S234 to determine whether the final distribution of the content data has finished. If the final distribution of the content data has not finished, the CPU 101 returns to step S232 and continues final distribution. If it is determined in step S234 that the final distribution has finished, the CPU 101 returns to step S95' and restarts provisional distribution.

If it is determined in step S233 that a communication disconnect request has been received from the music content receiving terminal 20, the CPU 101 proceeds to step S98 to disconnect the communication channel with the music content receiving terminal 20. The distribution processing routine is then completed.

The operation performed by the music content receiving terminal 20 in the fifth distribution mode is described below with reference to the flowchart in FIG. 35. In this case, only steps S7 through S9 in the flowchart in FIG. 20 are changed to steps in the flowchart in FIG. 35, and other steps are similar to those shown in FIGS. 20 through 22.

Figure 35:
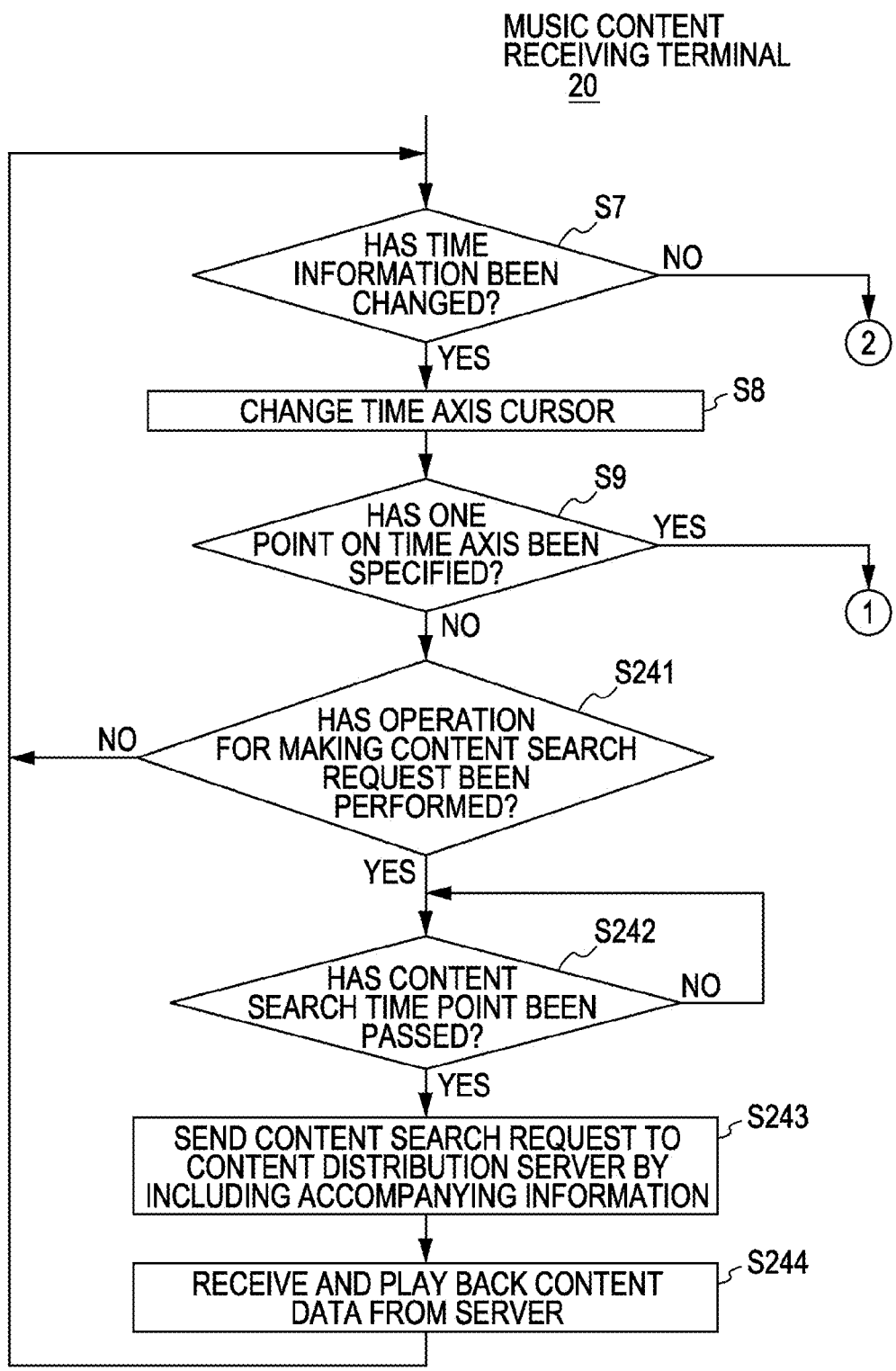
FIG. 35 is a flowchart illustrating another example of the operation performed by a music content receiving terminal according to an embodiment of the present invention.

If the CPU 201 determines in step S9 that the user has not specified one point on the linear axis (time axis), as shown in FIG. 35, the CPU 201 proceeds to step S241 to determine whether the user has performed an operation to intend to make a content search request. As stated above, a determination as to whether the user has performed an operation to intend to make a content search request can be made by determining whether the user operates the turn knob operation unit 23 at a speed lower than the predetermined rotation speed.

If it is determined that the user has not performed an operation to intend to make a content search request, the CPU 201 returns to step S7.

If it is determined in step S241 that the user has operated the turn knob operation unit 23 to make a content search request, the CPU 201 proceeds to step S242 to determine whether a content search time point, such as the year or the month and year, has been passed by the operation.

If it is determined in step S241 that a content search time point has been passed, the CPU 201 proceeds to step S243 to send a content search request to the content distribution server 10 by including, in the request, the year or the month and year as time information and the currently set category information and time information attribute information as accompanying information.

Then, in step S244, the CPU 201 receives part of music data sent from the content distribution server 10 in response to the content search request, and plays back the music data. The CPU 201 returns to step S7. Other steps are similar to those discussed with reference to FIGS. 20 through 22.

The operation performed by the content distribution server 10 corresponding to the processing indicated by the flowchart in FIG. 35 in the fifth distribution mode is now discussed with reference to the flowchart in FIG. 36. In this case, only steps S84 through S85 in the flowchart in FIG. 26 are changed to steps in the flowchart in FIG. 36, and other steps are similar to those shown in FIGS. 26 through 30.

Figure 36:
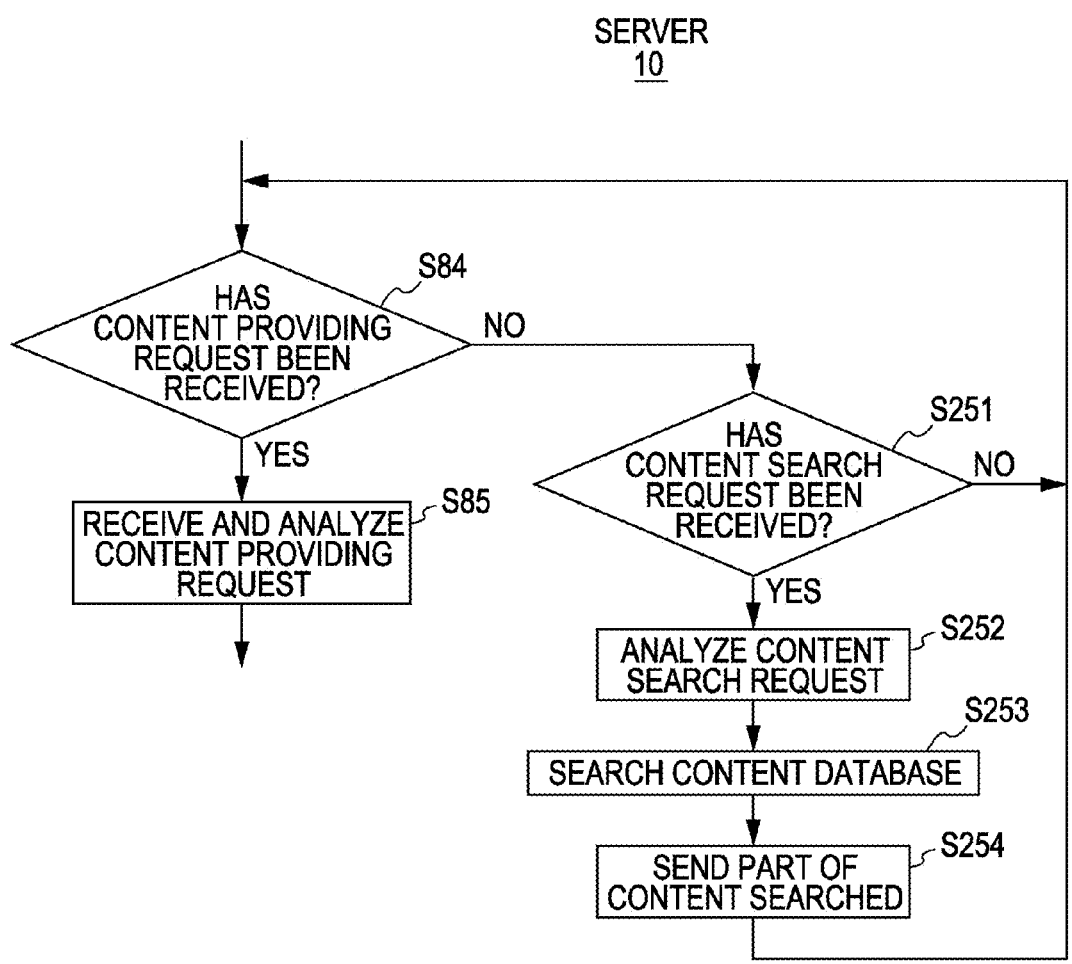
FIG. 36 is a flowchart illustrating another example of the operation performed by a content distribution server according to an embodiment of the present invention.

In this case, if the CPU 101 of the content distribution server 10 determines in step S84 in FIG. 36 that a content providing request has not been received from the content receiving terminal, the CPU 101 proceeds to step S251 to determine whether a content search request has been received. If it is found in step S251 that a content search request has not been received, the CPU 101 returns to step S84.

If it is found in step S251 that a content search request has been received, the CPU 101 proceeds to step S252 to analyze the content search request to obtain the time information and accompanying information, such as category information and time information attribute information. Then, in step S253, the CPU 101 searches the content database 11 according to search conditions based on the obtained time information, category information, and time information attribute information.

Then, in step S254, the CPU 101 sends part of one content piece randomly selected from a plurality of content pieces obtained as a search result in step S253. Then, the CPU 101 returns to step S84. Other steps are similar to those discussed with reference to FIGS. 26 through 30.

Modified Examples

The operation input unit for inputting time information in the content receiving terminals is not restricted to the above-described turn knob operation unit 23 or the direction specifying unit 33, and various other operation units may be used. For example, a slider operation unit may be used, in which case, the user inputs time information by sliding the slider operation unit along the linear axis.

In the above-described embodiment, the content attribute information has been discussed in the context of the content category. However, other content attributes may be specified for requesting content, in which case, the content attributes may be selected in a hierarchical structure. For example, the type of content attribute, such as the category, artist (players or cast), or author, can be selected first, and then, the attribute of the selected type of attribute can be selected. For example, if the artist is selected as the type of content attribute, a list of artists is displayed and the user can select a specific artist from the list.

Accordingly, in this embodiment, the user can request content of a specific artist, for example, content in a specific year, content released at a specific date, or content which was popular in a specific year or date.

The content receiving terminal may be a dedicated terminal for requesting specific content having specific attribute information, such as specific time information. For example, the music content receiving terminal 20 may be a dedicated terminal for requesting hit tunes of a certain year or a certain date. In this case, the terminal can automatically include the type of content and specific attribute information, such as specific time information, in a content providing request. This saves the user from inputting information other than the time information into the terminal. It is not necessary that specific attribute information be always included, in which case, recommended content can be obtained from a content distribution server.

Although in this embodiment the time information attribute information input column and the category information input column are provided for the content receiving terminals, only an input unit for time information may be provided for such a dedicated terminal. In this case, the content receiving terminal includes information for specifying the desired content can be included in a content providing request.

In the foregoing embodiment, the content receiving terminal searches for a specific piece of content by associating time information, and if necessary, accompanying information, with that piece of content. If a plurality of types of content data are stored in a content database, a plurality of types of content may be requested by specifying time information, and if necessary, accompanying information.

Additionally, the content receiving terminal may request content without specifying the type of content. In this case, the content receiving terminal can request all types of content stored in the content database of the content distribution server.

With this arrangement, by specifying a year or a date, the user can search for various types of content corresponding to the specified year or date, which is useful for searching for content of a specific era of the history. The user can also search various types of content for creating his/her personal history.

In the above-described embodiment, list information, for example, an AV content list, is formed of text fields associated with individual pieces of content. However, instead of text, images, such as disk jacket images or thumbnail images, may be arranged together with descriptions thereof.

If a specified time has a time range, such as 60s or 70s, content items, for example, disk jackets, as a search result may be arranged in chronological order in the depth direction of the display screen.

In the foregoing embodiment, the content providing system using a network, such as the Internet, has been discussed. A home network, such as a home network using lamp wire or a wireless home network, may be used in the content providing system.

In a home network, for example, a personal computer having a built-in or external large-capacity recording medium may be used as a home server, and a content database storing content data and attribute information may be provided for the home server.

The user can store content recorded by using a broadcast program recorder in the content database via the home network, or reads content data from a removable and rewritable recording medium and stores it in the content database.

The user can also access an external source by using the personal computer via the Internet to collect various items of content and stores them in the content database.

In this case, it is preferable that the function of adding recording dates to recorded content and sending the content to the content database be provided for a broadcast program recorder. The function of extracting broadcast dates from an electronic program guide (EPG) and sending content together with the broadcast dates to the content database may be provided for the broadcast program recorder.

In this home network system, a content receiving terminal, such as a portable terminal, can send a content providing request, which is created by the processing described above, to the home server, and then receives content.

The above-described modifications of the foregoing embodiment may be applied to the home network system.

In the above-described embodiment, the content receiving terminal and the content distribution server are different elements, and they are connected through a communication network. However, a content providing apparatus having both the functions of the content receiving terminal and the functions of the content distribution server may be provided.

In this case, the content providing apparatus has a content database and also has a function similar to the content requesting function of the content receiving terminal and a function similar to the content distributing function of the content distribution server.

That is, in this modification, the user can request content by performing an input operation using the operation unit without accessing a content distribution server from a content receiving terminal, and then, the content database is automatically searched in the content providing apparatus. Then, processing corresponding to that performed by a content distribution server and processing corresponding to that performed by a content receiving terminal according to each of the first through fourth distribution modes are performed in the content providing apparatus so that a content search result can be obtained in the content providing apparatus.

That is, in the content providing apparatus, the content database is searched based on the input operation performed by the user through the operation unit. Then, images are displayed and sound is played back as a search result. In this case, a speaker and a headphone as a sound playback unit may be externally connected to the content providing apparatus, in which case, the content providing apparatus includes an audio output terminal and a video output terminal.

Accordingly, the content providing apparatus at least includes a content database, a time information input receiver for receiving the input of time information by the user, a search unit for searching at least one content item stored in a content storage unit according to search conditions based on the time information received by the time information input receiver and accompanying information for specifying a range of content items searched by using the time information, and a providing unit for providing at least one content item searched by the search unit to the user.

If necessary, the content providing apparatus includes an input unit for inputting time information attribute information and an input unit for inputting content attribute. As discussed above, however, the content providing apparatus can use time information attribute information or content attribute information as search conditions without the above-described input units.

The above-described modifications of the foregoing embodiment may be applied to the content providing apparatus.

In the above-described embodiment, content items that match specified time information are searched. If the specified time information is very precise, for example, the second, minute, hour, day, month, and year, not only content items exactly matching the specified time, but also content items around the specified time may be obtained as a search result. Even if the specified time information is not very precise, content items around the specified time may also be obtained as a search result.

This enables the user to request content even if the user does not remember the exact time. That is, the user can obtain content items by specifying only a rough time. With this arrangement, the possibility that the user can obtain desired content is increased.

Additionally, in the above-described embodiment, stream playback is performed on music content or AV content while being distributed from the content distribution server. However, each content data may be downloaded and is then played back. In this case, in the content providing system, it is not necessary to constantly connect a content receiving terminal with the content distribution server. Instead, the communication channel between the content receiving terminal and the content distribution server can be disconnected every time downloading is finished.

In this case, the music content receiving terminal 20 downloads the content item first obtained when a request was sent to the content distribution server 10. In a terminal provided with the next button 25*c* shown in FIG. 13, when the user presses the next button 25*c*, a content providing request having the same search conditions as the previous request is sent to the content distribution server 10. Then, the content distribution server 10 sends a different content item since the receiving time of the current request is different from that of the previous request.

It should be understood by those skilled in the art that various modifications, combinations, sub-combinations and alterations may occur depending on design requirements and other factors insofar as they are within the scope of the appended claims or the equivalents thereof.

What is claimed is:

1. A content providing apparatus comprising:
an operation input unit configured for use by a user to perform an input operation for specifying a plurality of points on a line, the input operation comprising causing a cursor to scroll along a portion of the line at a speed lower than a predetermined speed while the tracing plurality of points;
a time information output unit configured to output the point specified by the operation input unit as output time information, wherein the content providing apparatus is configured to determine whether the user is scrolling the cursor over the plurality of points at a speed lower than the predetermined speed, and wherein the content providing apparatus determines that the user intends to select the plurality of points as the output time information based only on the user scrolling the cursor over the plurality of points at a speed lower than the predetermined speed;
a content storage unit in which a plurality of content items are stored in association with at least time information concerning each of the plurality of content items;
a search unit configured to search the content storage unit for at least one content item according to a search condition based on the time information output by the time information output unit, wherein the search unit conducts a search by using time information concerning each of the plurality of points traced by the input operation which is sequentially performed through the operation input unit, wherein the at least one content item comprises at least one of: music, video, electronic book, guidance information, web page and program, and wherein the output time information represents a search condition for at least one of release time, ranking time, performance time, broadcast time, and printing time;

a provider configured to provide said at least one content item searched by the search unit to the user; and a unit configured to detect at least one content item per predetermined time corresponding to each of the plurality of points traced by the input operation, and to send information for allowing the user to identify said at least one content item as a detection result to the content receiving terminal.

2. A content providing method for reading a content item from a content storage unit in which a plurality of content items are stored in association with at least time information concerning each of the plurality of content items, and providing the read content item to a user, the content providing method comprising the steps of:

outputting a plurality of points on a line specified by an input operation as output time information, the input operation comprising causing, by a user, a cursor to scroll along a portion of the line, the input operation further comprising, for each point of the plurality of points, providing an indication to select the point by suspending the cursor at the point for at least a predetermined period of time while the cursor scrolls along the portion of the line, comprising determining whether the user has suspended the cursor at the point for at least the predetermined period of time, wherein it is determined that the user intends to select the point as part of the output time information based only on the user having suspended the cursor at the point for at least the predetermined period of time;

searching the content storage unit for the plurality of content items according to a search condition based on the output time information, wherein the plurality of content items comprise at least one of: music, video, electronic book, guidance information, web page and program, and wherein the output time information represents a search condition for at least one of release time, ranking time, performance time, broadcast time, and printing time;

providing the searched content to the user;

outputting, when the input operation is sequential, the plurality of points traced by the input operation;

searching, according to a search condition based on time information concerning each of the plurality of points traced by the input operation, the content storage unit to detect at least one content item per predetermined time; and providing information for allowing the user to identify said at least one content item as a detected result.

3. A content providing apparatus comprising:

operation input means for use by a user to perform an input operation for specifying a plurality of points on a line, the input operation comprising causing a cursor to scroll along a portion of the line, the input operation further comprising, for each point of the plurality of points, providing an indication to select the point by suspending the cursor at the point for at least a predetermined period of time while the cursor scrolls along the portion of the line;

time information output means for outputting the point specified by the operation input means as output time information, wherein the time information output means includes determining means configured to determine whether the user has suspended the cursor at the point for at least the predetermined period of time, and wherein the determining means determines that the user intends to select the point as the output time information based only on the user having suspended the cursor at the point for at least the predetermined period of time;

a content storage unit in which a plurality of content items are stored in association with at least time information concerning each of the plurality of content items;

search means for searching the content storage unit for at least one content item according to a search condition based on the time information output by the time information output means, wherein the search means conducts a search by using time information concerning each of the plurality of points traced by the input operation which is sequentially performed through the operation input means, wherein the at least one content item comprises at least one of: music, video, electronic book, guidance information, web page and program, and wherein the time information represents a search condition for at least one of release time, ranking time, performance time, broadcast time, and printing time;

providing means for providing said at least one content item searched by the search means to a user; and means for detecting at least one content item per predetermined time corresponding to each of the plurality of points traced by the input operation, and for sending information for allowing the user to identify said at least one content item as a detection result to the content receiving terminal.

4. The content providing apparatus according to claim 3, wherein the search means is configured to, in response to the determining means determining that the input operation performed by the user indicates that the user intends to specify one point on the line, search the content storage unit for at least one content item according to a search condition based on the time information specified by the input operation.

5. The content providing apparatus according to claim 3, wherein the search means determines a search condition by using, in addition to the time information, accompanying information for specifying a range of content to be searched by using the time information.

6. The content providing apparatus according to claim 3, wherein the information for allowing the user to identify said at least one content item is part of the detected content.

7. The content providing apparatus according to claim 3, wherein the information for allowing the user to identify said at least one content item is an image for allowing the user to identify the detected content.

8. The content providing apparatus according to claim 3, wherein, when a plurality of content items are searched as a search result by the search means, the providing means sequentially sends the plurality of content items to the user.

9. The content providing apparatus according to claim 3, wherein the providing means comprises:

content list providing means for providing list information concerning a plurality of content items searched by the search means to the user, and means for receiving, from the user, specifying information concerning one of the plurality of content items in the list information sent by the content list sending means, and for providing the content item specified by the specifying information to the user.

10. The content providing apparatus according to claim 5, wherein attribute information concerning the time information is used as the accompanying information.

11. The content providing apparatus according to claim 5, wherein content attribute information is used as the accompanying information.

12. The content providing apparatus according to claim 8, wherein the providing means comprises:
 provisional providing means for sequentially providing part of each of the plurality of content items searched by the search means to the user,
 determining means for receiving a content determination instruction while part of each of the plurality of content items is being provided to the user by the provisional providing means, and
 final providing means for providing, in response to the content determination instruction received by the determining means, the entirety of a content item which is being provided when receiving the content determination instruction to the user.

13. The content providing apparatus according to claim 8, further comprising:
 next request input means for receiving an input operation for a next request for a next content item while the plurality of content items are being sequentially provided to the user by the providing means; and
 means for discontinuing distribution of the content item which is being provided when receiving the input operation for the next request by the next request input means, and for starting distributing the next content item.

14. The content providing apparatus according to claim 10, further comprising time attribute information input means for receiving the input of the attribute information concerning the time information.

15. The content providing apparatus according to claim 11, further comprising content attribute information input means for receiving the input of the content attribute information.

* * * * *